United States Patent
Sunda et al.

(10) Patent No.: US 7,315,299 B2
(45) Date of Patent: Jan. 1, 2008

(54) MULTI-WAY INPUT DEVICE AND OPERATING FAILURE AVOIDANCE METHOD USING THE SAME

(75) Inventors: Takashi Sunda, Yokosuka (JP); Kenichi Tanaka, Yokohama (JP); Masao Sakata, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 465 days.

(21) Appl. No.: 10/621,613

(22) Filed: Jul. 18, 2003

(65) Prior Publication Data

US 2004/0020704 A1 Feb. 5, 2004

(30) Foreign Application Priority Data

| Aug. 1, 2002 | (JP) | ............................ P 2003-225311 |
| Mar. 5, 2003 | (JP) | ............................ P 2003-058893 |
| Mar. 11, 2003 | (JP) | ............................ P 2003-065558 |

(51) Int. Cl.
*G06F 3/033* (2006.01)
*G09G 5/08* (2006.01)
*G08G 1/00* (2006.01)

(52) U.S. Cl. ........................................ 345/161; 340/901

(58) Field of Classification Search ........ 345/156–163, 345/169, 172, 184; 340/901, 904
See application file for complete search history.

(56) References Cited

U.S. PATENT DOCUMENTS

| 5,270,689 | A | * | 12/1993 | Hermann | ..................... 345/157 |
| 5,467,277 | A | * | 11/1995 | Fujisawa et al. | ................ 701/51 |
| 5,491,313 | A | * | 2/1996 | Bartley et al. | ................ 200/310 |
| 6,271,637 | B1 | * | 8/2001 | Kushion | ...................... 318/434 |
| 6,373,272 | B1 | * | 4/2002 | Welsch et al. | ............... 345/173 |
| 6,556,900 | B1 | * | 4/2003 | Brynielsson | ................. 701/29 |
| 2001/0040562 | A1 | * | 11/2001 | Masudaya | ................... 345/173 |
| 2002/0021282 | A1 | * | 2/2002 | Masudaya | ................... 345/156 |

FOREIGN PATENT DOCUMENTS

| JP | 03-244085 | 10/1991 |
| JP | 04-036638 | 3/1992 |
| JP | 05-019969 | 1/1993 |
| JP | 06-131094 | 5/1994 |
| JP | 06-149460 | 5/1994 |
| JP | 10-063407 | 3/1998 |
| JP | 2001-312359 | 11/2001 |

* cited by examiner

*Primary Examiner*—Jeff Piziali
(74) *Attorney, Agent, or Firm*—McDermott Will & Emery LLP

(57) ABSTRACT

A joystick input device adapted to be mounted on a vehicle and an operational failure avoidance method are disclosed, wherein controllable operation guides 111 are set in an operational range of a stick 21 that is rendered operative only in a given direction depending on a GUI condition. A stick control computing device 407 stores information related to an operational direction upon judgment of occurrence of operational failures caused during stick operation, discriminates an occurrence tendency of the operational failures through analysis of a history of the operational failures, thereby adjusting a moveable mode of the operation guide so as to avoid the operational failures.

12 Claims, 50 Drawing Sheets

EXTERNAL UNIT

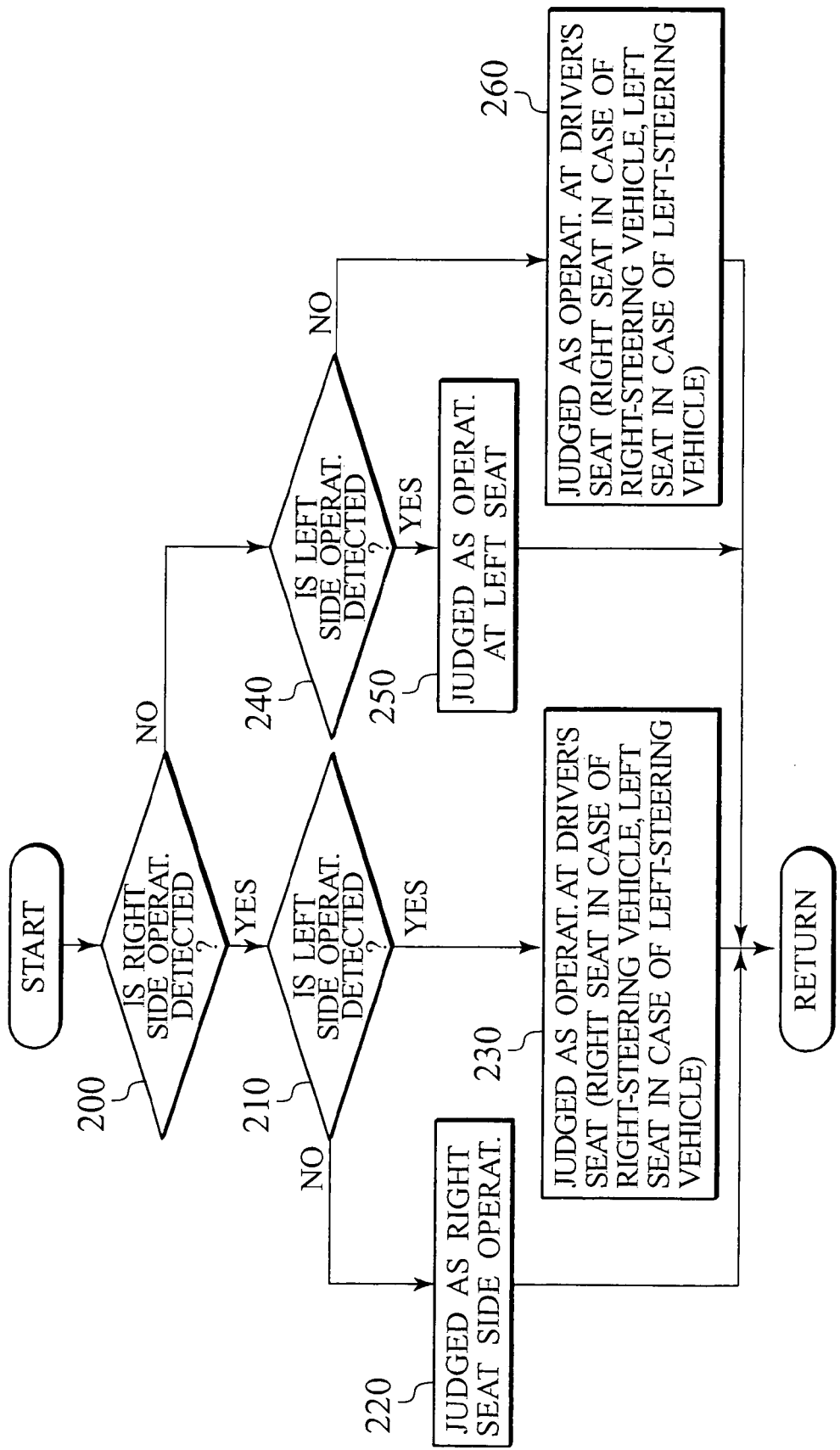

EXTERNAL UNIT

EXTERNAL UNIT

FIG. 47

| 4-WAY DIRECT. LAYOUT | | | | | | | | | |
|---|---|---|---|---|---|---|---|---|---|
| 6-WAY DIRECT. LAYOUT | | | | | | | | | |
| 8-WAY DIRECT. LAYOUT | OPERAT. DIRECT. JUDGMENT AREA NUMBER (i) | | | | | | | | |
| | ① | ② | ③ | ④ | ⑤ | ⑥ | ⑦ | ⑧ |
| ACCUMULAT. STORED PARAMET. | $n_i$ | | | | | | | | |
| | $\Sigma_j \theta_{ij}$ | | | | | | | | |
| | $\Sigma_j \theta_{ij}^2$ | | | | | | | | |
| | $\Sigma_j \phi_{ij}$ | | | | | | | | |
| | $\Sigma_j \phi_{ij}^2$ | | | | | | | | |
| | $\Sigma_j \theta_{ij} \phi_{ij}$ | | | | | | | | |
| STATISTIC. PROCESSED VALUE | $<\theta i>$ | | | | | | | | |
| | $\sigma(\theta i)$ | | | | | | | | |
| | Cmn | | | | | | | | |
| | $<\phi i>$ | | | | | | | | |
| | $\sigma(\phi i)$ | | | | | | | | |
| | Ri | | | | | | | | |

MULTI-WAY INPUT DEVICE AND OPERATING FAILURE AVOIDANCE METHOD USING THE SAME

BACKGROUND OF THE INVENTION

The present invention relates to a multi-way input device and an operational failure avoidance method using the same wherein a command is selected through tilting or sliding movements of an operation terminal to perform input operation.

In the related art multi-way input devices, as disclosed in "an input device" disclosed in Japanese patent Application Laid-Open No. 2001-312359, it has heretofore been proposed to provide an operational failure counter means, adapted to count and store an operational failure frequency encountered in respective operational directions, that during occurrence of the operational failure frequency with respect to a certain operational direction exceeding a given frequency, allows a function (command) selectable through the relevant operational direction to be replaced with a function selectable through the other operational direction for thereby avoiding the operational failures.

Under a circumstance where an operational direction in a certain operational condition differs from that of the related art type with which the operator is familiarized or differs from that of a general custom, although erroneous operation occurs due to operation custom of the operator, such as operation in the direction of the related art type or operation in the direction resulted in general custom, which the operator is apt to unconsciously execute, such operational failure avoidance measure is effective to preclude such erroneous operation.

SUMMARY OF THE INVENTION

However, with such a related art operational failure avoidance measure, although it is possible to prevent the erroneous operation caused by recognition failures or judgment failures resulting from misperception or impressed idea for the direction to be operated, even if the direction to be operated is recognized, an issue arises in that it is hard to preclude the erroneous operation caused by the operational failure, in a restricted sense, with no capability of accurately operating the operation terminal in a desired operational direction to cause the operator to operate the operation terminal in an adjacent operational direction due to the existence of various factors, related to an input unit side, an operator side and, further, an application circumstance, such as a positional relationship between the operator and the operation terminal, an operational peculiarity of the operator, and disturbances to be exerted to the operator or the operation terminal during operation thereof.

Especially, when in use of the operation terminal in a vehicle for the purpose of operation of an on-vehicle unit, if vibrations caused in the vehicle are transferred to the operator or the operation terminal with a resultant deviation in operation and, because of layout design of a vehicle compartment, the operation terminal can not be located just in front of the operator with a resultant occurrence of deviation in the operational direction, the operational failure tends to easily occur.

Further, with respect to an operational menu displayed over a screen, due to the presence of a discrepancy between a function, available to be realized through selective operation from such a menu, and a function intended and expected by the operator, or due the presence of vague definitions of terminologies appearing in operational menu items, if the operator intends to realize an expected function but fails to operate in a way to select an improper operational menu item, an issue arises in that it is hard to accommodate such an undesired operational failure using the method of replacing the operational directions as proposed in the related art operational failure avoidance measure.

Particularly, as in an automobile navigation device, in a system adapted to realize a desired operational function by selecting a menu, formed in a hierarchy to be displayed over the screen, a frequency using the multi-way input device, it is hard for the operator to be familiarized in a desired operational sequence to comply with the operational directions of the multi-way input device and, so, there are many probabilities for the operator to consciously operate the operational menu on the display screen, thereby causing increase in occurrence of the selective operational failures of the menu items set forth above.

In view of the related art issues set forth above, it is therefore an object of the present invention to provide a multi-way input device which, even under circumstances where a deteriorated operational accuracy occurs due to disturbances to be exerted to an operator or an operation terminal, a peculiarity in operation of the operator or a positional relationship between the operator and the operation terminal, is able to avoid operational failures, and a multi-way input device wherein, with respect to operation to be performed by an operator with a high liability in the operational failures, the operator is compelled to consciously operate a stick and promoted to familiarize operation in an early stage, and an operational failure avoidance method using the same.

A first aspect of the invention is a multi-way input device adapted to perform input operation through tilting or sliding movements of an operation terminal in a given direction to allow a command correlated with the direction to be selected, the multi-way input device comprising an operational failure judgment section judging if selective operation of an operator is involved in an operational failure, an operational failure memory section storing information, related to operational failures judged by the operational failure judgment section, as an operation history, an operational failure analysis section analyzing the operation history stored in the operational failure memory section for thereby judging a tendency of the operational failures, and an adjusting section adjusting a moveable mode of the operation terminal in a way to avoid the operational failures in response to a resulting analysis made by the operational failure analysis section.

A second aspect of the invention is a method of avoiding an operational failure in a multi-way input device adapted to perform input operation through tilting or sliding movements of an operation terminal in a given operational direction to allow a command, correlated with the operational direction, to be selected, the method comprising judging if selective operation of an operator is involved in an operational failure, storing information, related to the operational direction in which the operational failure occurs, as an operation history in the presence of the operational failure, judging a tendency of operational failures by analyzing the operation history, and correcting a moveable range of the operation terminal so as to avoid the operational failure.

A third aspect of the invention is a multi-way input device adapted to perform input operation through tilting or sliding movements of an operation terminal in a given direction to allow a command, correlated with the direction, to be selected, the multi-way input device comprising an operation monitoring section monitoring completed selective operation and an operational direction of the operation terminal, an operational failure judgment section judging if selective operation of an operator is involved in an operational failure, an operational failure memory section accumulatively storing an operational frequency, for each operational direction associated with the command, and a frequency of operational failures, for the each operational direction, judged by the operational failure judgment section, as an operation history, an operational failure analysis section calculating an erroneous operation rate, for the each operational direction, based on the operation history stored in the operational failure memory section, and an operational load control section setting and altering a repulsion characteristic, to be imparted to the operator through the operation terminal, depending on an operational displacement value caused by tilting movement of the operation terminal initiated by the operator in a radial direction, wherein the operational load control section allows a repulsion characteristic, that increases depending on an operational displacement value as the erroneous operation rate of the operational direction increases, to be set in a steeper gradient than that of a standardized repulsion or to allow an operational displacement position, at which the selective operation is completed, to be set to a position remoter than a standardized displacement position.

A fourth aspect of the invention is a method of avoiding an operational failure in a multi-way input device adapted to perform input operation through tilting or sliding movements of an operation terminal in a given operational direction to allow a command, correlated with the operational direction, to be selected, the method comprising monitoring completed selective operation of the operation terminal and an operational direction, judging if selective operation of an operator is involved in an operational failure, accumulatively storing operational frequency for the operational direction in compliance with the command, and an operational failure frequency for the operational direction as an operational failure history for the selective operation, calculating an erroneous operation rate for the operational direction based on the operational failure history that is stored, setting and altering a repulsion characteristic, to be imparted to the operator through the operation terminal when the operation terminal is tilted by the operator, depending on an operational displacement value in a radial direction, and setting a repulsion characteristic, that increases depending on the operational displacement value as the erroneous operation rate related to the operational direction increases, in a way to vary in a steeper gradient than that of a standardized repulsion or setting an operational displacement position, at which the selective operation is completed, to a position which is remoter than that of a standardized displacement position.

A fifth aspect of the invention is a multi-way input device adapted to perform input operation through tilting or sliding movements of an operation terminal in a given operational direction to allow a command, correlated with the operational direction, to be selected, the multi-way input device comprising an operation monitoring section monitoring beginning of operation in an operational direction in compliance with the command of the operation terminal, completed operation and a relevant operational direction, an operational failure judgment section judging if selective operation initiated by the operator is involved in an operational failure, an operational failure memory section accumulatively storing an operational frequency, for each operational direction associated with the command, and a frequency of operational failures, for the each operational direction, judged by the operational failure judgment section, as an operation history, an operational failure analysis section calculating an erroneous operation rate, for the each operational direction, based on the operation history stored in the operational failure memory section, and a vibration control section controlling vibration of the operation terminal, wherein when a signal indicative of the beginning of the operation in the relevant operational direction, the vibration control section controls the vibration depending on the erroneous operation rate correlated with the relevant operational direction.

A six aspect of the invention is a method of avoiding an operational failure in a multi-way input device adapted to perform input operation through tilting or sliding movements of an operation terminal in a given operational direction to allow a command, correlated with the operational direction, to be selected, the method comprising monitoring beginning of operation in an operational direction in compliance with the command of the operation terminal, completed operation, and the operational direction, judging if selective operation of an operator is involved in an operational failure, accumulatively storing operational frequency for the operational direction in compliance with the command, and an operational failure frequency for the operational direction as an operational failure history for the selective operation, calculating an erroneous operate rate for the operational direction based on the operational failure history that is stored, and controlling vibration of the operation terminal depending on the erroneous operation rate related to a relevant operational direction when a signal, indicative of the beginning of the operation in the relevant operational direction, is detected.

A seventh aspect of the invention is a multi-way input device adapted to perform input operation through tilting or sliding movements of an operation terminal in a given operational direction to allow a command, correlated with the operational direction, to be selected, the multi-way input device comprising an operational history memory section accumulatively storing an operational locus of an operation terminal for every operation of the operation terminal, an operational history analysis section statistically processing distribution of operational loci that are accumulatively stored, and a moveable area control section controllably altering a moveable area, in which the operational direction of the operation terminal associated with the command is determined, based on a statistical value of distribution of the operational loci obtained by the operational history analysis section.

An eighth aspect of the invention is a method of avoiding an operational failure in a multi-way input device adapted to perform input operation through tilting or sliding movements of an operation terminal in a given operational direction to allow a command, correlated with the operational direction, to be selected, the method comprising accumulatively storing operational loci of the operation terminal for every operation of the operation terminal, statistically processing distribution of the operational loci that are accumulatively stored, and altering and controlling a moveable area, for determining an operational direction of the operation terminal associated with the command, based on a statistical value of distribution of the operational loci that are statistically processed.

A ninth aspect of the invention is a multi-way input device adapted to perform input operation through tilting or sliding movements of an operation terminal in a given operational direction to allow a command, correlated with the operational direction, to be selected, the multi-way input device comprising an operational history memory section accumulatively storing an operational locus of an operation terminal for every operation of the operation terminal, an operational history analysis section statistically processing distribution of operational loci that are accumulatively stored, and an operational direction discriminating section monitoring a locus of the operation terminal for every operation thereof and discriminating an operational direction based on distribution of the operational loci.

A tenth aspect of the invention is a method of avoiding an operational failure in a multi-way input device adapted to perform input operation through tilting or sliding movements of an operation terminal in a given operational direction to allow a command, correlated with the operational direction, to be selected, the method comprising accumulatively storing operational loci of the operation terminal for every operation of the operation terminal, statistically processing distribution of the operational loci that are accumulatively stored, and monitoring a locus for each operation of the operation terminal and discriminating an operational direction based on distribution of the operational loci that are statistically processed.

BRIEF DESCRIPTION OF THE DRAWINGS

FIG. 8 is a is a flowchart illustrating flow of seated position discriminating operation.

FIG. 47 is an illustrative view of an operation history table.

DETAILED DESCRIPTION OF THE PREFERRED EMBODIMENS

Hereinafter, embodiments of the present invention are described with reference to the drawings.

First, in a first embodiment, a joystick type input device, that plays a role as a multi-way input device, is employed which is located on an instrument panel of a vehicle for the purpose of operating GUI (Graphical User Interface) provided on a display.

Figure 1:
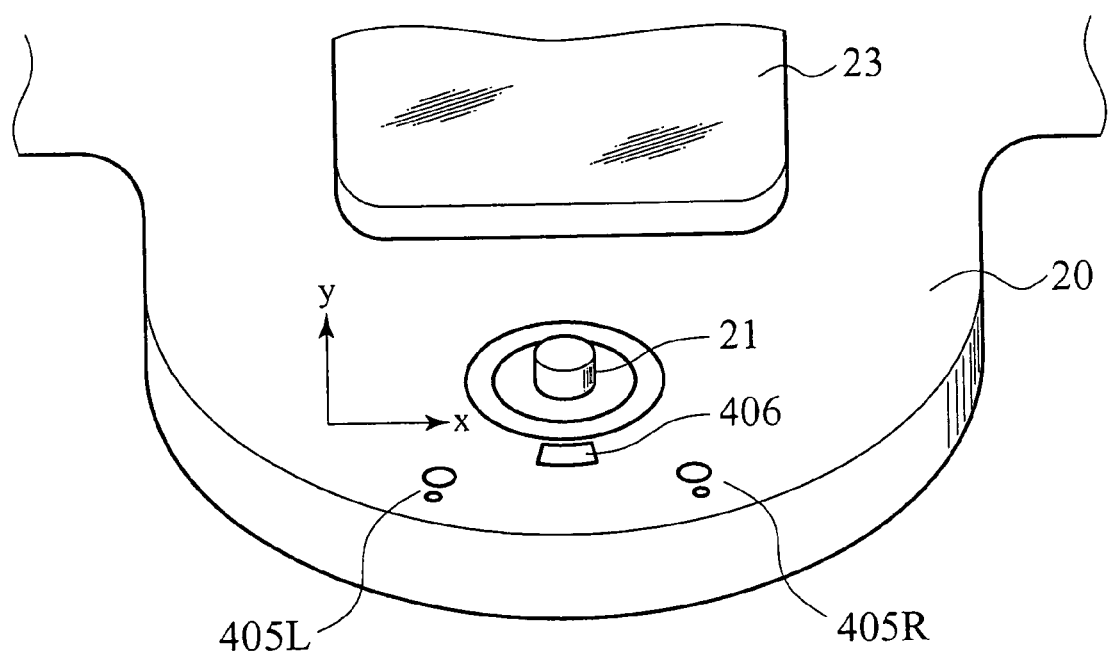
FIG. 1 is a view illustrating a view illustrating a layout of a joystick input device of an embodiment according to the present invention.

The joystick input device is mounted on the instrument panel of the vehicle and is operable from both sides including a driver's seat and an assistant driver's seat in a way such that tilting a stick 21, protruding outward from a center cluster 20 as shown in FIG. 1, in a radial direction with respect to a center position allows an operator to select a menu, shift a cursor and scroll an image on GUI displayed over a display 23 serving as a display means.

Located in front of the stick 21 is a push switch type cancel switch 406 that allows cancellation of an operational command inputted by preceding stick operation.

Further, located on both left and right sides of the stick 21 are infrared ray sensors 405L, 405R for discriminating whether the current operator is a person who sits on the driver's seat or a person who sits on the assistant driver's seat.

The infrared ray sensors 405L, 405R are located in such positions to allow only one infrared ray sensor, closest to the current operator who has committed, to sense his hand with the other remaining infrared ray sensor being rendered inoperative when the operator, who sits on the driver's seat or on the assistant driver's seat, naturally manipulates the stick 21. The infrared ray sensors 405L, 405R may be preferably located in an area on which a palm bottom portion near a root portion of a thumb is rested when the operator naturally stretches his hand 32 (left hand in the figure) from a seated position shown in FIG. 2 and operates the stick 21.

Though the operator's hand may conceivably take various positions depending on the body of the operator, an application area of the infrared ray sensors may be determined in supposition of a standard seated position and a standard body when in design and, alternatively, the infrared ray sensors may be positioned using a particular position derived from a large body, that causes the left and right infrared ray sensors 405L, 405R to encounter a difficulty in discriminating the operator, on the basis of statistical data of human dimensions, thereby enabling the operator's seated position to be more reliably discriminated.

Figure 2:
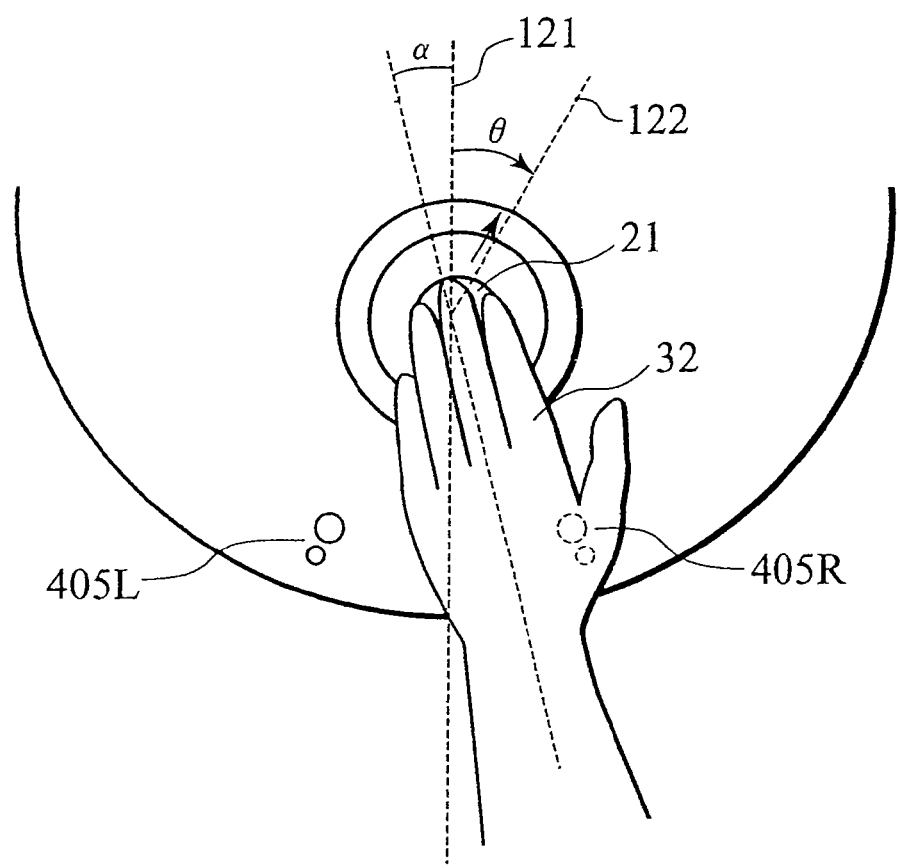
FIG. 2 is an illustrative view showing an entry angle of a hand during stick operation.

That is, since the operator with the large body is able to stretch his hand from a further rearward position to allow his hand to enter a center line 121 of the instrument panel in FIG. 2 in further parallel form thereto, there is an increased probability for the operator's little finger to approach the other infrared ray sensor 405L with a resultant increased liability of the little finger to be detected.

In the presently filed embodiment, the infrared sensors 405L, 405R are located at the positions associated with the palm bottom portion of the hand of the operator sitting in the standard seat position in terms of a representative body based on the body of 95 percentile, thereby enabling the seated position of the operator to be reliably discriminated.

Figure 3:
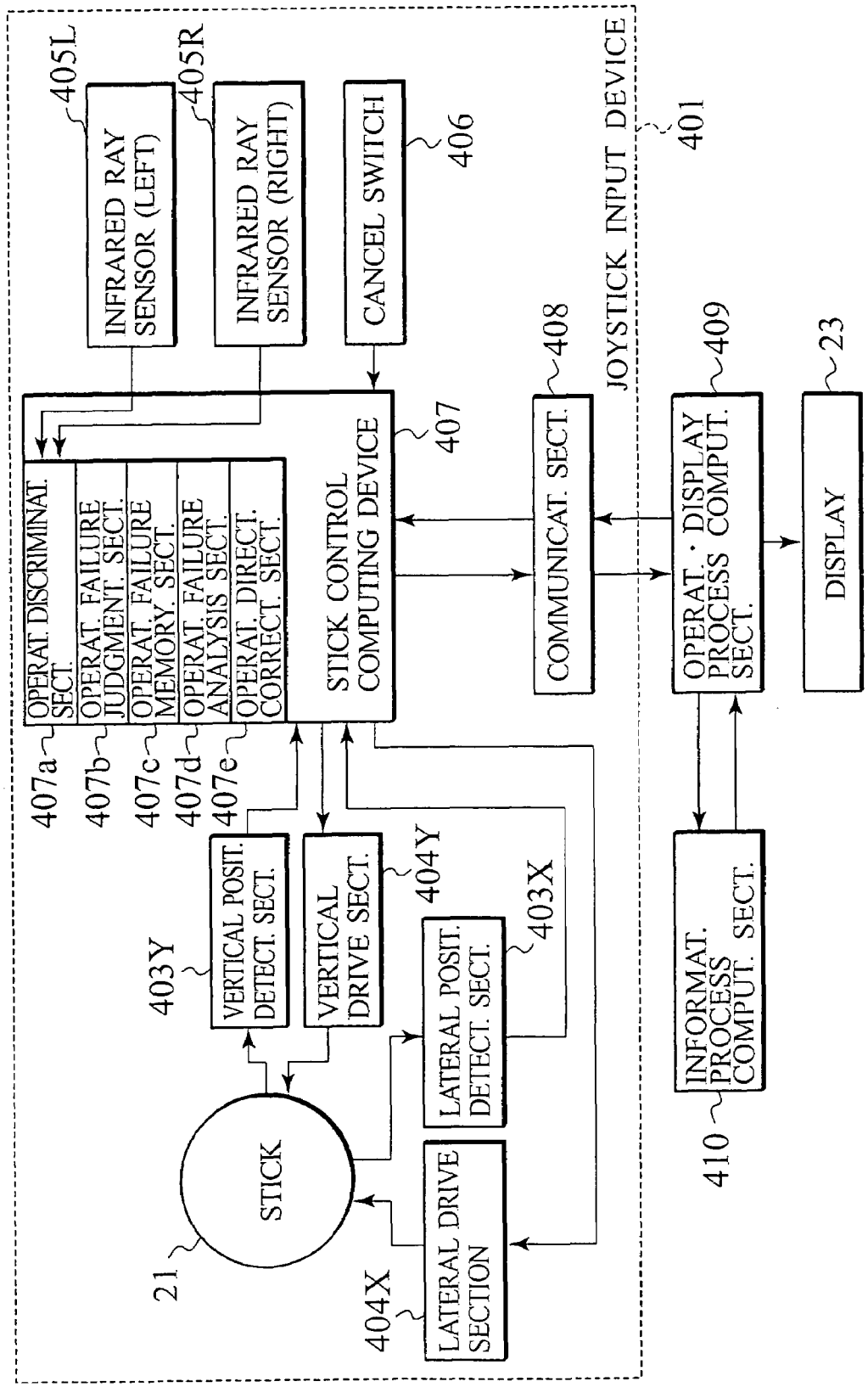
FIG. 3 is a control block diagram of a joystick input device of a first embodiment.
Figure 4:
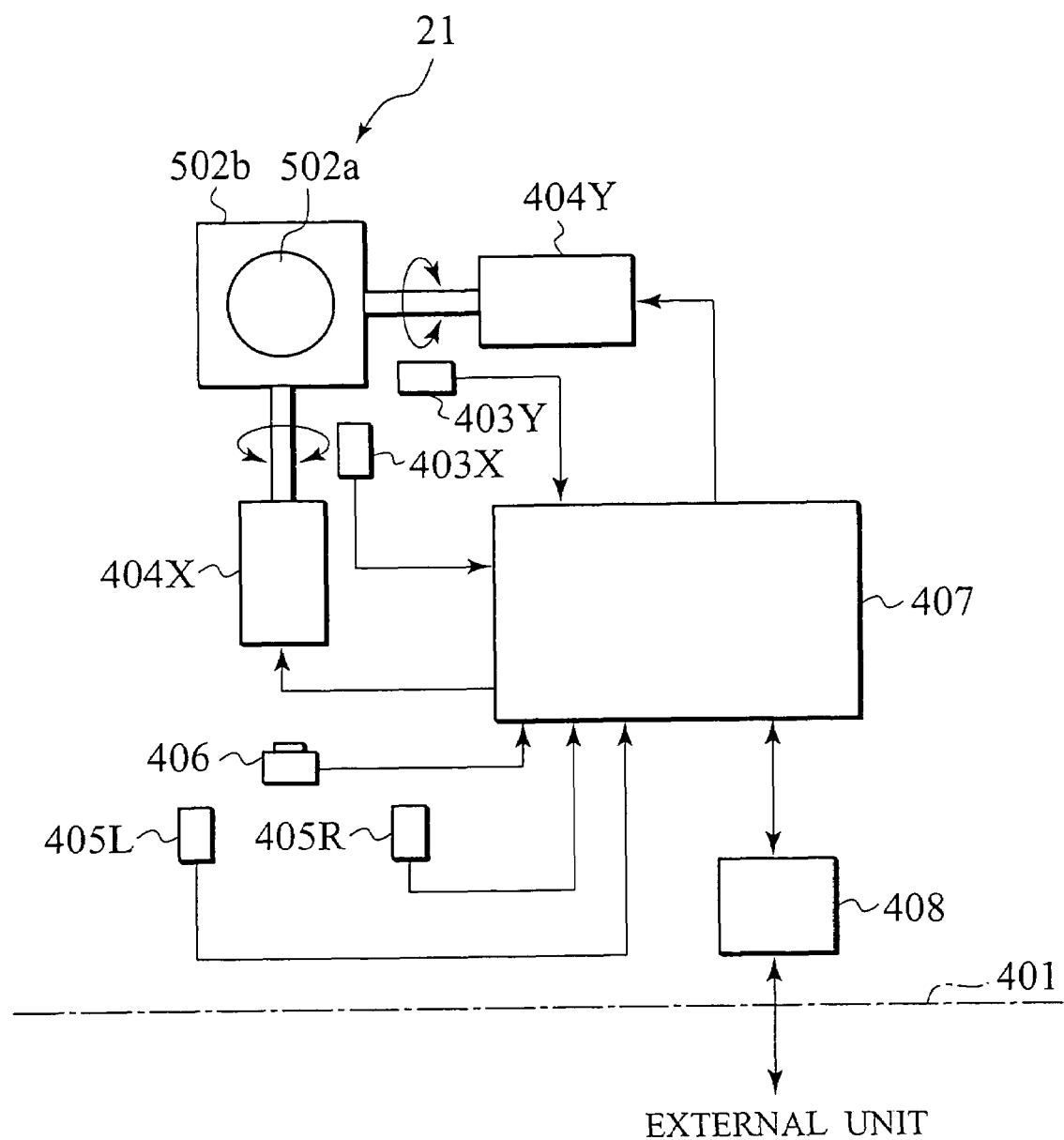
FIG. 4 is a is a view illustrating a hard structure of the joystick input device of the first embodiment.

FIG. 3 is a block diagram illustrating a structure of the joystick input unit of the presently filed embodiment, and FIG. 4 is a view illustrating a hard structural example of the joystick input device.

The joystick input device 401 is comprised of the stick 21 forming an operation terminal, a lateral drive section 404X constructed of an electric motor that produces an output torque in an X-direction of the stick 21, a lateral position detecting section 403X that detects a rotational angle of the stick 21 in the X-direction, a vertical drive section 404Y constructed of an electric motor that produces an output torque in a Y-direction of the stick 21, the infrared sensors 405L, 405R that detect the presence of the hand of the operator for the purpose of discriminating the seated position of the current operator, the cancel switch 406 for inputting a canceling command to disenable the preceding operational input effectuated by the stick 21, and a stick control computing device 407 and a communicating section 408.

The lateral drive section 404X and the vertical drive section 404Y are mounted in such a position as to enable drive of a pedestal 502b that includes a mechanism connected to an operation terminal section 502a of the stick 21 for independent tilting movements in X- and Y-axes.

Further, the lateral drive section 404X and the vertical drive section 404Y are constructed of photo encoders that optically detect the numbers of rotation of the respective electric motors to allow an inclined angle of the pedestal 502b of the stick 21 to be independently detected in the X- and Y-axes, respectively.

The infrared sensors 405L, 405R are constructed of combinations of an infrared LED serving as a light emitting segment and a photo transistors each serving as a light receptor, respectively, and are mounted at the left and right sides of the stick 21 as viewed in FIG. 2. When shielding the infrared sensor by the hand, an infrared light emitted from the infrared LED is reflected to cause the light to be received with the photo transistor which in turn outputs a detection signal.

As shown in FIG. 1, the cancel switch 406 is mounted in front of the stick 21.

The stick control computing device 407 is constructed of an A/D converter circuit which is not shown, a D/A converter, CPU, ROM and RAM and incorporates therein a serial interface that serves as a communicating section 408 to perform communication with an outside unit.

The stick control computing device 407 is operative to judge an operational direction and a relevant operational displacement value of the stick 21 responsive to detected values of the lateral position detecting section 403X and the vertical position detecting section 403Y to allow a selection signal and a selected leg to be detected from the GUI condition that has been inputted. The communicating section 408 outputs the selection signal and the selected leg, delivered from the stick control computing device 407, to an external operation and display process computing section 409 while outputting the current GUI condition, inputted from the operation and display process computing section 409, to the stick control computing device 407.

The stick control computing device 407 also has a function to control a moveable range of the stick 21 through control of the lateral drive section 404X and the vertical drive section 404Y.

The stick control computing device 407 incorporates an operator discriminating section 407a that discriminates the seated position of the current operator in response to the detection signals inputted from the infrared ray sensors 405L, 405R located at the left and right sides of the stick 21 and performs control such that a basic operational direction layout of the stick 21 is determined in response to the current GUI condition (operational types, hierarchy locations and the number of selection legs) to allow the basic operational direction layout to be corrected in dependence on the seated position of the operator identified by the operator discriminating section 407a whereby the stick 21 is shifted in accordance with the operational direction layout.

Figure 9A:
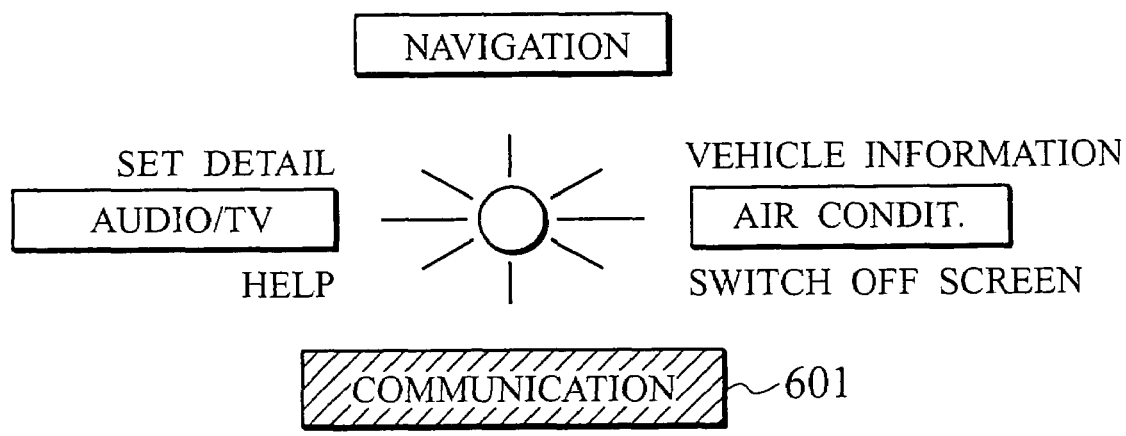
FIGS. 9A and 9B are illustrative views of hierarchy type menus.
Figure 9B:
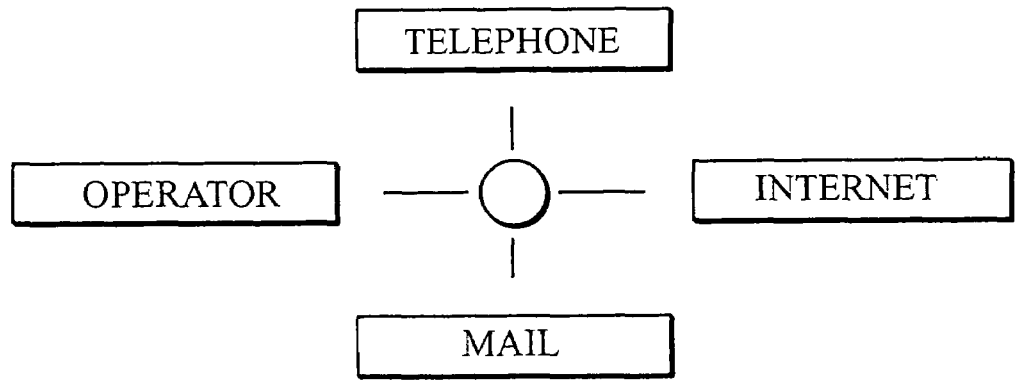

In a case where GUI is formed in a menu pattern as shown in FIG. 9A, the operational direction layout means an eight-way type layout with eight directions being formed as operational directions in one of which the stick 21 is tilted to discriminate a relevant operational direction. In FIG. 9A, if "COMMUNICATION" is selected, a display content of the display 23 is switched to a display of GUI of a menu layout shown in FIG. 9B. The menu layout shown in FIG. 9B represents a four-way type layout.

When the term "operational direction" is hereinafter referred to, it means an operational direction that is displayed by one of operational direction numbers ① to ⑧ associated with selected legs of GUI, respectively. A clockwise angle (an angle θ defined between the center line 121 and the line 122 in FIG. 2) of the stick 21 with respect to the center line 121 is herein referred to as "an operational direction angle" to be distinguished.

Upon operation of the stick 21, the operational failure judgment section 407b, the operational failure memory section 407c and an operational failure analysis section 407d monitor the current GUI condition and detect an occurrence tendency of operational failures for each combination between the basic operational direction layout and the operator's seated position, and the operational direction correcting section 407e corrects the moveable range of the stick 21 to avoid operational failures. Stated another way, the operational direction correcting section 407e serves as an adjusting section for adjusting a moveable mode of the stick 21 to reliably avoid the operational failures as will be clearly understood from a detailed description to be given bellow.

The external operation and display process computing section 409, to which the joystick input device 401 is connected, internally includes a communicating means that is interfaced with the above-described communicating section 408 and is operative to output the current GUI condition to the stick control computing section 407 via the communicating section 408 while at the same time converting the GUI condition into associated operational input signals, based on the selected signals and the selected leg, inputted from the stick control computing device 407 via the communicating section 408, and the current GUI condition, which are outputted to an information process computing section 410.

The information process computing section 410 carries out information processing associated with the operational input signals inputted from the operation and display process computing section 409 and outputs a GUI updating demand to the operation and display process computing section 409 when necessary. The operation and display process computing section 409 produces a display image signal, in dependence on the current GUI condition and the presence of or the absence of the operational input signal, which is outputted to a display 23 to provide an image display of the current GUI condition.

While the presently filed embodiment has been described with reference to the operation and display process computing section 409 and the information process computing section 410 in respective functions, these functions may be integrated and can be realized in a single device.

Next, a basic sequence of control of the stick 21 in the stick control computing device 407 is described below in detail.

Figure 5:
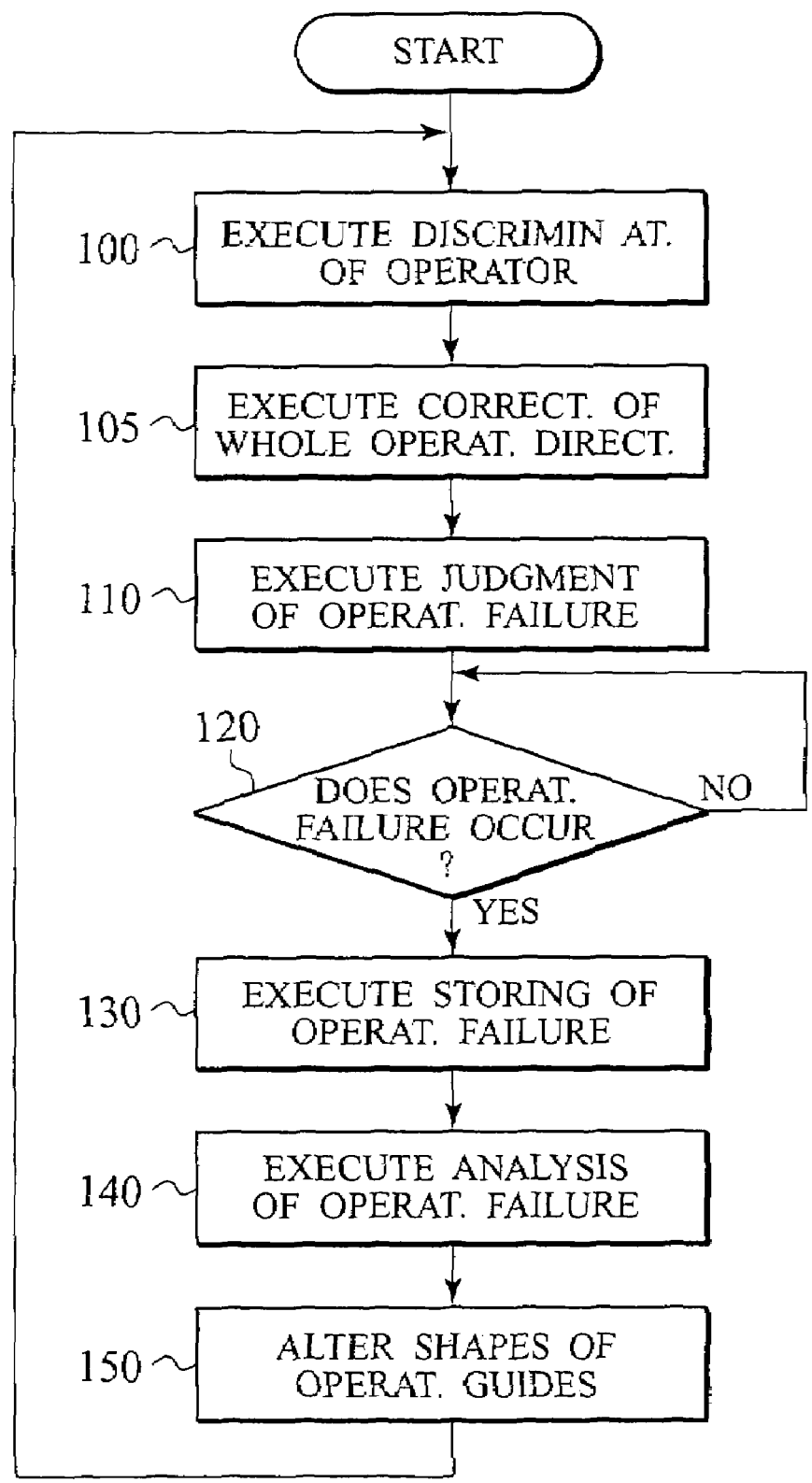
FIG. 5 is a is a flowchart illustrating entire flow of stick control.

FIG. 5 is a flowchart illustrating an entire flow of stick control.

In step 100, the operator discriminating section 407a executes judgment to find whether the current operator is a person who sits on the driver's seat or a person who sits on the assistant driver's seat in response to the detection signals from the infrared ray sensors 405L, 405R located at the left and right sides of the stick 21.

In step 105, the operational direction correcting section 407e performs correction of the basic operational direction layout, determined in compliance with the current GUI condition, in response to the seated position of the operator.

The corrected operational direction layout is used for controlling the lateral drive section 404X and the vertical drive section 404Y and, thus, the stick 21 is allowed to move in accordance with the corrected operational direction layout, thereby allowing a whole operational direction to be corrected depending on the seated position.

Figure 6A:
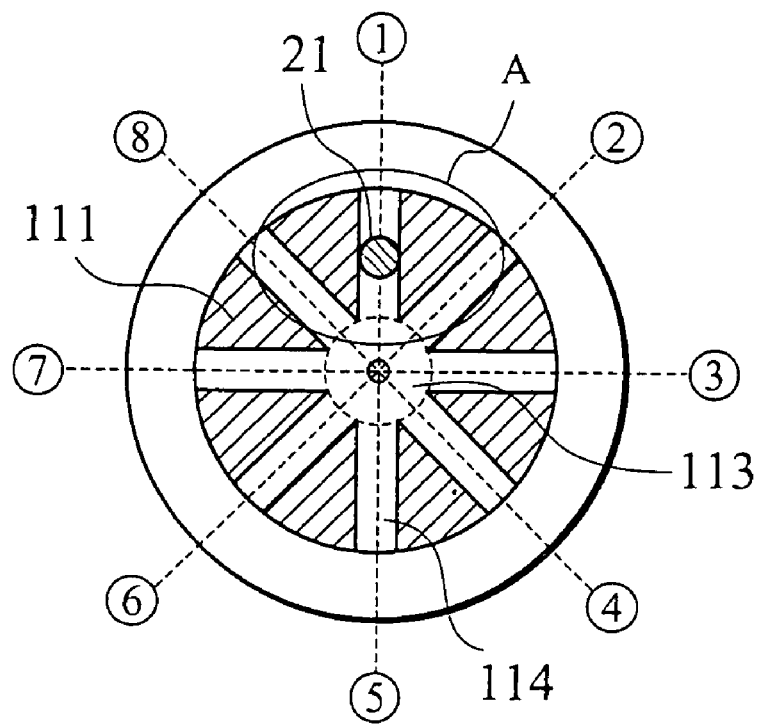
FIGS. 6A and 6B are illustrative views illustrating moveable ranges of a stick.
Figure 6B:
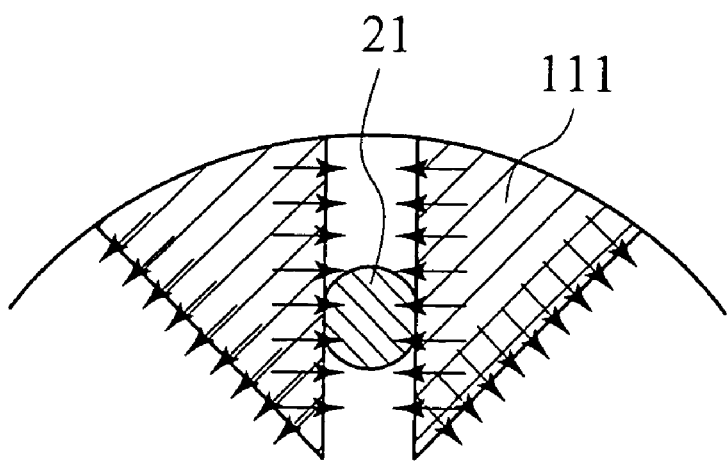

FIGS. 6A and 6B are views illustrating the moveable range of the stick 21.

As viewed in FIG. 6A, operation guides 111 are defined throughout an entire operating range on a circumferential periphery of the stick 21. The operation guides mean regional areas which the stick 21 can not penetrate such that, when the stick 21 tends to enter one of these regional areas, a repulsion is exerted to the stick 21 to cause the same to be returned to the outside from the associated operation guide 111 as viewed in FIG. 6B which shows a portion A in an enlarged scale.

In such a manner, defined between adjacent operation guides 111 is a moveable region 114, and when the stick 21 is tilted in the radial direction from a central play area 113, the presence of substantial alignment of the stick 21 with one of the moveable regions 114 allows the stick 21 to be guided in a desired operating direction. The directions ① to ⑧ of the respective moveable regions 114 form the operational directions in compliance with the respective operational direction layouts.

The operation guides 111 are defined by controlling the lateral drive section 404X and the vertical drive section 404Y depending on the positions (hereinafter referred to as "stick positions") detected by the lateral position detecting section 404X and the vertical position detecting section 404Y when in tilting movement of the stick 21.

Figure 7A:
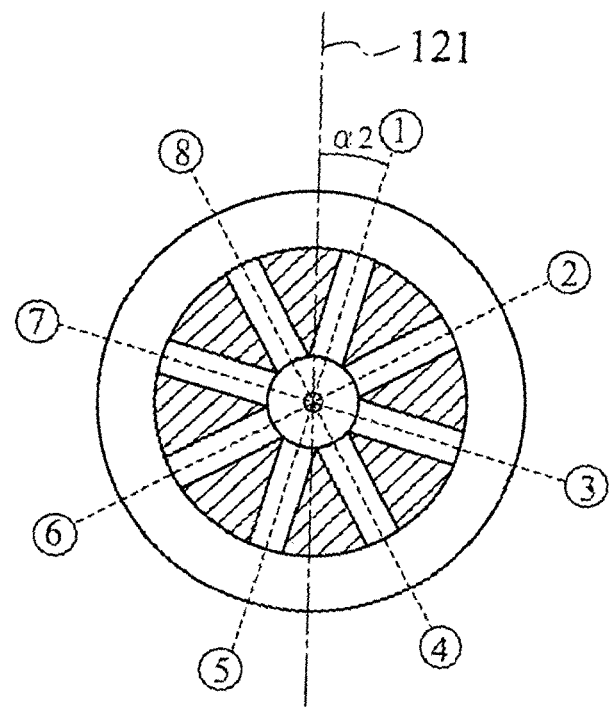
FIGS. 7A and 7B are illustrative views of operation guides with an operational direction of the stick being corrected.
Figure 7B:
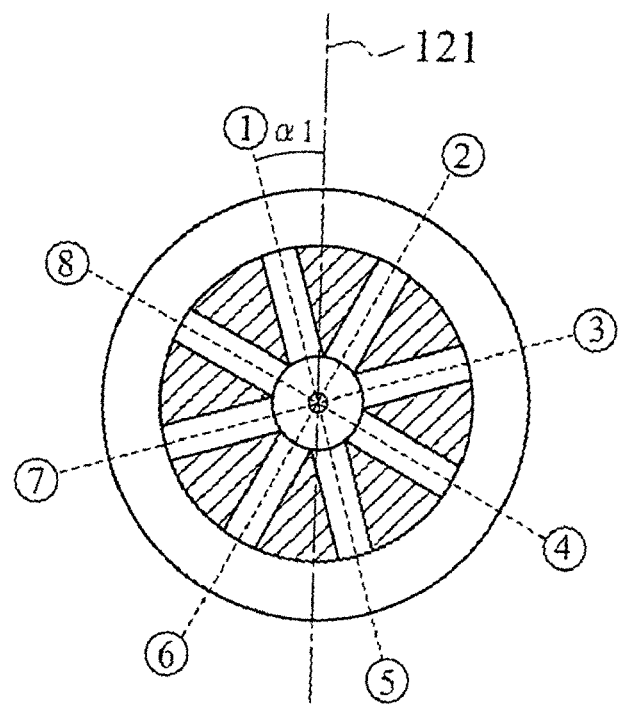

FIGS. 7A and 7B are views illustrating how the operational directions of the stick are corrected.

When the seated position of the operator assumes the left seat, since the hand extends toward the stick 21 located in the center cluster 20 from the left side, the operational directions are entirely rotated clockwise in a manner as shown in FIG. 7A to allow the operational direction ①, enabling the upward operation, to be substantially brought into alignment with the angle at which the hand enters.

When the seated position of the operator assumes the right seat, on the other hand, since the hand extends from the right side, the operational directions are entirely rotated counterclockwise in a manner as shown in FIG. 7B.

Though detailed rotational angles α1, α2 depend on a vehicle compartment layout, the angle α in which the hand extends toward the stick 21 from the operator of the representative body as shown in FIG. 2 is obtained, thereby permitting the entire operational directions to be rotated from the center line 121 at such a resulting angle.

Turning now to FIG. 5, in step 110, the operational failure judgment section 407b executes judgment to find the operational failure occurring during operation of the stick 21. During such operation, the GUI condition is monitored and the selective operations reciprocated through the hierarchy within a given time interval are detected, thereby implementing judgment of occurrence of the operational failure.

And, if the presence of the operational failure is detected in step 120, then in step 130, the operational failure memory section 407c stores an operational failure history in connection with an operational failure frequency, a correct operational frequency and an operational direction in which the operational failure occurs.

In step 140, the operational failure analysis section 407d analyzes the operational failure history stored in the operational failure memory section 407c, thereby detecting a tendency of occurrence i the operational failures.

In step 150, operation is executed to alter the moveable range of the stick 21, that is, the shapes of the operation guides 111 so as to avoid the occurrence of the operational failures.

Next, the operator discriminating operation, the operational failure judgment operation, the operational failure storing operation, the operational failure analyzing operation and the altering operation of the operation guides for avoidance of the occurring tendency of the operational failures set forth above are described in sequence.

First, the seated position discriminating operation for the current operator to be performed by the operator discriminating section 407a is described.

FIG. 8 is a flowchart illustrating flow of the seated position discriminating operation.

In step 200, 210, 240, operation is implemented to check the detecting conditions of the infrared ray sensors 405L, 405R located at the left and right sides of the stick 21. In a case where one of the detection signals of the infrared ray sensors 405L, 405R assumes a detecting condition while the other detection signal remains in a non-detected condition, the seat closer to the infrared ray sensor remaining in the detecting condition is judged to be the seated position of the current operator.

Under the situation shown in FIG. 2, since the right side infrared ray sensor 405R remains in the detecting condition whereas the left side infrared ray sensor 405L assumes the non-detecting condition, operation in step 220 allows assumption that the operator's hand extends from the rightward and the seated position of the current operator is judged to be the right seat.

In contrast, if the right side infrared ray sensor 405R remains in the non-detecting condition whereas the left side infrared ray sensor 405L assumes the detecting condition, operation in step 250 allows assumption that the operator's hand extends from the leftward and the seated position of the current operator is judged to be the left seat.

Next, in a case where both the infrared ray sensors 405L, 405R on both sides remain in the detecting condition or in the non-detecting condition, the seated position of the current operator is judged to be the driver's seat in step 230 or step 260. That is, in case of a right steering wheel vehicle, the seated position is judged to be the right seat and, conversely, in case of a left steering wheel vehicle, the seated position is judged to be the left seat. In a case where both the infrared ray sensors remain in the detecting condition or the non-detecting condition, it is conceivable that a situation occurs where the stick 21 is simultaneously operated from the left and right seats or the hand extends in an extraordinarily assumed direction to perform stick operation and, in any case, due to a priority being given to the driver's operation in the vehicle, the driver's seat is judged to be a proper seat. Under a circumstance where a difficulty is encountered in judgment for the position of the operator based on such assumption, it becomes possible to perform correction of the operational direction suited for the driver.

Now, judging operation of the operational failure to be performed by the operational failure judgment section 407b is described.

Judgment of the operational failure is carried out by switching judgment methods in two ways depending on operation type information that forms one information related to the current GUI condition inputted by the external operation and display process computing section 409.

Operation type information stores therein a binary value code indicative of a hierarchy type menu or a direct input type menu that form the current GUI. The hierarchy type menu means a menu of the form wherein, when he menu is selected by stick operation, GUI is updated to reform a menu different from the preceding menu. In particular, if "COMMUNICATION" 601 is selected from the eight-selection menu shown in FIG. 9A, GUI is switched to the display of FIG. 9B, forming a differing menu structure. The eight-selection means eight selection legs.

Figure 10A:
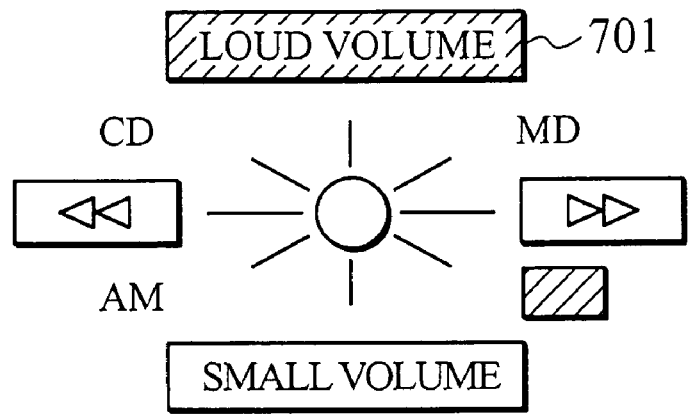
FIGS. 10A and 10B are illustrative views of direct input type menus.
Figure 10B:
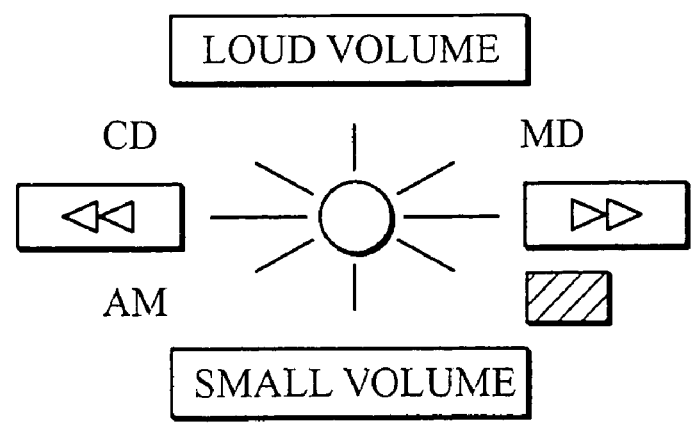

Meanwhile, the direct input type menu is a menu of the form wherein, even if the menu is selected through stick operation, no variation takes place in the menu structure and the menu selection legs per se are treated as direct input operations for associated equipments. In particular, if "INCREASE SOUND VOLUME" 701 as shown in FIG. 10A is selected, the sound volume of the speaker quickly increases in one stage but no change occurs in the menu structure as viewed in FIG. 10B. In such a way, judgment for the differing operational failures is performed based on such operating types of the current GUI.

Figures 11A, 11B:
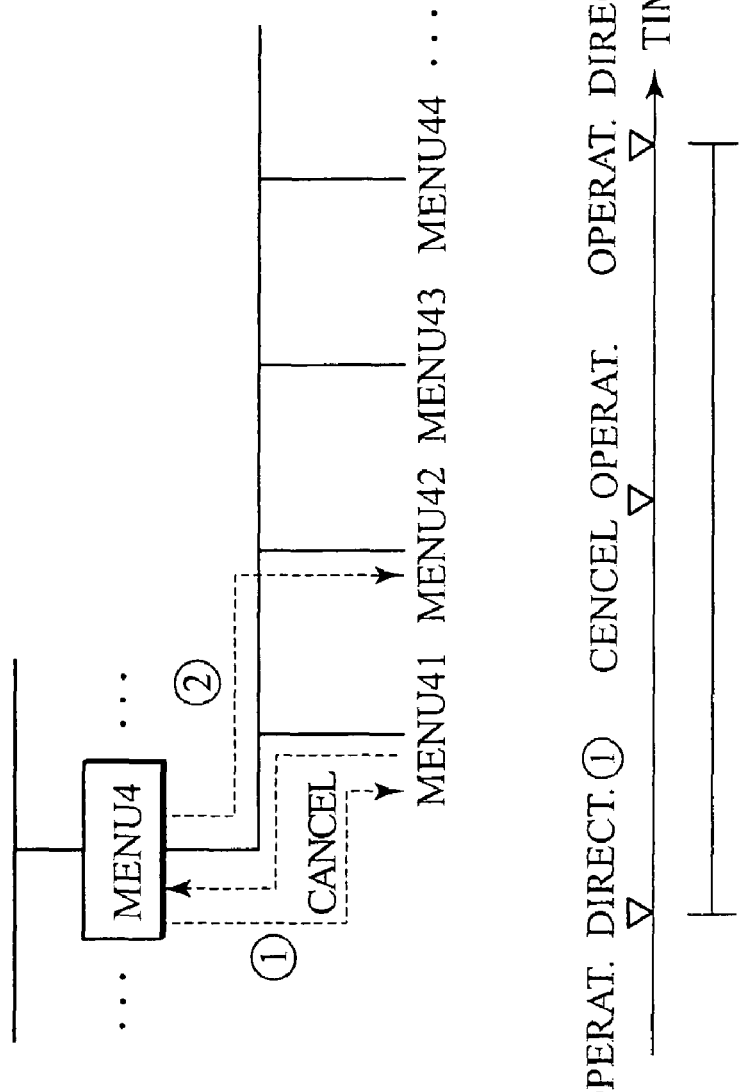
FIGS. 11A and 11B are illustrative views for operational failures judgments in the hierarchy type menu.

First, in a case where the operating type includes the hierarchy menu, as shown in dotted lines in FIG. 11A, it is supposed that the menu 4 (MENU 4) is selected on a menu screen of a certain higher rank hierarchy (hierarchy 1) through stick operation whereupon menu 41 (MENU 41) is selected on a menu screen of a succeeding lower rank hierarch (hierarchy 2) and, thereafter, canceling operation is executed to select a differing menu 42 (MENU 42) again. During such selection, if such a series of operations shown in FIG. 11B are carried out within a time interval less than a given time, an initial selective operation is judged as an operational failure while permitting the operational direction in which the initial selective operation is performed is judged as a "failed operating direction" and the operational direction in which re-selective operation subsequent to the canceling operation is judged to be a "correct operating direction".

Here, measurement of the operation time interval is initiated at a time instant when the selective operation is executed and terminated at the timing when the subsequent selective operation is carried out. That is, when commencing an initial time measurement, such measurement is terminated each time the selective operation is executed and afterward, commencement of new time measurements are repeatedly carried out at the same time.

Accordingly, at a timing when the selective operation is performed and measurement of the operating time interval is terminated, the operating failure judgment section 407b judges whether the selecting time interval is less than the given time interval. When this takes place, if the measured time interval is less than the given time interval, then operation is made to check whether the operation, that has been carried out in such time interval, involves one time canceling operation being reciprocated between the current hierarchy and the preceding hierarchy. And, if the operation is regarded to involve the reciprocating operations between the hierarchies, such operation is judged as the operational failure, and the operational direction in which the initial selective operation is performed is regarded as the "failed operational direction" while the operational direction in which the re-selective operation is performed is regarded as the "correct operational direction", with a judged result being outputted to the operational failure memory section 407*b*.

Here, if a preceding operational direction and a subsequent operational direction for re-selective operation are identical, preliminary judgment is made that the operational failure occurs, with the operational failure frequency being stored in a buffer. And, if the subsequent operation is judged to be the operational failure, the operational failure frequency stored in the buffer is added to form the operational failure frequency. Such operations are provided to enable the consecutive operational failures to be counted on the assumption that, when trying to select a certain operational direction, the operator makes the operational failures in more than two consecutive times for adjacent operational directions.

Figure 12A:
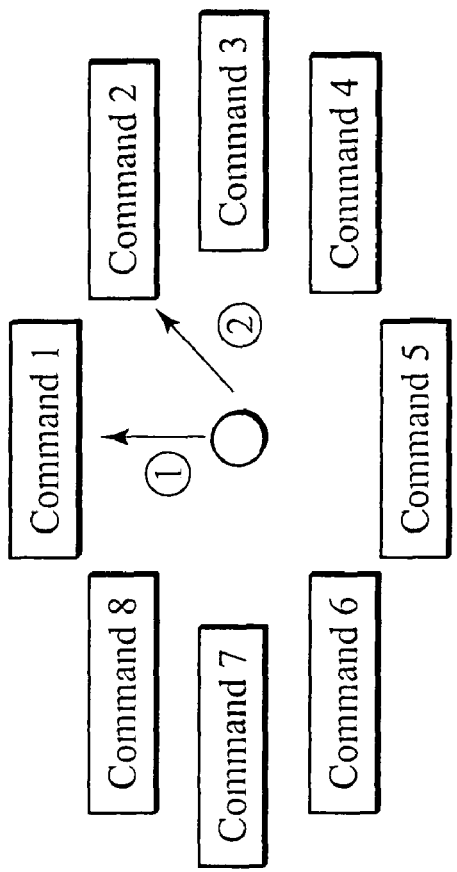
FIGS. 12A and 12B are illustrative views for operational failures judgments in the direct input type menu.
Figure 12B:
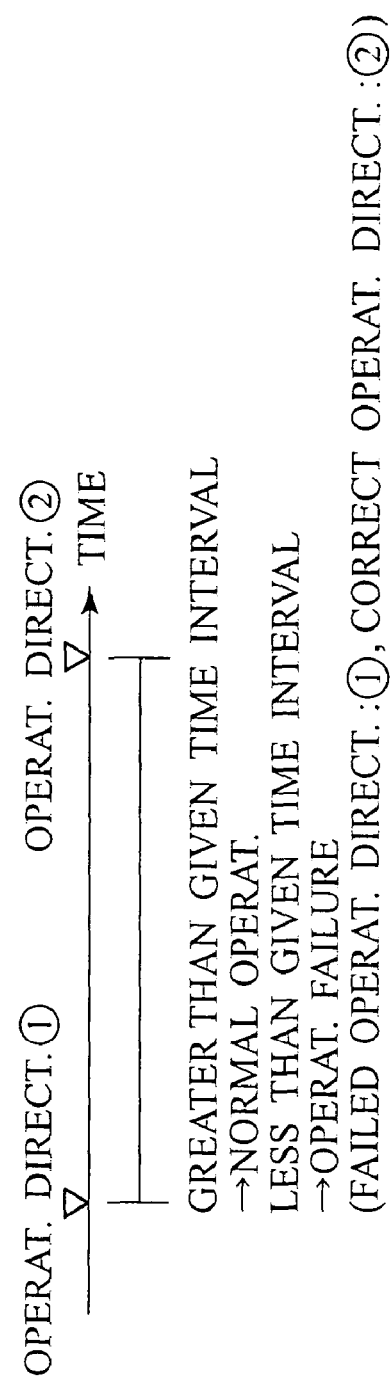

Next, in a case of the operating type formed by the direct input type menu, as shown in FIG. 12A, if the menu (Command 1) is selected upon stick operation and subsequently a different menu (Command 2) is selected again, that is, in case of such a series of operations being executed in a time interval less than the given time interval as illustrated in FIG. 12B, the operational failure judgment section 407*b* makes judgment, in that the operational failure occurs, and the operational direction in which the preceding selective operation is performed is judged as the "failed operational direction" while the operational direction in which the subsequent re-selective operation is performed is judged as the "correct operational direction". Here, measurement of the operating time interval is commenced at the timing when the selective operation is executed like in the case of the hierarchy menu and is terminated at the timing when the subsequent selective operation is executed. That is, upon commencement of the initial measurement, subsequently, operations are carried out for termination of and commencement of the measurement in a repeated fashion for each selective operation. Also, during such operations, no canceling operation takes place.

Consequently, the operating failure judgment section 407*b* allows the selective operation to be performed and, at the timing when the measurement of the selective operation is terminated, operation is made to check if the operation time interval is less than the given time interval. In this case, if the operation time interval is less than the given time interval, then the judgment results in the operational failure, thereby outputting that the initial operational direction is regarded to be "failed operational direction" and the operational direction of the re-selective operation is regarded to be the "correct operational direction". Here, in a case where the preceding operational direction and the operational direction of the subsequent re-selective operation are identical, the preliminary judgment is executed as the operational failure like in case of the hierarchy type menu and the number of operational failures is stored in the buffer. And, in an event that the subsequent operation is judged to be the operational failure and the "failed operational direction" and the "correct operational direction" are enabled to be differentiated from one another as separate operational directions, the number of operational failures stored in the buffer is added to provide the number of operational failures.

Figure 13:
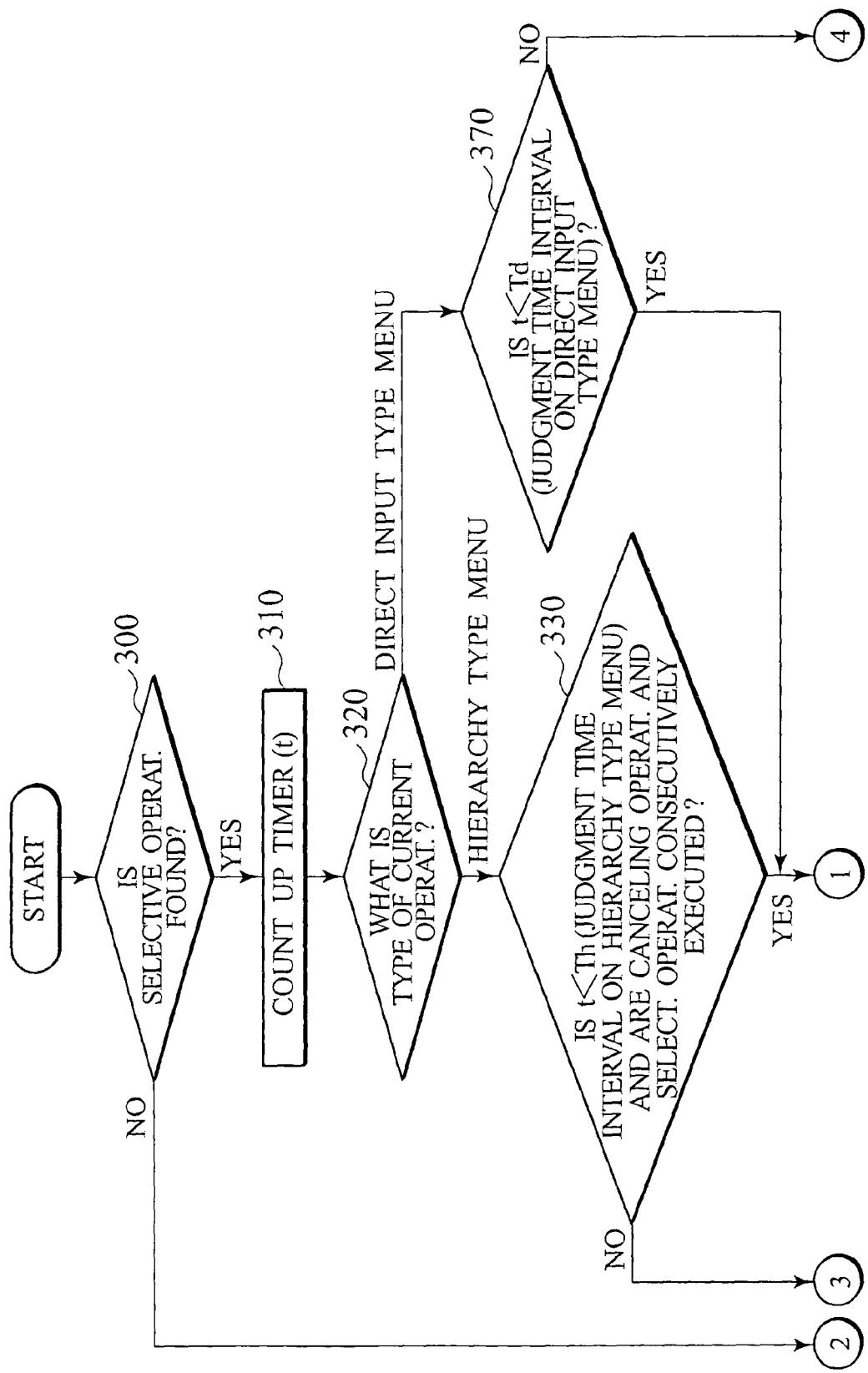
FIG. 13 is a is a flowchart illustrating flow of operational failure judgment operation.
Figure 14:
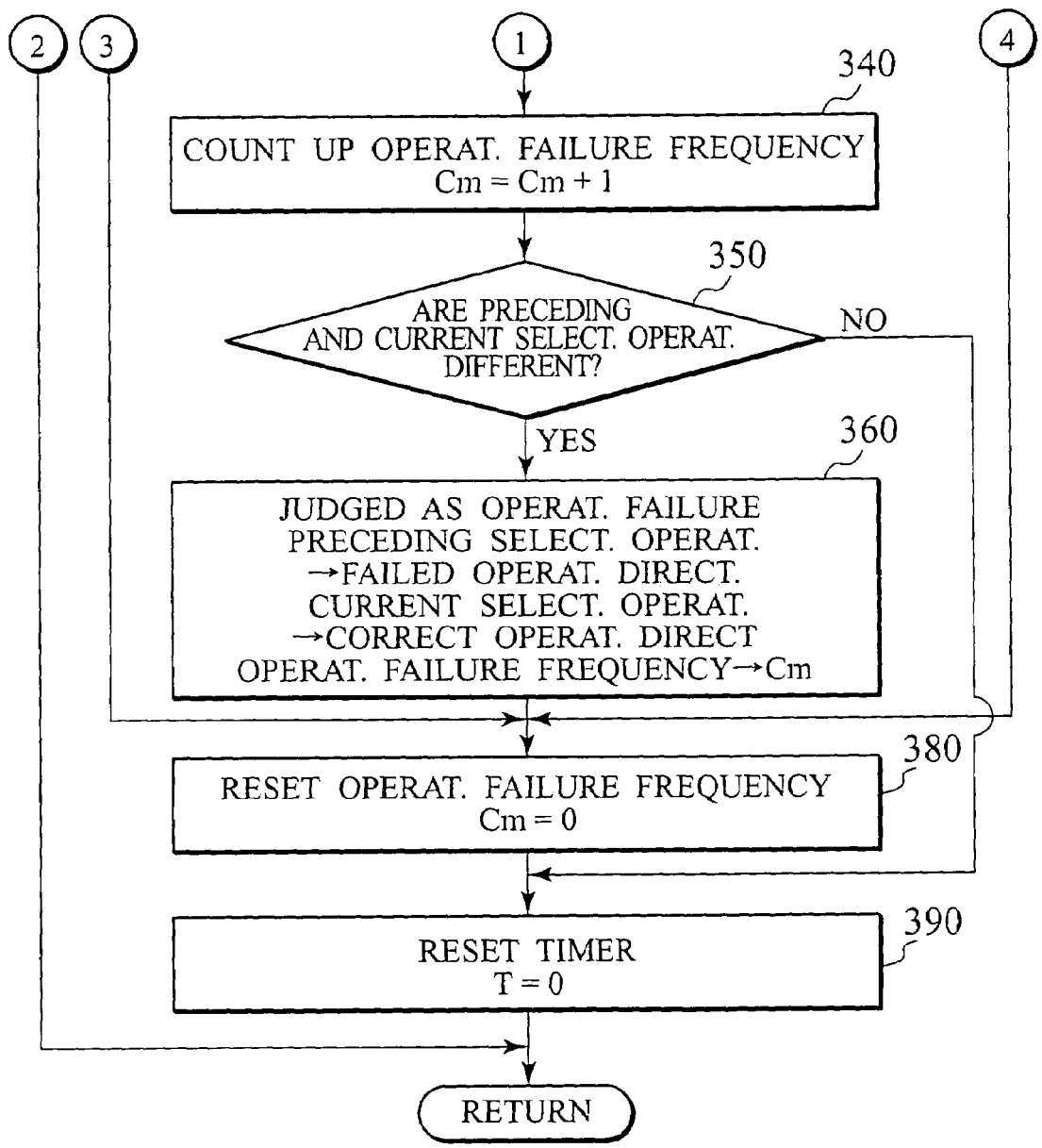
FIG. 14 is a is a flowchart illustrating flow of operational failure judgment operation.

FIGS. 13 and 14 are flowcharts illustrating basic sequences of operations of the operational failure judgment operation.

That is, in step 300, if judgment is made to find the selective operation, then in step 310, counting-up operation of a timer is commenced.

In consecutive step 320, judgment is made to find the operation type of the current GUI responsive to operation type information and, in case of the hierarchy menu, flow proceeds to step 330 whereas, in case of the direct input menu type, flow is routed to step 370.

In succeeding step 330, operation is made to judge if new selective operation is made. In the presence of the new selective operation, an elapsed time interval of the timer is detected and, if the detected time interval t is found to be less than a time interval Th that has been set and the canceling operation is made prior to the selective operation, flow is routed to step 340.

In step 370, judgment is made to find if the new selective operation is made like in step 330 and, if the selective operation is found, then the elapsed time interval of the timer is detected whereas if the detected time interval t is judged to be less than the time interval Td that has been set, flow is routed to step 340.

In step 330 and step 370, if no judgment conditions set forth above are satisfied, flow proceeds to step 380.

In step 340, the number Cm of times of the operational failures stored in the buffer is counted up to increase by one.

In step 350, operation is made to check if the preceding selective operation and the current selective operation are involved in the same content whereupon if a difference exits, then in step 360, judgment is made that the preceding selective operation belongs to the operational failure and the current selective operation is the correct operation, thereby outputting the number Cm of times of the operational failures stored in the buffer to the operational failure memory section 407*c*. Thereafter, flow proceeds to step 380.

In step 380, operational failure frequency stored in the buffer is reset and, in step 390, the timer is reset whereupon flow is routed to step 300.

If the preceding selective operation and the current selective operation checked in step 350 have the same content, then flow is routed to step 309 due to a liability of the current selective operation being involved in the operational failure. The number Cm of the operational failure frequency stored in the buffer is not reset and carried over for the next time.

Now, the operational failure storing operation of the operational failure memory section 407*c* is described.

Figure 15A:
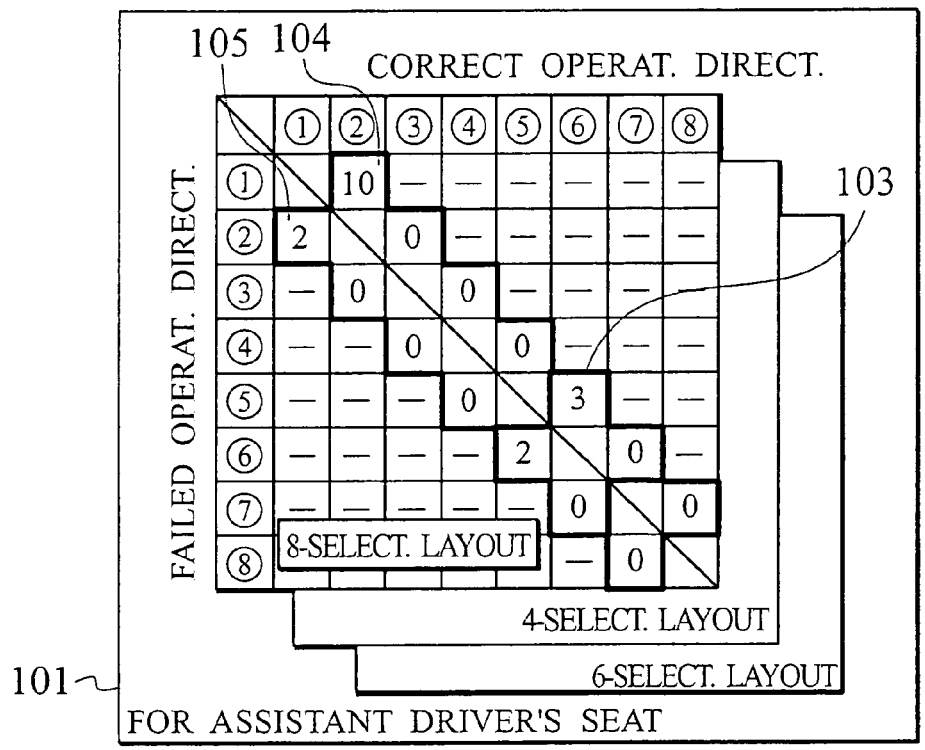
FIGS. 15A and 15B are illustrative views showing a storing procedure of operational failures.
Figure 15B:
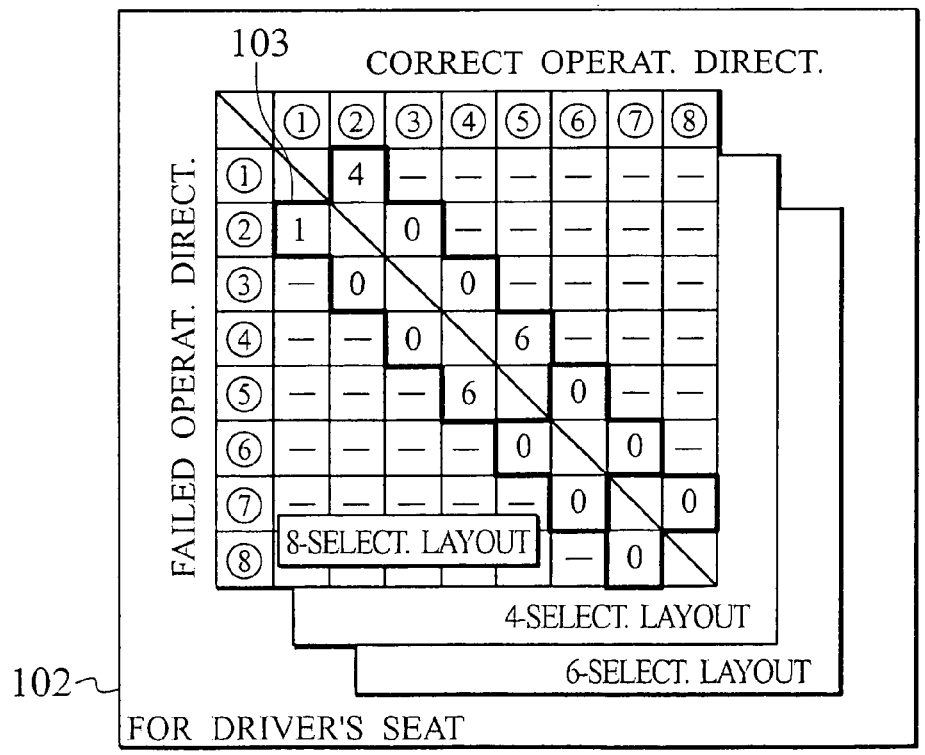

If the occurrence of the operational failure, the "failed operational direction" and the "correct operational direction" are outputted from the aboveOdescribed operational failure judgment section 407*b*, the operational failure memory section 407*c* counts up columns corresponding to the "failed operational failure" and the "correct operational failure" on an operation history table of two-dimensional arrays shown in FIGS. 15A, 15B. This operation history table is comprised of an assistant driver component 101 and a driver component 102, which are prepared for respective operational direction layouts.

In the presently filed embodiment, the operational direction layout includes three kinds of layouts including four selective legs, six selective legs and eight selective legs and the three kinds of tables are prepared for the assistant driver's seat and the driver's seat, respectively.

Accordingly, the operational failure memory section 407*c* allows an associated operation history table to be shifted on the basis of the seated position of the operator identified by the operator discriminating section 407*a* and the number of selective legs forming one of information of the GUI condition inputted from the operation and display process computing section 409 whereupon the operational failure is counted up.

Further, in the presently filed embodiment, since the operational failure analysis in the operational failure analysis section 407*d* which will be described below is intended only for the adjacent operational direction with respect to the certain operational direction, the count-up operation of the operational failure is carried out only for combined columns (a region 103 surrounded by a solid line in FIGS. 15A, 15B) between adjacent operational directions.

In the presently filed embodiment, although a concept of the table is visualized in images shown in FIGS. 15A, 15B, it has a substance that is formed in a memory area of the stick control computing section 407 which may be freely designed in allocating a memory as far as the count-up of the operational failures is managed by separate combinations between the failed operational direction and the correct operational direction for each layout of the seated position of the operator and the operational direction.

Figure 16:
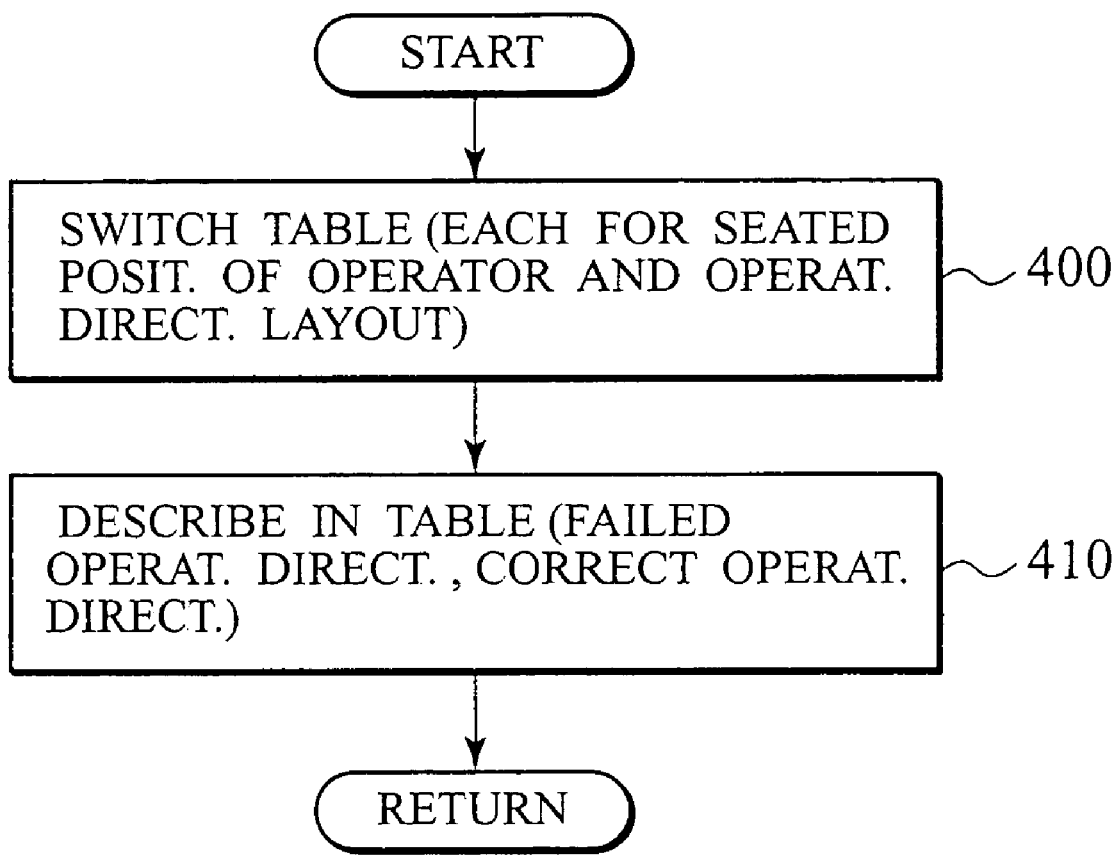
FIG. 16 is a flowchart illustrating flow of operations in an operational failure memory section.

FIG. 16 is a flowchart illustrating flow of operations in the operational failure memory section.

That is, in step 400, the operation history table is switched depending on the seated position of the operator, identified by the operator discriminating section 407*a*, and the kind of the operational direction layout.

In step 410, operation is executed to store those, which are inputted from the operational failure judgment section 407*b* and wherein the operational failure and the correct operation are adjacent to one another, into the associated column of the operation history table.

Now, the operational failure analyze operation of the operational failure analysis section 407*d* is described.

The operational failure analysis section 407*d* monitors the respective operation history tables that have been counted up in the operational failure memory section 407*c* and checks if a sum of the frequencies of the mutually related operational failures between a certain operational direction and an adjacent operational direction. In particular, in case of FIG. 15A, the sum of frequencies of the operational failures, that have occurred in the operational direction ① and the operational direction ② associated with the assistant driver's seat, is calculated by adding a number of two times (104), where the operational direction ① is intended to be selected but the operational direction ② happens to be selected, and a number of ten times (105) where the operational direction ② is intended to be selected but the operational direction ① happens to be selected, thereby counting to provide a result of twelve times.

Subsequently, in a similar fashion, the frequencies of the operational failures occurring in the mutually related relationship between each operational direction and the adjacent operational direction are added, thereby extracting a combination of which sum of these parameters exceeds a given frequency. Thus, it becomes possible for an area, in which the operational failure is liable to occur, to be specified. If it is supposed that the given frequency is assigned to be twelve times, in examples shown in FIGS. 15A and 15B, a combination between the operational directions ① and ② in the assistant driver's seat side and a combination between the operational directions ④ and ⑤ in the driver's seat side are extracted as areas in which the operational failures are apt to occur.

Subsequently, with respect to the combination of the operational directions extracted as the areas liable for the operational failures to occur, comparison is made between the frequency where one operational direction is intended to be selected but the other operational direction happens to be selected and the frequency of vice versa, thereby making judgment if a deviation occurs between these factors. The judging method may include a step of judging if a discrepancy between the two factors are greater than a given value or a step of conducting a statistical test. A concrete method in the latter case is carried out by making a null hypothesis H0 such that, under a condition where no discrepancy occurs in the frequency between two parameters, the operational failures tend to occur from one of the operational directions to the other one of the operational directions at a ½ probability and by making the test of the null hypothesis in terms of the probability in occurrence of the frequency of actually happened operational failures.

In an example of combination between the operational directions ① and ② on the assistant driver seat side shown in FIG. 15A, a probability P where the frequency in occurrence of selecting the operational direction ② in place of the intended operational direction ① is two times (104) and the frequency in vice versa is ten times (105) is expressed as $$P=\{12!/(12!\cdot 0!)\cdot (1/2)12+12!/(11!\cdot 1!)\cdot (1/2)12+12!/(10!\cdot 2!)\cdot (1/2)12\}\cdot 2=0.039.$$

By testing this numeric value at a level of significance less than 5%, the null hypothesis H0 can be dismissed by 0.039<0.05, that is, the combination between the operational directions ① and ② enables judgment that the discrepancy occurs.

As set forth above, with respect to the combination of the operational directions extracted as the area liable for the operational failure to occur, comparison is executed between the frequency, in which one of the operational directions is intended to be selected but the other one of the operational directions happens to be selected, and the frequency in vice versa, with a result indicative of whether the discrepancy exists in both factors being outputted.

Figure 17:
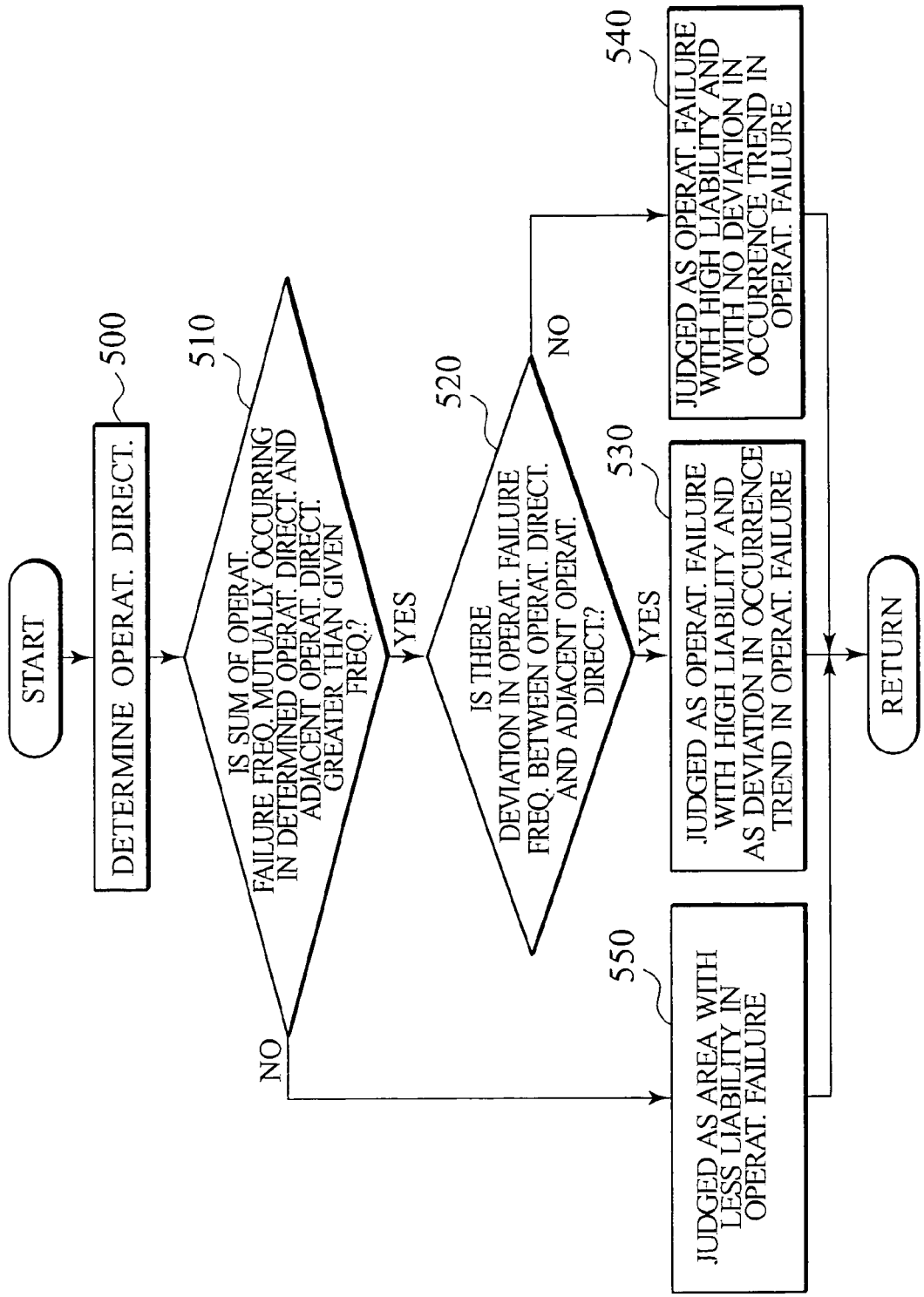
FIG. 17 is a flowchart illustrating flow of operations of an operational failure analysis section for detecting a tendency of operational failures.

FIG. 17 is a flowchart illustrating flow of operations, for detecting a tendency of the operational failures, to be executed in the operational failure analysis section 407*d*.

In step 500, operation is implemented to determine the operational direction for detecting the operational failures. This step is so configured such that, in order to detect the operational failures in terms of the whole operational direction, operation is executed to switch the operational direction from one to the other one for each flow.

In step 510, operation is implemented to read in the operational failure frequency in the determined operational direction and the adjacent operational direction and a sum thereof is calculated. Then, judgment is made to find if the calculated value is greater than 12 that is the given value. With the calculated value being greater than 12, flow proceeds to step 520 and, if not, flow is routed to step 550.

In step 520, the above-described statistical calculation is implemented to judge if the discrepancy occur in the operational failures between the operational direction and the adjacent operational direction.

In the presence of the discrepancy, in step 530, it is judged that the operational failures are liable to occur in both the operational directions and there is the discrepancy.

In the absence of the discrepancy, in step 540, it is judged that both the operational directions have the areas liable for the operational failures to occur and there is no discrepancy.

In step 550, there are a few sum number of the operational failures and, so, it is judged that the area is hard for the operational failure to occur.

Subsequent to steps 530, 540, 550, flow is routed back to step 500 and the above-described operations are repeatedly executed for a subsequent operational direction.

Now, altering operation for the operation guides to avoid the operational failure is described.

The correcting section 407e of the stick control computing section 407 operates so as to deform the shape of the operation guide between the one operational direction and the adjacent operational direction depending on the combination, outputted from the operational failure analysis section 407d, for the operational directions in which the operational failures are liable to occur, the frequency, where one operational direction is intended to be selected but the other operational direction happens to be selected, and the presence or the absence of the discrepancy in the frequency in vice versa.

When trying to select one of the operational directions, if there is a discrepancy between a frequency of selecting the other one of the operational directions and a frequency of vice versa, the shape of the relevant operation guide is deformed so as to alleviate the operation guide 111 at one side thereof closer to one operational direction, with a high probability in frequency of occurrence of the operational failures, toward the other operational direction.

Figure 18A:
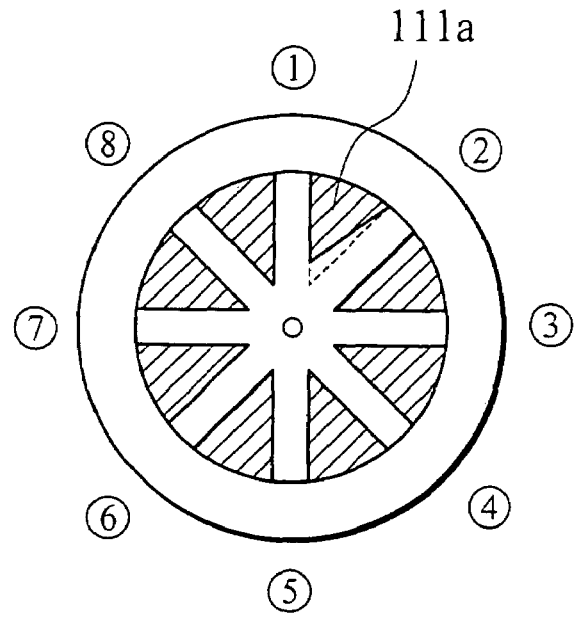
FIGS. 18A and 18B are illustrative views showing a deforming procedure of the operation guide for avoidance of the operational failures.

In an operational failure analyzing example related to the assistant driver's seat shown in FIG. 15A, since a frequency of tendency in selecting the operational direction ① regardless of intension to select the operational direction ② is analyzed to be higher than that of the case in vice versa, one side surface of the operation guide 111a, by which the operational directions ① and ② are defined, that is closer to the operational direction ② is alleviated toward the operational direction ① as viewed in FIG. 18A, providing an ease of guide for the stick 21 toward the operational direction ②. Then, when deformation of such an operation guide profile is carried out, the operational failure frequency in the relevant column of the operational failure memory section 407c is reset (cleared to zero).

Figure 18B:
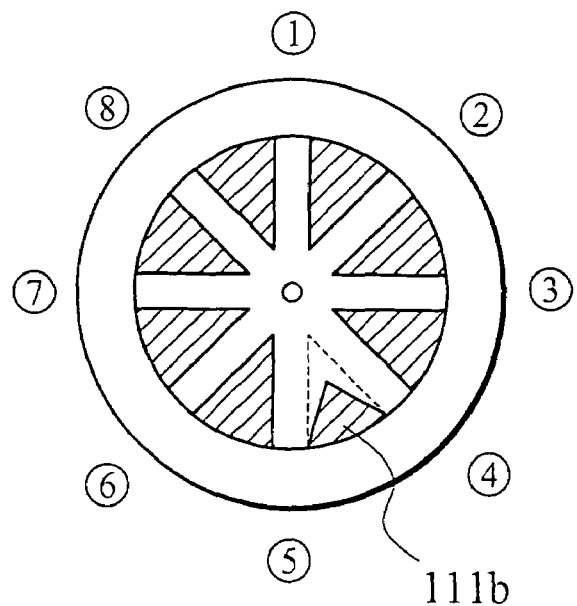

In an operational failure analyzing example for the driver's seat shown in FIG. 15B, since no discrepancy is analyzed between a frequency of tendency in selecting the operational direction ⑤, regardless of intension to select the operational direction ④, and that of the case in vice versa, both side surfaces of the operation guide 111b between the operational directions ① and ⑤ are equally alleviated as viewed in FIG. 18B, thereby expanding a specific zone toward which the stick begins to be guided to provide an ease of increasing tolerance in operational sway. Thus, when carrying out operation to deform such an operation guide profile, the operational failure frequency in the relevant column of the operational failure memory section 407c is reset (cleared to zero).

Although a concrete amount of alleviation of the operation guide is required to be determined depending on the maximum operational displacement value of the joystick input device, fundamentally, the operation guide is progressively alleviated in a stepwise manner with a need for consideration not to sacrifice the original guiding effect of the operation guide. To this end, it is preferable for an intersecting angle between the operational direction of the stick 21 and the guide direction of the operation guide is limited to an angle below 45 degrees.

And, once the deforming operation is executed, the operational direction correcting section 407e stores the deformed profile and, in a subsequent operation, performs control so as to form the operation guide in such a profile.

Figure 19:
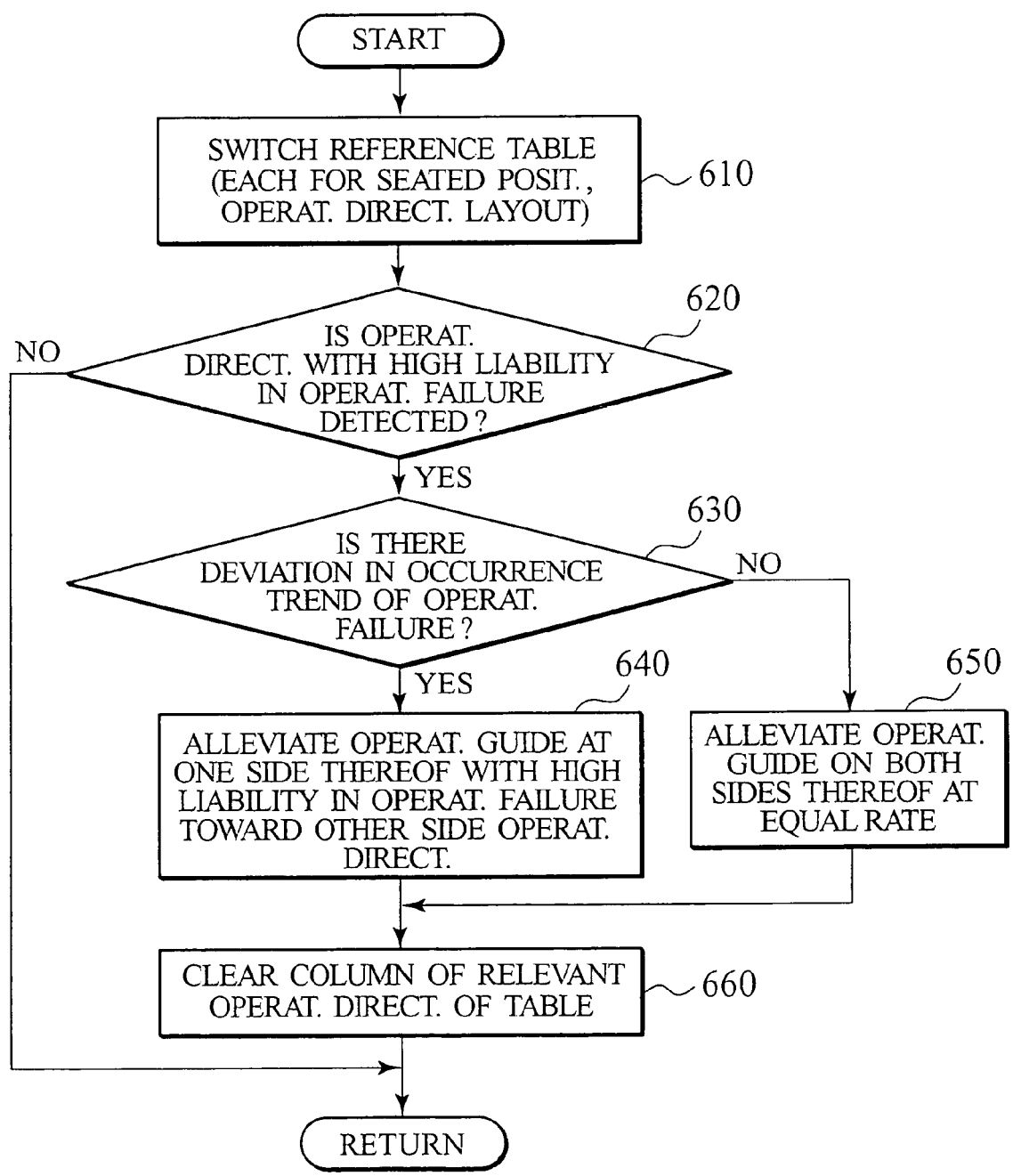
FIG. 19 is a flowchart illustrating flow of deforming operation of a correcting section.

FIG. 19 is a flowchart illustrating flow of deforming operation of the operation guide to be performed in the operational direction correcting section 407e.

First, it is supposed that the operational direction of the stick remains at a position in which the entire operational directions are rotated at a given angle depending on the seated position of the operator.

In step 610, operation is executed to allow the operation history table for storing the operational failures to be switched based on the basic operational direction layout determined in correspondence with the seated position of the operator and the number of selective legs of the current GUI.

In step 620, judgment is made to find if the area liable for the operational failure to take place is detected. Upon detection of such an area, flow proceeds to step 630 and, if not, flow is routed back to step 610.

In step 630, judgment is made to find if there is a discrepancy in the occurrence tendency of the operational failures in the mutually related operational directions. Upon detection of the discrepancy, the side surface of the operation guide, closer to the area liable for the operational failure to take place, is deformed in step 640 toward the adjacent operational direction.

In step 650, since no discrepancy exists in the occurrence tendency of the operational failures, both sides of the operation guide are alleviated at an equal rate.

Subsequent to operations in steps 640, 650, in step 660, the column of the relevant operational direction on the operation history table is cleared to zero.

With such a structure of the presently filed embodiment set forth above, the joystick input device, adapted to be installed on the center cluster 20 of the vehicle, is so configured as to allow the seated position of the operator to be discriminated and to allow the operational direction to be rotated such that when the operator naturally stretches his hand in one direction toward the stick 21 from the current seated position, such one direction allows the operator to perform upward operation, resulting in reduction of deviation in operation caused by the positional relationship between the seated position and the stick position.

In such a way, the operational direction correcting section 407e serves as the moveable mode adjusting section and modifies the profile of the stick 21 for thereby adjusting the moveable mode of the stick 21 to avoid the operational failures.

Further, since operations are executed to judge, store and analyze the operational failures for every operator's seated position and layout of the operational direction whereupon operation is further implemented to alter the operation guide so as to absorb the deviation in the operational direction with a high occurrence frequency of the operational failures resulting in the deviation in the operational direction or the operation guide is altered so as to tolerate sway of the operational direction where the occurrence frequency of the operational failures is high but no deviation in the operational direction takes place, the joystick input device is able to adapt circumstances where deviation or sway of the operation take place due to disturbances such as a peculiarity or the body of the operator, the presence of or the absence of the driver's task and vibrations of the vehicle while enabling reduction in the operational failure.

While the presently filed embodiment has been described in connection with the above-described operational failure judgment section 407b, the operational failure memory section 407c, the operational failure analysis section 407d and the operational direction correcting section 407e whose operations are internally processed in the stick control computing device 407, a system may be provided to allow such operations to be carried out in an external device such as the operation and display process computing section 409 such that a resulting occurrence tendency of the operational failures is outputted to the stick control computing device 407 via the communicating section 408.

However, in such case, although outputting occurrence tendencies of the operational failures related to the whole of the operational directions step by step provides an increase in the amount of communication between the stick control computing device 407 and the operation and display process computing device 409, it becomes possible to enhance a real-time operating property provided that countermeasures are taken for reducing the amount of communication by outputting only the occurrence tendency of the operational failures related to the relevant operational direction at the timing when the operational failure frequency exceeds a given threshold value.

Further, while the presently filed embodiment has been described in conjunction with an example where as the operator discriminating section, use is made for the signals delivered from the infrared sensors which are able to sense in a non-contact relationship, when using an electrical capacitance sensor or a pressure sensitive sensor, in which a contact to the sensor is a premise, in place of the infrared sensors, the sensors may be similarly located on the same positions.

That is, in case of the joystick 21 being located on the center cluster 20 as shown in FIG. 2, since the palm portion in the vicinity of the root of the thumb is brought into contact with the instrument panel when in support during the operation, placing the electric capacitance sensors or the pressure sensitive sensors at the same positions of the infrared sensors enables the operator's seated position to be similarly identified.

In addition, while the presently filed embodiment has been described with reference to the joystick input device adapted to allow the stick, serving as the operating terminal, to be tilted to perform inputting, a multiple-way input device may be adopted which includes an operating terminal composed of a mouse adapted to allow an input by sliding the mouse in a radial direction from a center position and, in such modification, the sensors may be similarly arranged for identifying the operator. However, if the amount of slide (stroke) is large, since the hand position is shifted during the operation, the sensor positions may be determined to provide left and right separations from one another in consideration of a covered area of the hand. Moreover, in case of use of contact type sensors such as the electric capacitance sensors or the pressure sensitive sensors, a sensing surface area may be determined so as to cover an entire contact surface area in consideration of movements of the hand.

Next, a second embodiment of the present invention is described with reference to the drawings.

The second embodiment differs from the first embodiment in that, first, no infrared sensors are provided in a joystick input device 407A. Thus, the operator discriminating section is removed from the stick control computing device 407A.

Next, in the second embodiment, the operator discriminating section and the operational direction correcting section are dispensed with, and the stick control computing section 407A includes an operation load control section 407f, that serves as an adjusting section for adjusting a moveable mode of the stick 21, and an operation monitor section 407g. Thus, a difference exits between methods of controlling operations of the stick 21.

Figure 20:
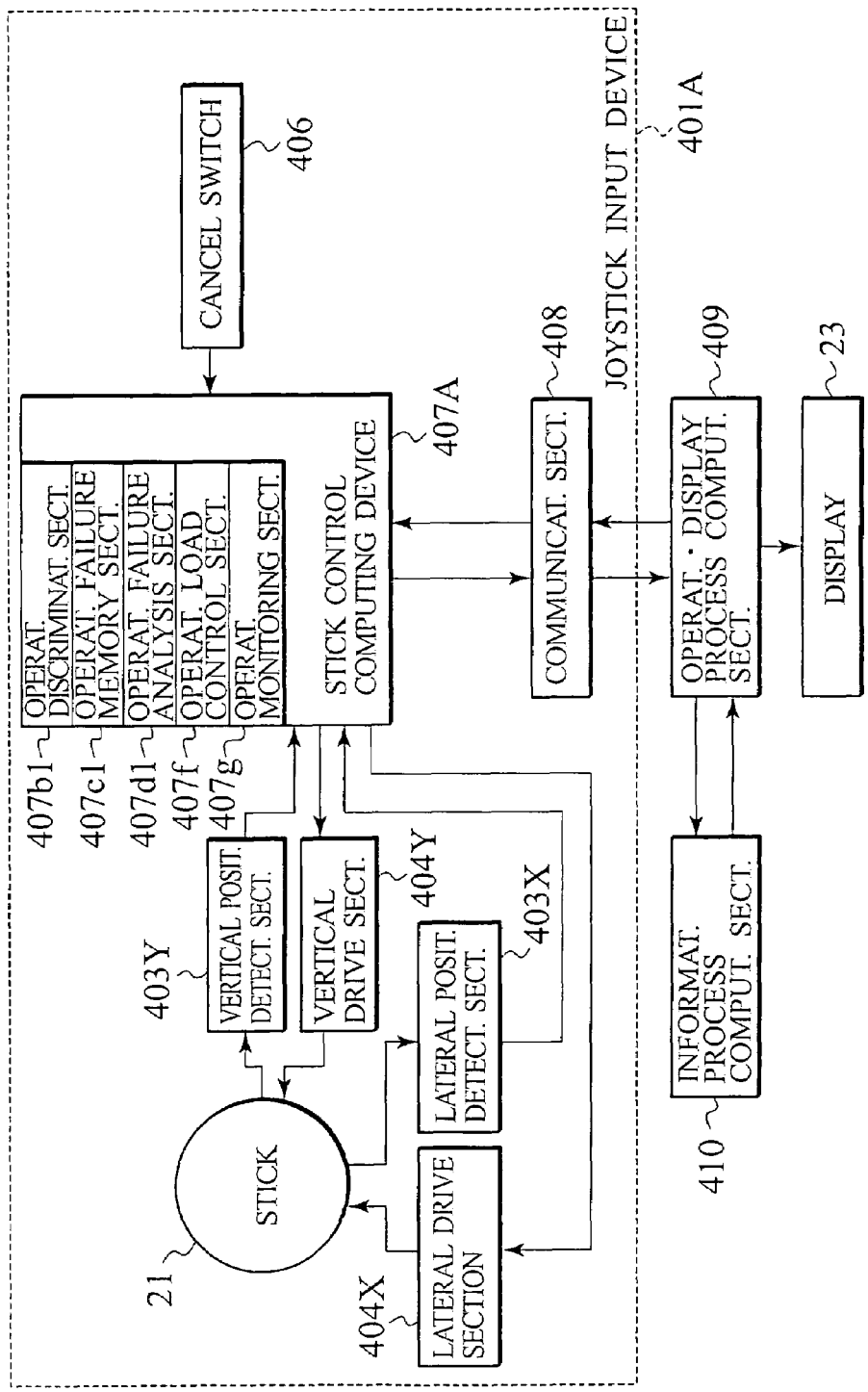
FIG. 20 is a control block diagram of a joystick input device of a second embodiment.
Figure 21:
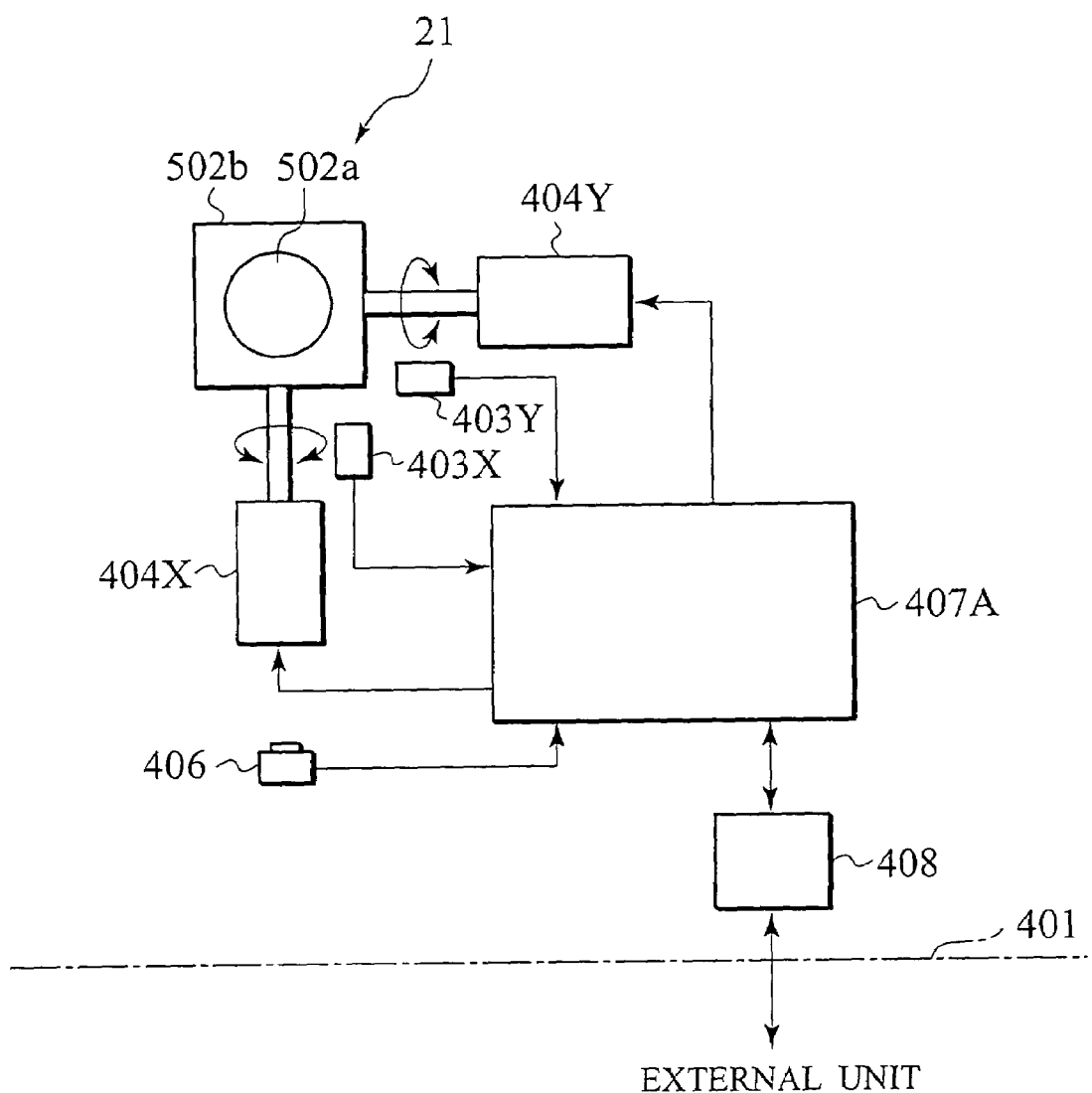
FIG. 21 is a view illustrating a hard structure of the joystick input device of the second embodiment.

In FIGS. 20 and 21, the same component parts as those of the first embodiment bear the same reference numerals and only differing structural feature is described to omit redundant description.

In the presently filed embodiment, the stick control computing device 407A incorporates therein an operational failure judgment section 407b1, an operational failure memory section 407c1, and an operational failure analysis section 407d1, an operational load control section 407f and the operation monitoring section 407g.

The stick control computing section 407A is applied with the current GUI condition from the operation and display process computing section 409 via the communicating section 408.

The stick control computing section 407A determines an operational direction layout of the stick 21 based on the current GUI condition (including the operation type, the hierarchy position and the number of selective legs), thereby controlling a moveable area to allow the stick 21 to move in accordance with the operational direction layout.

Figure 22A:
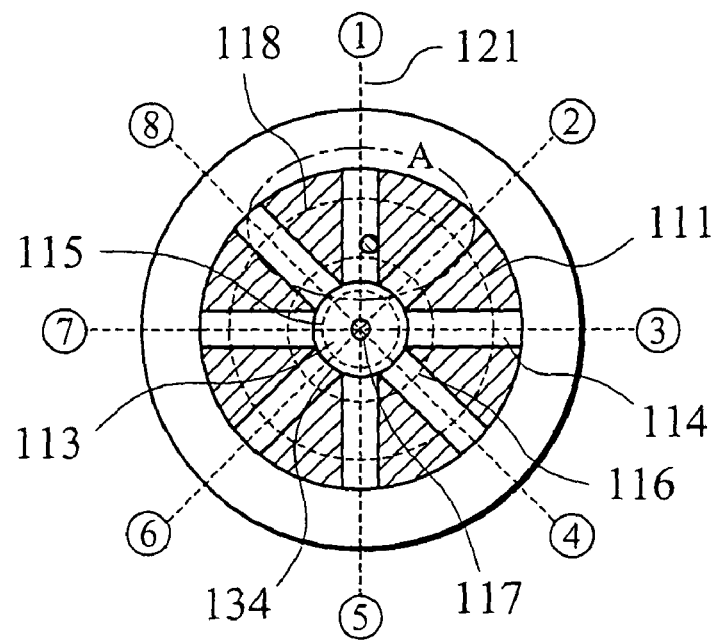
FIGS. 22A and 22B are illustrative views showing moveable regions of the stick.
Figure 22B:
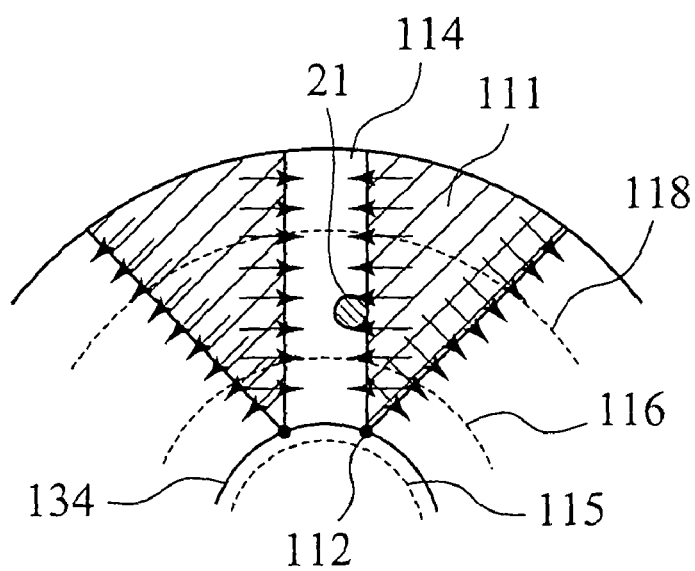

Details of the moveable areas of the stick associated with the operational direction layouts in eight selective legs as shown in FIG. 9A are shown in FIGS. 22A and 22B. FIGS. 22A and 22B fundamentally take the form of the same structure as that of the first embodiment (shown in FIGS. 6A and 6B).

Around the periphery of the stick 21, as shown in slanted line regions shown in FIG. 22A, the operation guides 111 are set in a circumferential periphery. The operation guides 111 mean areas which the stick 21 can not enter, and if a stick position detected by the lateral position detecting section 403X and the vertical position detecting section 403Y is going to enter such areas, as shown in FIG. 22B which shows a portion A of FIG. 22A in an enlarged scale, the stick control computing section 407A provides a repulsion force to urge the stick 21 from the operation guides 111 by means of the lateral drive section 404X and the vertical drive section 404Y.

Thus, blank portions between the mutually related adjacent operation guides 111 form moveable regions 114 such that, when the stick 21 is tilted in the radial direction from the circular play area 113 in the central play area circle 134, if the operational direction angle is brought into a substantial alignment with either one of the respective moveable regions 114 indicated by the operational direction numbers ① to ⑧, the stick 21 comes to be guided into the desired operational direction.

As shown in FIG. 22B, further, an operation interruptive circle 115 is set in the play area 113 and an operation starting circle 116 is set at an outside area larger in diameter than the operation interruptive circle 115 so as to intersect the operation guides 111.

The operation monitoring section 407g judges the operational displacement value (stroke) and the operational direction angle of the stick 21 and executes a subsequent operation.

First, when the operator operates the stick 21 and the operation monitoring section 407g detect the presence of the stick position with a distance from the neutral position 117 exceeding the given value, that is, here, when the stick position exceeds the operation starting circle 116 shown in FIG. 22B, the operation monitoring section 407g discriminates to find if the stick 21 is located in the moveable area 114 in either one of the operational directions, thereby outputting an operation start signal and an operational direction i to the operational load control section 407f.

If the operation monitoring section 407g detects that the operational displacement value (stroke) of the stick exceeds a click point, which will be described later, then the operation monitoring section 407g judges the occurrence of completed selective operation, and the stick control computing device 407A outputs a signal indicative of a selected leg to the external operation and display process computing device 409 via the communicating section 408.

Further, the operation monitoring section 407g outputs an operation existence signal and an operational direction number i to the operational failure judgment section 407b1.

In addition, if the stick 21 is restored in a direction toward the neutral position 117 and assumes a position inside the operation interruptive circle 115 under a circumstance where no selective operation has been completed, the operation monitoring section 407e judges that the operation in a preceding operational direction is interrupted, thereby outputting an operation interruptive signal to the operational load control section 407f.

Next, load control of the stick 21 in the operational load control section 407f is described.

The repulsion force (operational load), to be exerted to the hand of the operator when tilting the stick 21 from the neutral point 117 shown in FIG. 22A in a direction along the operational direction ②, is described with reference to FIG. 23A.

The abscissa represents the operational displacement value (stroke) of the stick, and the coordinates represents the repulsion force (operational load).

A play area in the abscissa represents a stroke area between the neutral point 117 and apexes 112 of the operation guides 111 shown in FIGS. 22A and 22B, and a guide area means a region in which the operational direction angle of the stick is guided by the operation guide 111 at a radially outer area than the stroke area. the stroke position s corresponds to the position of the operation starting circle 116.

An operational load characteristic curve 5010 represents a normal stroke versus an operational load characteristic. It is so configured such that as the stroke increases followed by an increase in the operational load, the operational load is tentatively dropped in a discontinuous manner at a stroke position a and, thereafter, the operational load rapidly increases.

Such a stroke position a is referred to as a "click point" and, if the stick 21 travels beyond this click point, the operator feels a click touch feeling caused by discontinuity of the operational load. The operation monitoring section 407g produces the above-described operation existence signal when the stick 21 travels beyond this click point a.

Figure 23A:
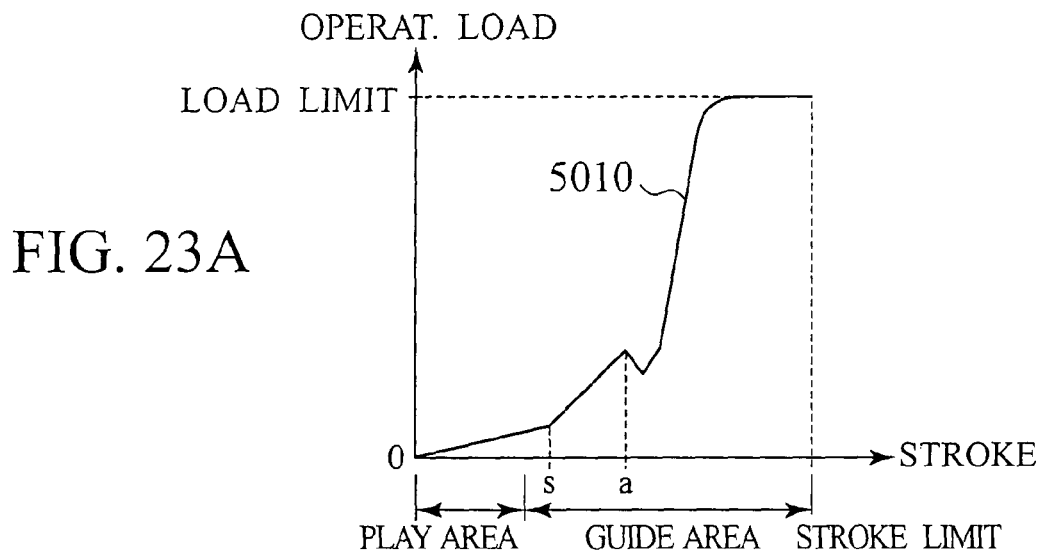
FIGS. 23A, 23B and 23C are illustrative views showing operational load characteristics in terms of operating strokes during stick operations.

If a tilting force imparted by the operator to the stick 21 is lessened, the stick 21 is automatically restored in the direction along the neutral point 117 and, in compliance therewith, the operational load also decreases as shown in FIG. 23A. This allows the operational load of the stick 21 to be returned to a low load that forms the operational load in the play area 113 in the vicinity of the neutral point.

As shown in FIG. 23A, it is configured such that as the stroke increases, the operational load also increases, and since the operation starting circle 116 is set to the stroke position s, even if the position of the stick 21 is slightly deviated from the neutral point 117 due to vibrations of the vehicle, no erroneous recognition will take place for the operation start in the stick control computing device 407A.

Now, control of the stick 21 to be performed by the stick control computing section 407A is described.

Figure 24:
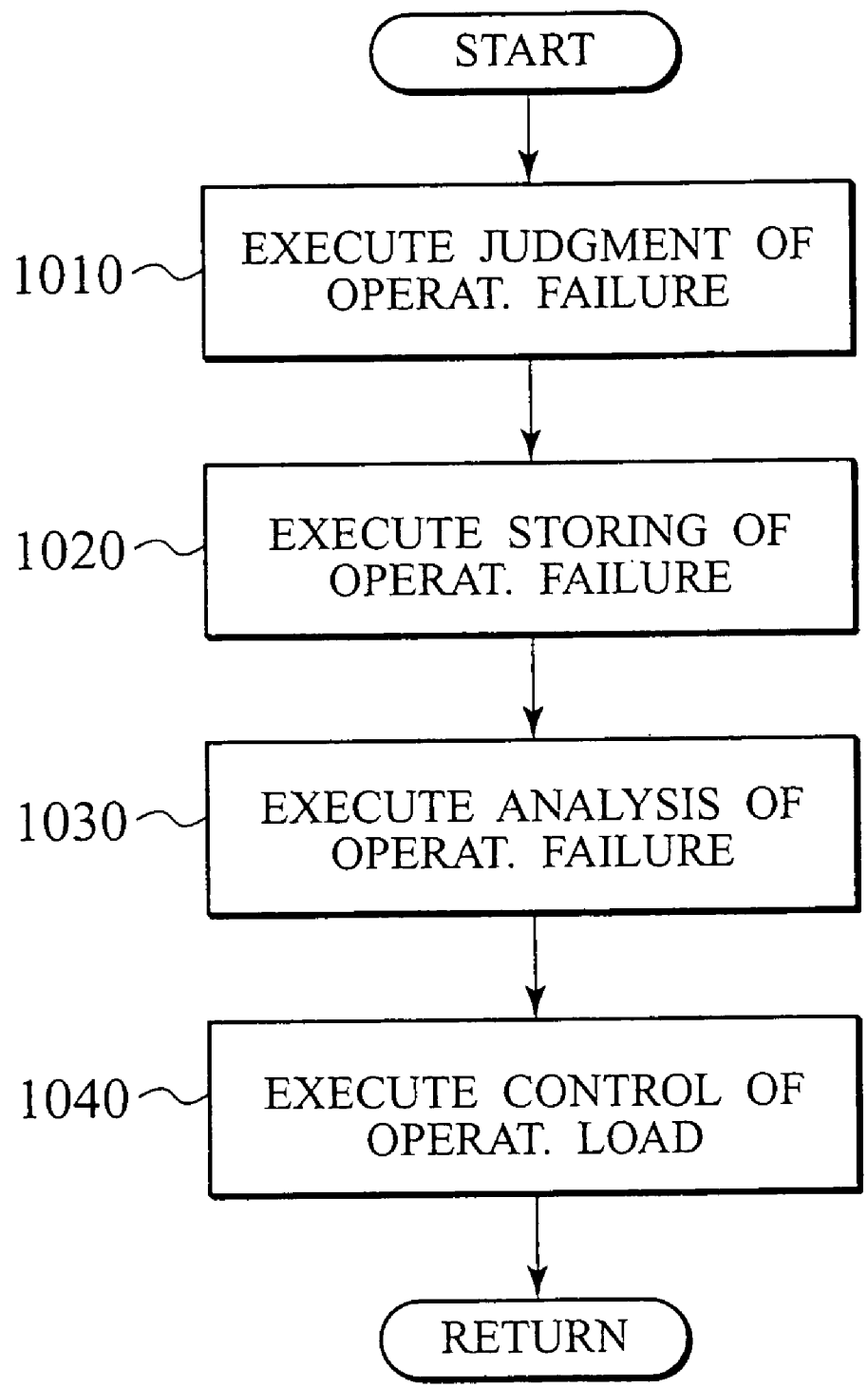
FIG. 24 is a flowchart illustrating entire flow of stick control.

FIG. 24 is a fundamental flowchart illustrating entire flow of stick control.

In step 1010, the operational failure judgment section 407b1 is responsive to the operational direction and the operation existence signal delivered from the operation monitoring section 407g and judges to find if a series of operations, involving selective operation, canceling operation and a subsequent re-operation, are associated with the operational failure.

In step 1020, the operational failure memory section 407c1 prepares a operation history table for each menu of each GUI and is responsive to the signal delivered from the operation monitoring section 407g and the judgment of the operational failure judgment section 407b1 to cumulatively store the operation history, such as the operational frequency, the operational failure frequency, and re-operational direction subsequent to operational failure cancellation, for each operational direction associated with menu selection.

In step 1030, the operational failure analysis section 407d1 monitors the operational failure memory section 407c1 and calculates and stores an operation probability, an erroneous operation rate and a re-operation probability for each selective leg of the relevant menu based on the operational frequency, the operational failure frequency, and the re-operational frequency contained in the accumulative operation history on the relevant menu screen subsequent to updating of each operation history.

In step 1040, the operational load control section 407f performs control of the load characteristic during the stick operation related to each moveable region of the stick 21.

Next, operational failure judging operation, operational failure storing operation, operational failure analyzing operation and operational load controlling operation are described below in detail in sequence.

The operational failure judging operation of the operational failure judgment section 407b1 is identical to that of first embodiment (see FIGS. 13 and 14) and, hence, detailed description of the same is herein omitted. As previously set forth above, the start, completion and interruption of the selective operations are judged upon detection of occurrence in that the stick 21 travels beyond the operation start circle 116, the operation completing circle 118 and the operation interruptive circle 115 shown in FIG. 22A.

Figure 25:
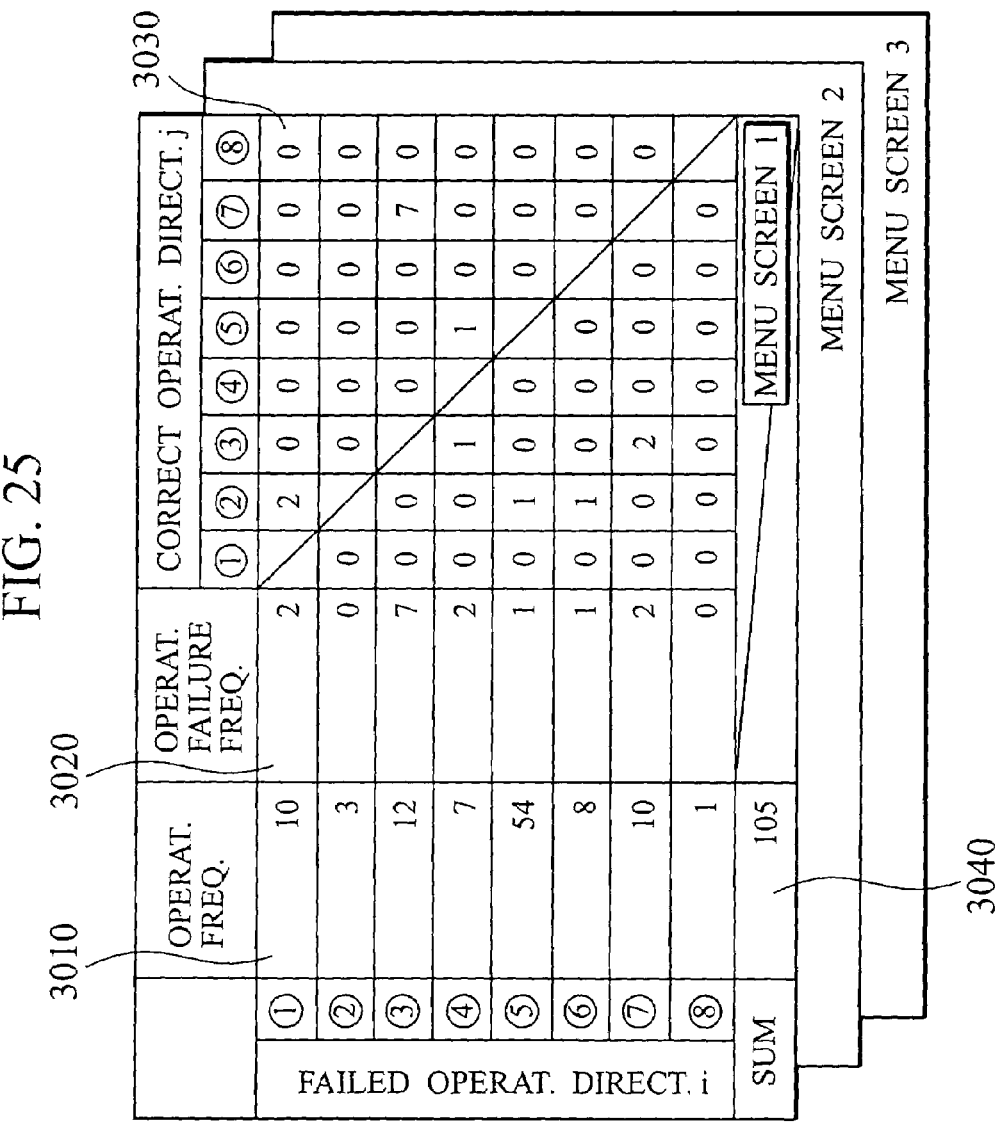
FIG. 25 is an illustrative view of an operation history table.
Figure 26:
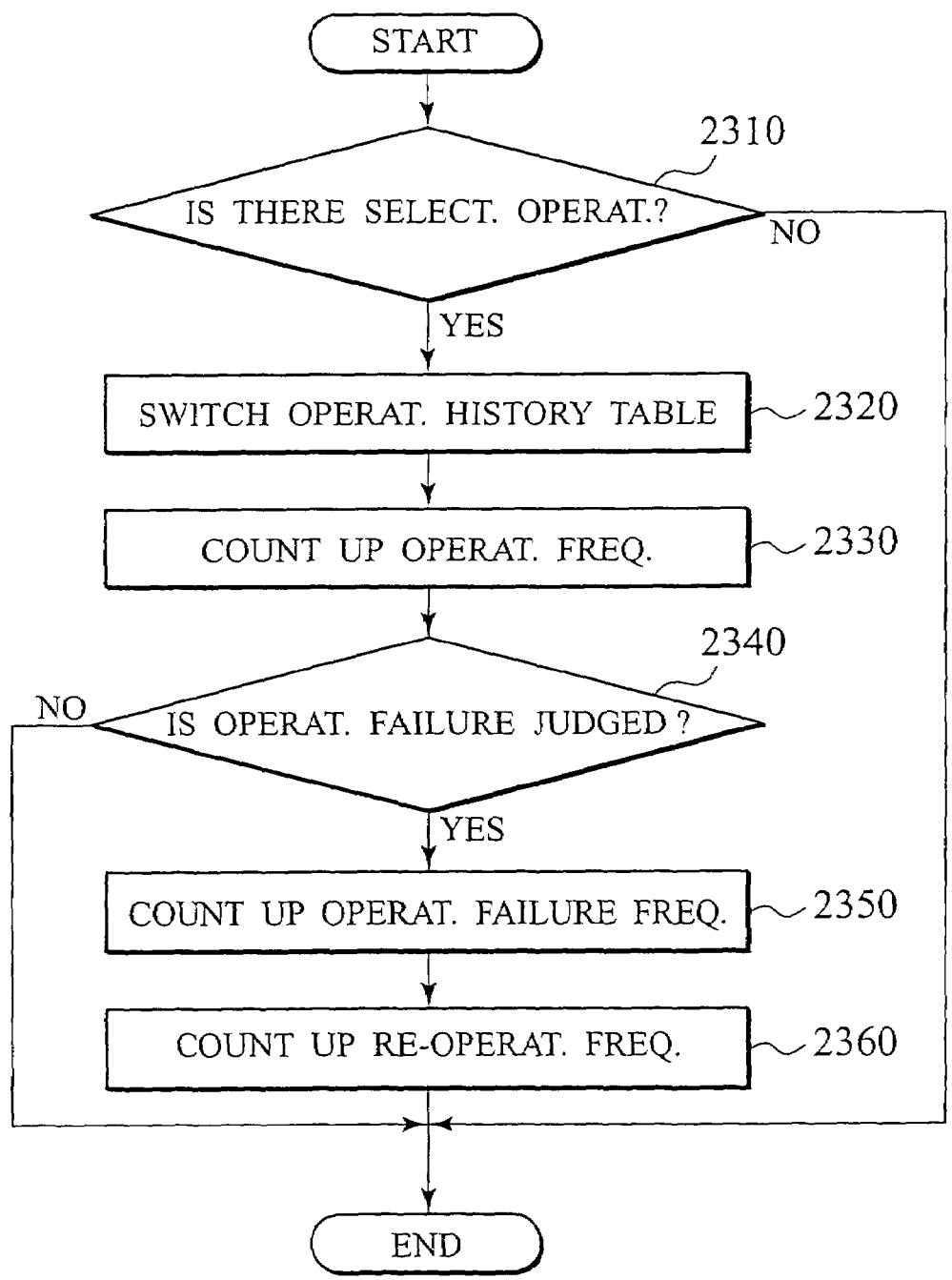
FIG. 26 is a flowchart illustrating flow of operation history storing operation.

First, the operational failure memory operation of the operational failure memory section 407c1 is described based on an operation history table shown in FIG. 25 and a flowchart shown in FIG. 26.

The operation history table takes the form of a two dimensional array table that records "OPERATIONAL FREQUENCY" 3010 in the operational direction i for each menu screen, "OPERATIONAL FAILURE FREQUENCY" 3020 and "RE-OPERATIONAL FREQUENCY" 3030 for each re-operational direction j subsequent to occurrence of the operational failure. This operation history table is prepared for each menu screen.

The operational failure memory section 407c1 judges the occurrence of the operational failure and, if "FAILED OPERATIONAL DIRECTION" AND "CORRECT OPERATIONAL DIRECTION" ARE OUTPUTTED, counts up the column associated with the table.

While the presently filed embodiment has been shown with a concept of the table being visualized in FIG. 25, in substance, the table is a memory area inside the stick control computing device 407, and a method of allocating the memory may be freely designed as far as the operational frequency, the OPERATIONAL FAILURE FREQUENCY, the re-operational frequency effectuated for each re-operational direction during occurrence of the operational failure, for each operational direction of the operation history, are managed for each menu screen.

Initially, in step 2310, the operational failure memory section 407c1 is responsive to the operation existence signal from the operation monitoring section 407g and checks if selective operation has occurred from the menu through stick operation. In the presence of the selective operation, flow proceeds to step 2320 and, if not, operation is terminated.

In step 2320, operation is implemented to switch the operation history table associated with the current menu screen.

In step 2330, a numeric value of 1 is added to "OPERATIONAL FREQUENCY" 3010 in the operational direction i of the operation history table on the basis of the operational direction number i outputted from the operation monitoring section 407g and calculates "TOTAL" 3040 again to store it in the operation history table.

In step 2340, operation is made to check if judgment of the operational failure has been outputted from the operational failure judgment section 407b1. In the presence of judgment of the operational failure, flow proceeds to step 2350 and, if not, this operation is terminated.

In step 2350, operation is implemented to retrieve the failed operational direction i and the operational failure frequency Cm stored in the buffer, which in turn are added in the "OPERATIONAL FAILURE FREQUENCY" 3020 of the operation history table.

In step 2360, operation is executed to retrieve the failed operational direction i and the correct operational direction (re-operational direction) stored in the buffer of the operational failure judgment section 407b1 and to add the numeric value 1 to the "RE-OPERATIONAL FREQUENCY" 3030 of the operation history table. After operation in step 2360, operation is terminated.

Now, operation failure analyzing operation in the operational failure analysis section 407d1 is described with reference to an operational failure analysis table of FIG. 27 and a flowchart of FIG. 28.

The operational failure analysis table takes the form of a two dimensional array table which records a "OPERATION PROBABILITY" 3110 and an "ERRONEOUS OPERATION RATE" 3120 for each operational direction i, and a "RE-OPERATION PROBABILITY" 3130 for each re-operational direction j during re-operation subsequent to the operational failure.

In step 2410, operation is made to check the presence of or the absence of the selective operation such that, in the presence of the selective operation, flow proceeds to step 2420 and, if not, operation is terminated.

In step 2420, operation is implemented to switch table to the operational failure analysis table associated with the menu screen of the current GUI.

In step 2430, the operation history table associated with the menu screen of the current GUI is retrieved, thereby updating the operational failure analysis table upon each updating of the operation history table.

Initially, operation is executed to divide the "OPERATIONAL FREQUENCY" 3010 in the operational direction i of the operation history table shown in FIG. 25 by the "SUM" 3040 of the operational frequency to calculate the "OPERATION PROBABILITY" 3110 of the operational direction i. Subsequently, in connection with the operational direction i of the operation history table, operation is implemented to divide the "OPERATIONAL FAILURE FREQUENCY" 3020 by THE "OPERATIONAL FREQUENCY" 3010 to calculate the "ERRONEOUS OPERATION RATE" 3120 related to the operational direction i. Finally, in connection with the operational direction i of the operation history table, operation is implemented to divide the "RE-OPERATIONAL FREQUENCY" 3030 related to the re-operational direction j by THE "OPERATIONAL FAILURE FREQUENCY" 3020 to calculate the "RE-OPERATION PROBABILITY" 3130. These calculation data allow the operation history analysis table to be updated.

Updating of the operational failure analysis table in step 2430 set forth above may be effectuated by updating only the column at a minimum each time when in selective operation.

Figure 27:
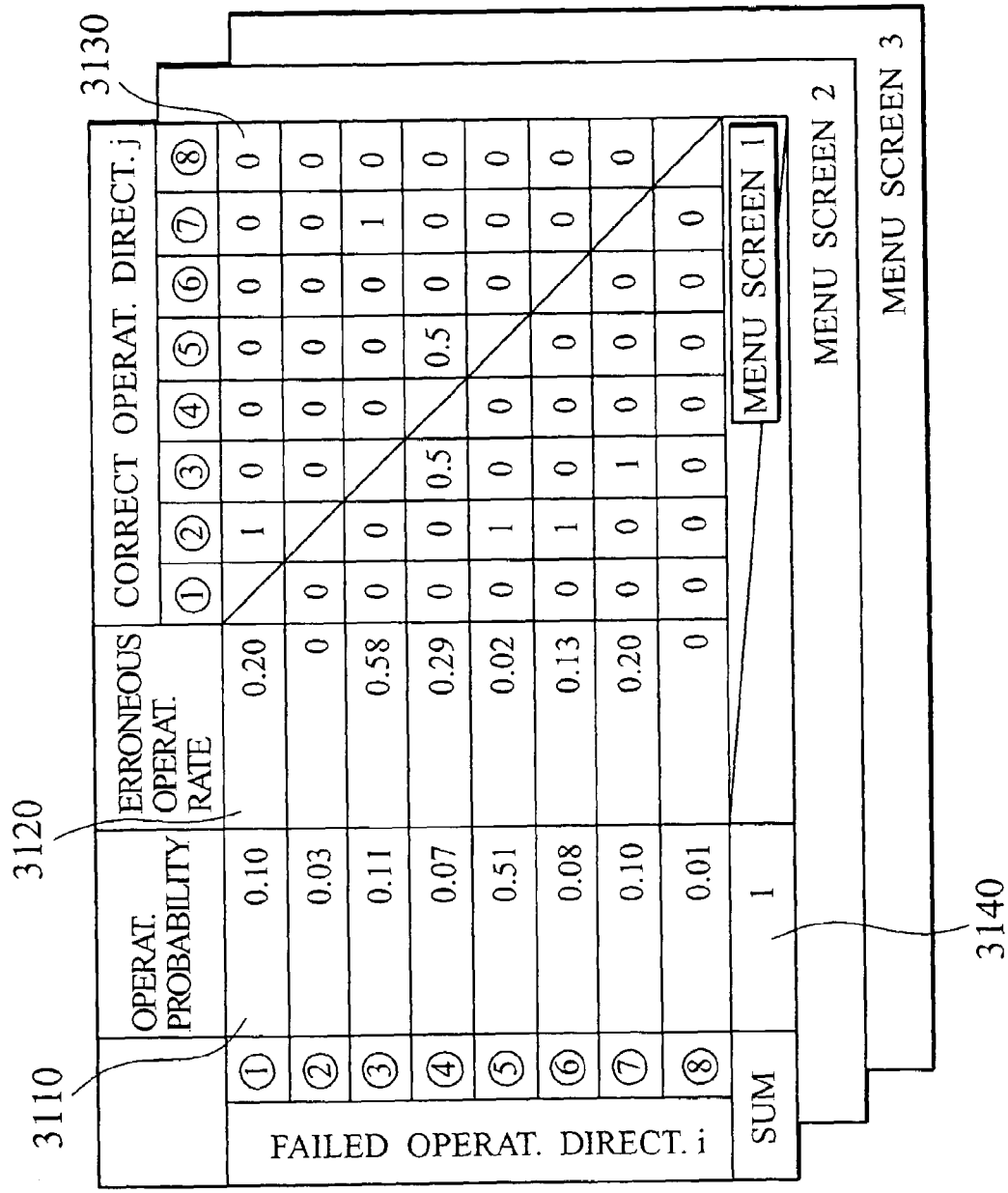
FIG. 27 is an illustrative view of an operation history analysis table.
Figure 28:
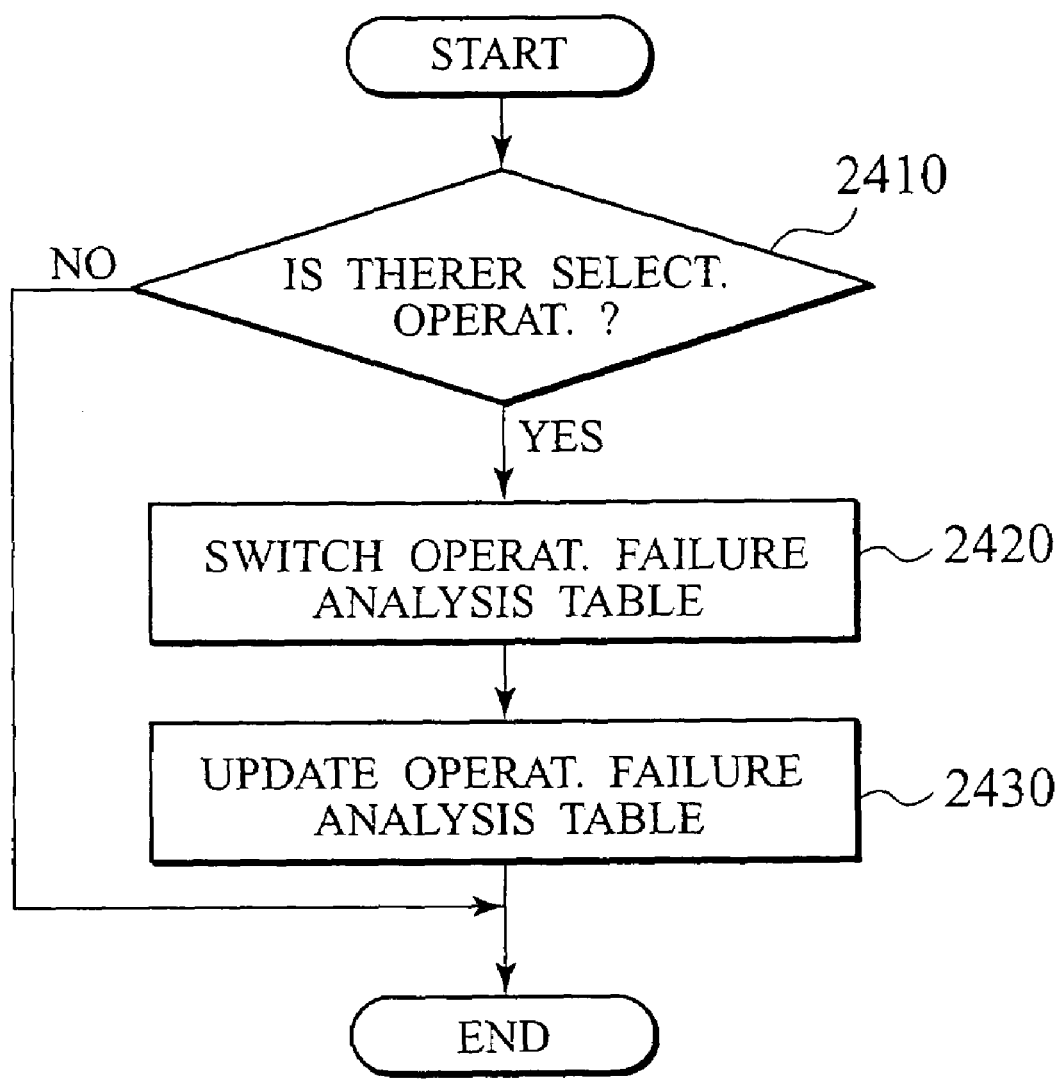
FIG. 28 is a flowchart illustrating flow of operation history analyzing operation.
Figure 29:
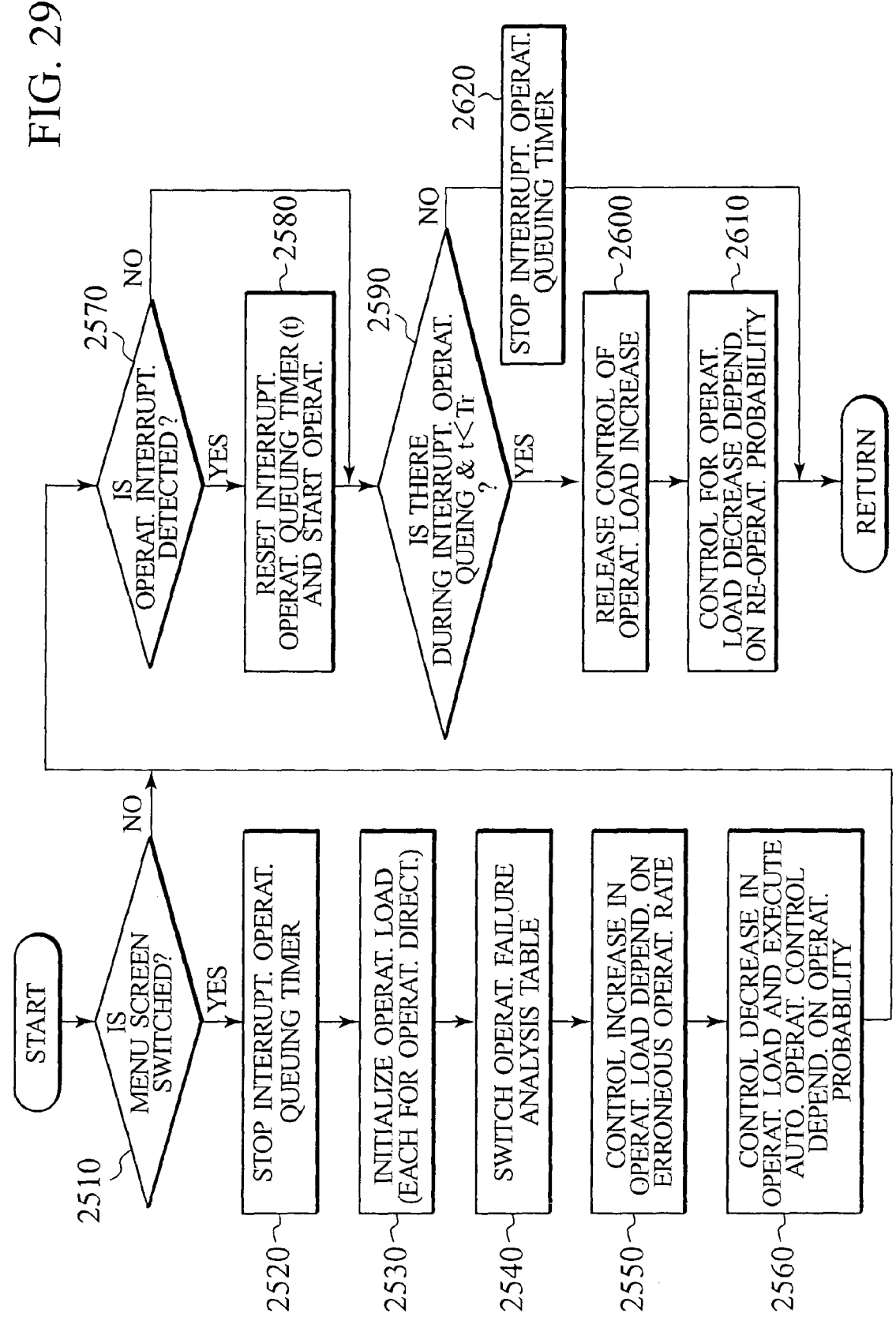
FIG. 29 is a flowchart illustrating flow of operational load control operation.

FIG. 27 shows a flowchart of operational load control.

In step 2510, the operational load control section 407f operates to check if there is a switch between the menu screens through stick operation.

In the presence of switch of the menu screen, flow proceeds to step 2520 and, if not, flow is routed to step 2570.

In step 2520, if during an interruptive operation queuing step which is described later, an interruptive operation queuing timer remains in operation, the timer is interrupted.

In step 2530, initializing operation is executed by restoring the operational load in each operational direction of the operation layout in the menu screen of the current GUI to that of the condition under which the stick 21 is located in the neutral point 117.

In step 2540, operation is implemented to switch the table to the operational failure analysis table associated with the current menu screen.

In step 2550, operation is executed to retrieve the erroneous operation rate for each operational direction from the operational failure analysis table and to perform control for an operational load increase depending on the erroneous operation rate with respect to the operational direction in which the stick 21 is tilted.

In the operational failure analysis table, among the erroneous operation rates in respective operational directions, if the erroneous operation rate lies in a range less than 0.25, the operational load characteristic of the relevant operational direction is set in a manner as shown by an operational load characteristic curve 5010 shown in FIG. 25B and, conversely, if the erroneous operation rate falls in a value greater than 0.25, the operational load characteristic of the relevant operational direction is set to have the operational load with a larger gradient as appeared in an operational load characteristic curve 5020.

The operational load characteristic curve 5020 is set to allow the click point to rest on the stroke position b higher than that of the operational load characteristic curve 5010.

When shifting the stroke versus operational load characteristic curves depending on the erroneous operation rates, such as a value less than 0.25, a value less than 0.25 to 0.5 and a value greater than 0.5, in three stages, operation may be executed to properly use the characteristic curves as the operational load characteristic curves 5010, 5020, 5030.

Figure 23B:
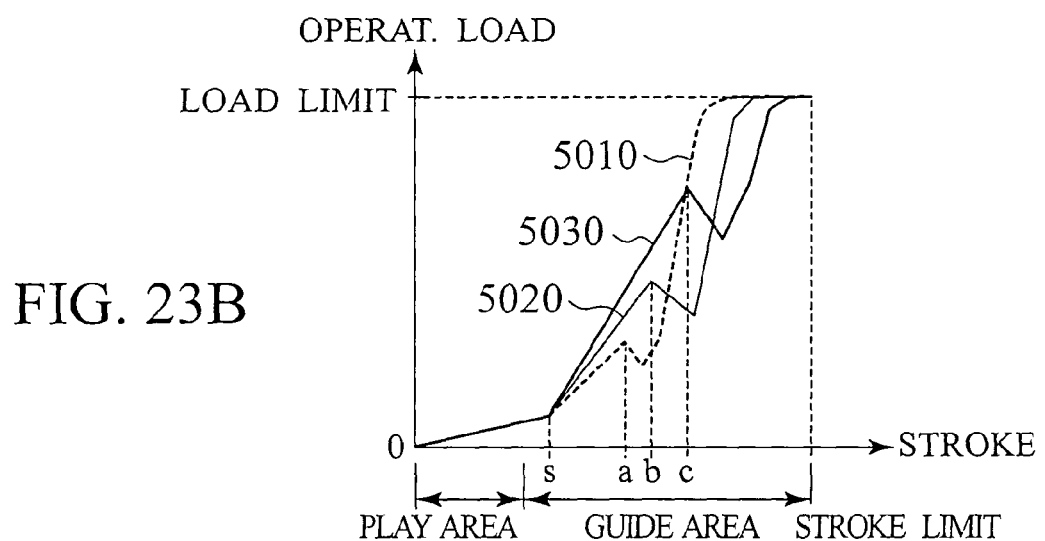

In order for increasing the operational load with a favorable click feeling touch being maintained, as shown in FIG. 23B, it is desirable for a reduction range of the operational load at the click point to be increased.

In an example of the operational failure analysis table shown in FIG. 27, the operational load characteristic curve 5030 is applied to the operational direction ③ and the operational load characteristic curve 5020 is applied to the operational direction ④.

In step 2560, with respect to the operational direction whose erroneous operation rate is less than a given value, automatic operation is performed so as to decrease the operational load or to lead the stick in the operational direction in dependence on the operation probability.

Figure 23C:
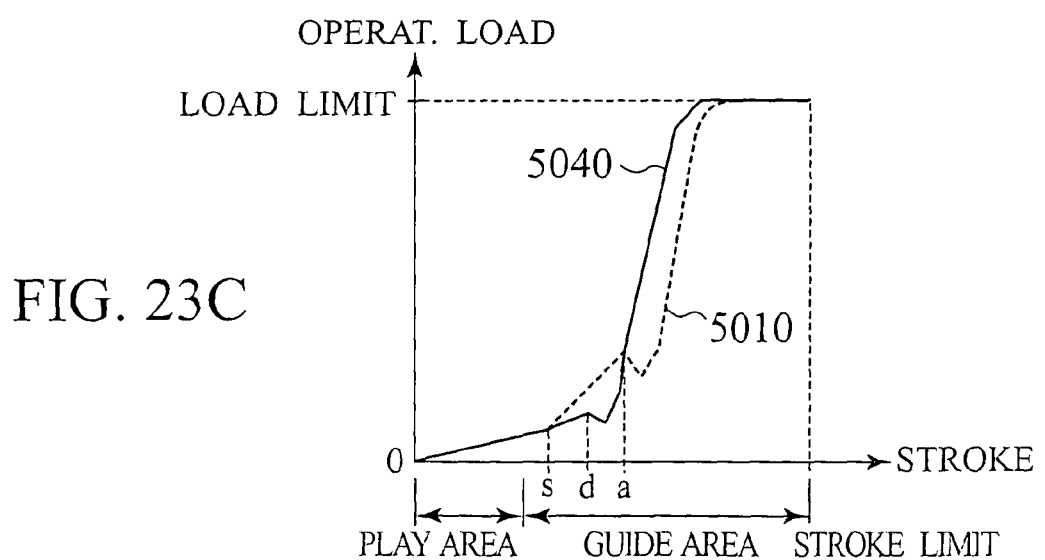

With respect to the operational direction, with an erroneous operation rate less than 0.1, like the operational direction ⑤ of the operational failure analysis table of FIG. 27, the operation probability takes a value of greater than 0.5 and, hence, the operational load characteristic of the relevant operational direction is set, like the operational load characteristic 5040 of FIG. 23C, to have a smaller gradient in the operational load than the operational load characteristic curve 5010. The operational load characteristic 5040 is set to allow the click point to rest on the stroke position d lower than that of the operational load characteristic curve 5010.

In order to achieve reduction in the operational load with a favorable click feeling touch being maintained, like the operational load characteristic curve 5040, it is desired to allow a temporary reduction range of the operational load at the click point to be decreased in compliance with reduction in the operational load.

Further, with the operation probability falling in a value greater than 0.99, the automatic operation of the stick 21 is carried out.

Even in the absence of the tilting force to be exerted to the stick 21 by the operator, the stick 21 is moved in the operational direction in the operation probability greater than 0.99 and after completion of the selective operation, the stick 21 returns to the neutral point 117.

In order for the operator not to be imparted with an unusual feeling touch during the automatic operation, a travel speed of the stick 21 is selected to an appropriate value. In normal practice, a time interval between the start and termination in operation lies in a value of approximately 0.5 to 1.0 seconds.

Further, in order to give a priority to stick operation of the operator, the operation monitoring section 407g operates during the automatic operation to discriminate the presence of or the absence of override operation of the operator responsive to the travel speed of the stick or the acceleration degree thereof and in the presence of the override operation, the automatic operation is quickly interrupted.

Subsequent operation in step 2560, flow proceeds to step 2570.

In step 2570, operation is implemented to check if an operation interrupting command has been sent by the operation monitoring section 407g. Upon detection of the operation interrupting command, flow proceeds to step 2580. Here, description is made on the supposition that, after the stick 21 has traveled beyond the operating start circle 116 in the operational direction ③, the stick 21 is returned toward the neutral point 117 and restored inside the operation interruptive circle 115.

Upon no detection of the operation interrupting command, flow proceeds to step 2590.

In step 2580, since the operational load control subsequent to the operation interruption which will be described later is limited within a given time interval (interruptive operation queuing time interval Tr), the interruptive operation queuing timer is reset once and, thereafter, count-up operation is started. Subsequent to operation in step 2580, flow is routed to step 2590.

In step 2590, during interruptive operation queuing, operation is executed to check if an elapsed time subsequent to the interrupted operation is less than the interruptive operation queuing time interval Tr. If the elapsed time interval is less than the interruptive operation queuing time interval Tr, flow proceeds to step 2600 and, if not, flow is routed to step 2620.

In step 2600, in connection with the operational load characteristic curve related to the interrupted operational direction (operational direction ③ in this case), operation is implemented to cancel the operational load increase control associated with the erroneous operation rate set in the step 2550 and is set to the operational load characteristic curve 501 for the normal practice.

In step 2610, the operational load characteristic curve, of each operational direction (an operational direction other than the operational direction ③ in this case) different from the operational direction that has been interrupted, is set depending on the re-operation probability. For the re-operational direction with the re-operation probability greater than 0.5, the operational load characteristic curve 5040, with the operational load smaller than that of the operational load characteristic curve 5010 for the normal practice, is set and flow is routed back to step 2510.

If the interruptive operation queuing time interval Tr has elapsed in step 2590, flow proceeds to step 2620 while stopping the interruptive queuing timer to cause flow to be routed back to step 2510.

Though the interruptive operation queuing time interval Tr depends on operation circumstances and the operator, normally, is preferable to fall in 3 to 5 seconds.

Despite what the preceding operation will be, or despite the elapsed time interval from the preceding operation, if the selective operation is completed, the menu screen is subsequently switched. When this takes place, flow is routed back to step 2510 and, subsequent to checking operation in step 2510, flow proceeds in a series of paths through step 2520 to step 2560.

Accordingly, in a case where, in step 2520, the interruptive operation queuing timer is in operation, the timer is stopped.

In an event that the operation interruption is detected in step 2570 and flow is routed back to step 2510 through operations in steps 2580 to 2610, due to the presence of operation-reopening subsequent to the interrupted operation, the same menu screen as that of the interrupted operation is used and flow proceeds to step 2570. Since no interrupted operation is detected in step 2570, flow is further routed to step 2590 and flow is separately routed to paths of steps 2600, 2610 or a path of step 2620 depending on whether the elapsed time interval subsequent to interruptive operation is shorter than Tr.

In this fashion, in case of stick operation being executed within the given time interval Tr subsequent to interrupted operation, unlike the operational load control wherein as the erroneous operation rate of the operational direction based on a probability value of the operational failure analysis table as in steps 2550, 2560 becomes high, the operational load increases while the operational direction, with the erroneous operation rate being extremely small and with the operation probability being high, allows the operational load to be decreased or the automatic operation to be performed, even in the presence of the operational direction whose erroneous operation rate is high, control is executed to decrease the operational load as in step 2600, 2610.

In the presently filed embodiment, the stick 21 forms the operation terminal of the present invention, the lateral position detecting section 403X, the vertical position detecting section 403Y and the operation monitoring section 407g form an operation monitoring means and, in the flowchart, step 1010 forms an operational failure judging means, step 1020 forms an operational failure memory means, step 1030 forms an operational failure analyzing means and step 1040 forms an operational load control means.

With the presently filed embodiment, as set forth above, in the joystick input device adapted to be located in the center cluster 20 of the vehicle, operation is executed, for each menu screen, to store the operation frequency of the stick 21 for each operational direction, the operational failure frequency and the re-operation frequency for each re-operational direction subsequent to the operational failure, and on the basis of resulting erroneous operation rate, the operational load to be exerted to the stick 21 normally increases.

As a result, the operator is able to recognize that attention is needed from an operational feeling experienced when operating the stick in the associated direction and the operator comes to be urged for reconsideration as to whether to continuously operate the stick as it is.

If an error occurs in the operational direction, it becomes easy for the operator to find the error and, even if the operation is correct, it becomes easy for the operator to recognize the current operation. In this manner, even in the selection menu screen with the operational failure to be liable to take place, the operator is able to learn and memorize a correct way of operation in a natural manner, thereby promoting mental model formation of the operator.

Further, in an event that the operator stops tilting of the stick 21 on a midway prior to occurrence of the click because of increase in the operational load and operates the stick 21 again, if the stick 21 is operated in the same operational direction as that before stopping stick operation on the midway of the operation, the operational load characteristic for the normal practice is set again and, conversely, if the stick 21 is operated in a different operational direction, the operational load characteristic of the operational direction with a high re-operation probability is set to have a lower operational load characteristic than that of the normal practice.

As a result, the operational load during a second stick operation with a high correct operation probability is lessened and no alerting, indicative of the operational direction with a large frequency of the operational failures, is executed, resulting in a capability of performing smooth selective operation.

Furthermore, the stick operation, deemed to be hard in occurrence of the operational failures from the resulting analysis of the operation history on a certain menu screen, is designed to allow the operational load characteristic associated with the operational direction with the high operation probability to be made lower than that of the normal practice. As a result, the selective operation based on the menu screen, by which the operator is already formed with the mental model, has a low operational load of the stick, enabling the operator to achieve smooth selective operation with no confusion caused in the operator.

Moreover, with respect to the operational direction which enables the selective operation to be substantially and reliably performed when selecting the certain menu screen based on the resulting operation history analysis, the stick is automatically operated to complete the selective operation, resulting in improvement over an operating efficiency.

As a method of automatically selecting a particular menu selection when in selection of the certain menu screen, a method can be conceived which permits only the selection leg of the menu screen displayed over the display 23 to be automatically brought into a selective condition and the stick 21 is prevented from being driven.

However, with the presently filed embodiment, in this instance, since the stick 21 is driven in the operational direction in an automatic operation mode by means of the lateral drive section 404X and the vertical drive section 404Y, the operator is able to recognize the operational direction in the automatic operation mode through the hand touch feeling responsive to movements of the stick 21 and, so, it is easy for the operator to override when in the automatic operation mode.

As set forth above, in the menu screen where the mental model formation is promoted and the mental model formation is partially finished, the operational load of the stick 21 is small, resulting in improvement over an efficiency of the stick operation.

Further, since the stick operation is realized through operational contact in the form of the repulsion force of the stick, the operator is reliably alerted even under operational circumstances, such as the front seats of the automobile, with no attention being paid to the menu screen, resulting in a capability of obtaining an advantageous result to achieve reduction in occurrence of the selective failures while promoting the mental model formation.

Also, although the presently filed embodiment has been described with reference to an example wherein the stick 21 is guided in the operational direction associated with the selected menu screen by achieving repulsion control of the stick 21 through the regional setting of the operation guides 111, in place thereof, the guide of the stick 21 may be realized by a physical contact through a plate slotted in a pattern in compliance with a diameter of the end portion 411*a* of the stick 21.

In addition, in the presently filed embodiment, although the setting of the operational load characteristics, which are varied in dependence on the erroneous operation rate, the re-operation probability and the operation probability, are controllably set in a stepwise manner, the operational load characteristic may be controllably set depending on a numeric value in a continuous fashion.

Now, a third embodiment is described with reference to the drawings.

Figure 30:
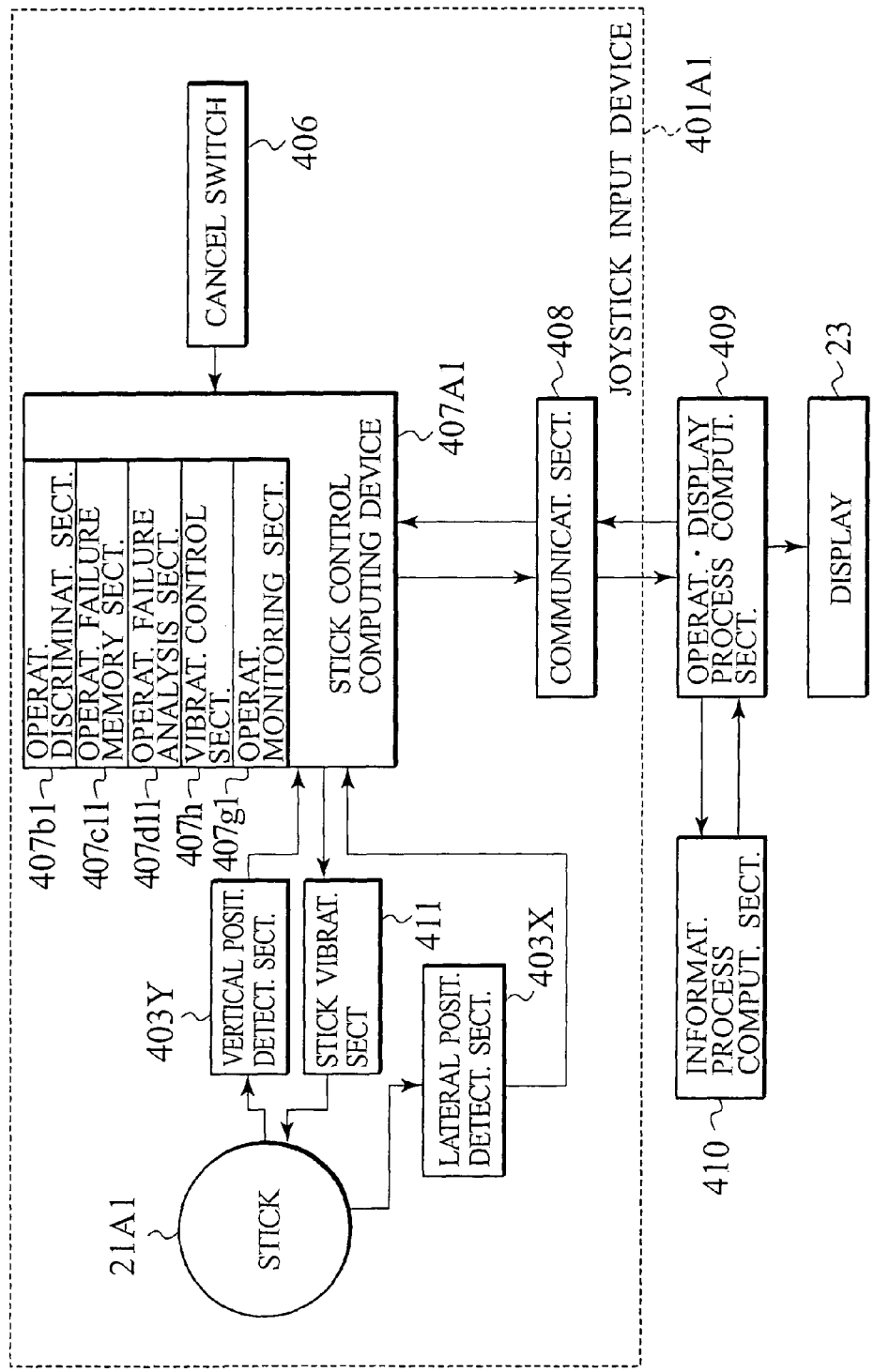
FIG. 30 is a control block diagram of a joystick input device of a third embodiment.
Figure 31:
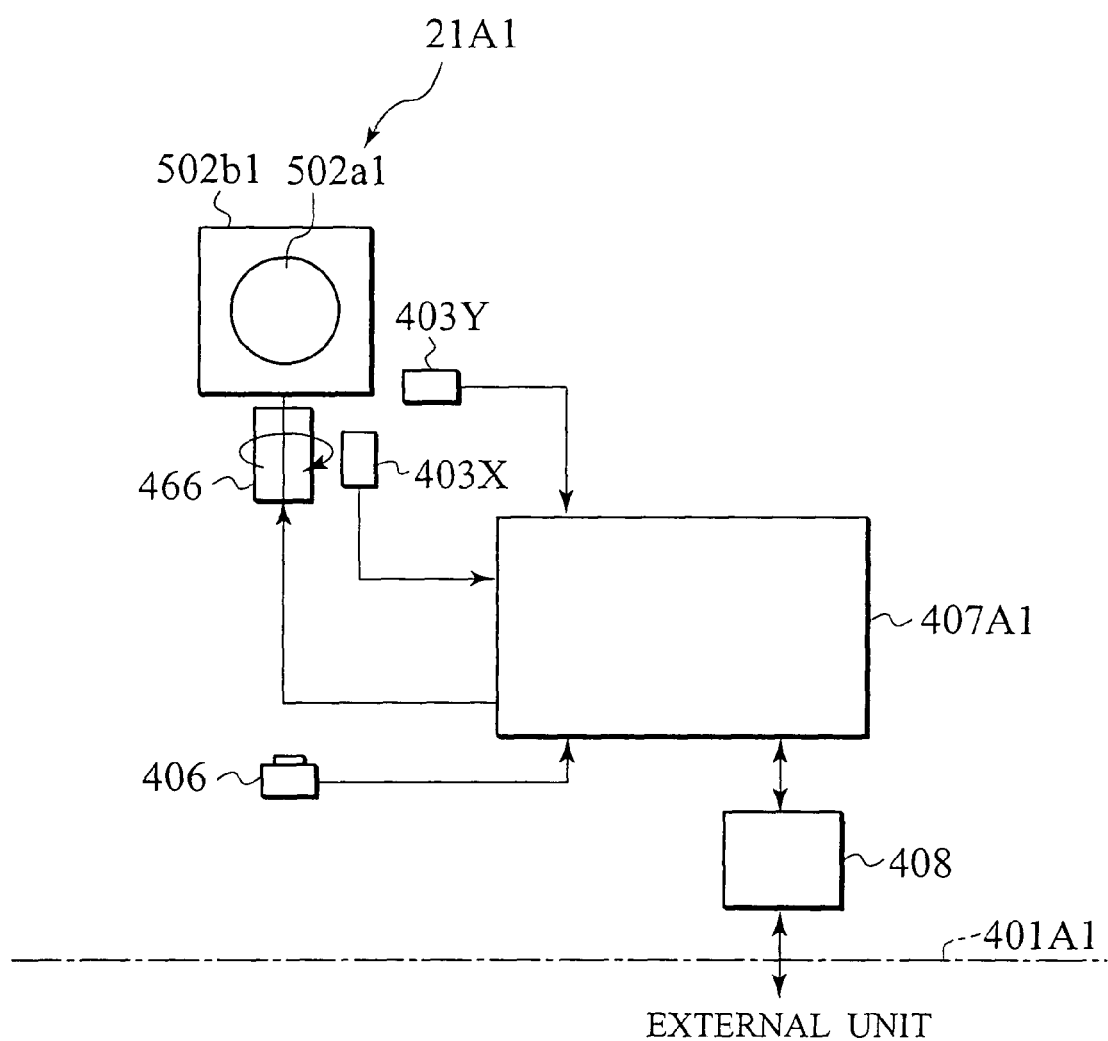
FIG. 31 is a view illustrating a hard structure of the joystick input device of the third embodiment.

FIG. 30 is a block diagram illustrating a structure of the joystick input device of the presently filed embodiment, and FIG. 31 is a view illustrating a structure in a hard form of the joystick input device.

The third embodiment is different from the second embodiment in that, first, the lateral drive section and the vertical drive section are dispensed with in the joystick input device 404A1 while a stick vibrator section 466 for exerting vibrations to a stick 21A1 is provided and a stick control computing device 407A1 is provided with a vibration control section 407*h* adapted to command and control start and stop of vibration and a vibrating frequency of the vibration to be applied by the stick vibrator section 466 whereas the operational load control section is dispensed with.

Next, the third embodiment partially differs from the second embodiment in respect of the operations in storing the operational failures, analyzing the operational failures and judging the operation in the stick control computing device 407A1. These operations are performed by an operational failure memory section 407*c*11, an operational failure analysis section 407*d*11 and an operation monitoring section 407*g*1, respectively.

Further, the stick 21A1 is guided in the physical contact with the plate slotted in compliance with the diameter of the stick end 502*b*1 instead of using the hypothetical operation guides associated with the stick drive.

The operation monitoring section 407*g*1 performs the operation start and judgment of operation interruption in the same manner as those of the second embodiment. Judgment of completion of the selective operation is executed by detecting that the stick 21A1 travels beyond an operation completing circle 118 set in an outside area of an operation starting circle 116 (see FIGS. 22A, 22B).

The operation failure judgment section 407b1 has the same structure as that of the second embodiment.

In FIGS. 30 and 31, the same structural components as those of the second embodiment bear the same reference numerals.

The joystick 21A1 of the presently filed embodiment has the same outer appearance as that of the second embodiment.

Figure 32:
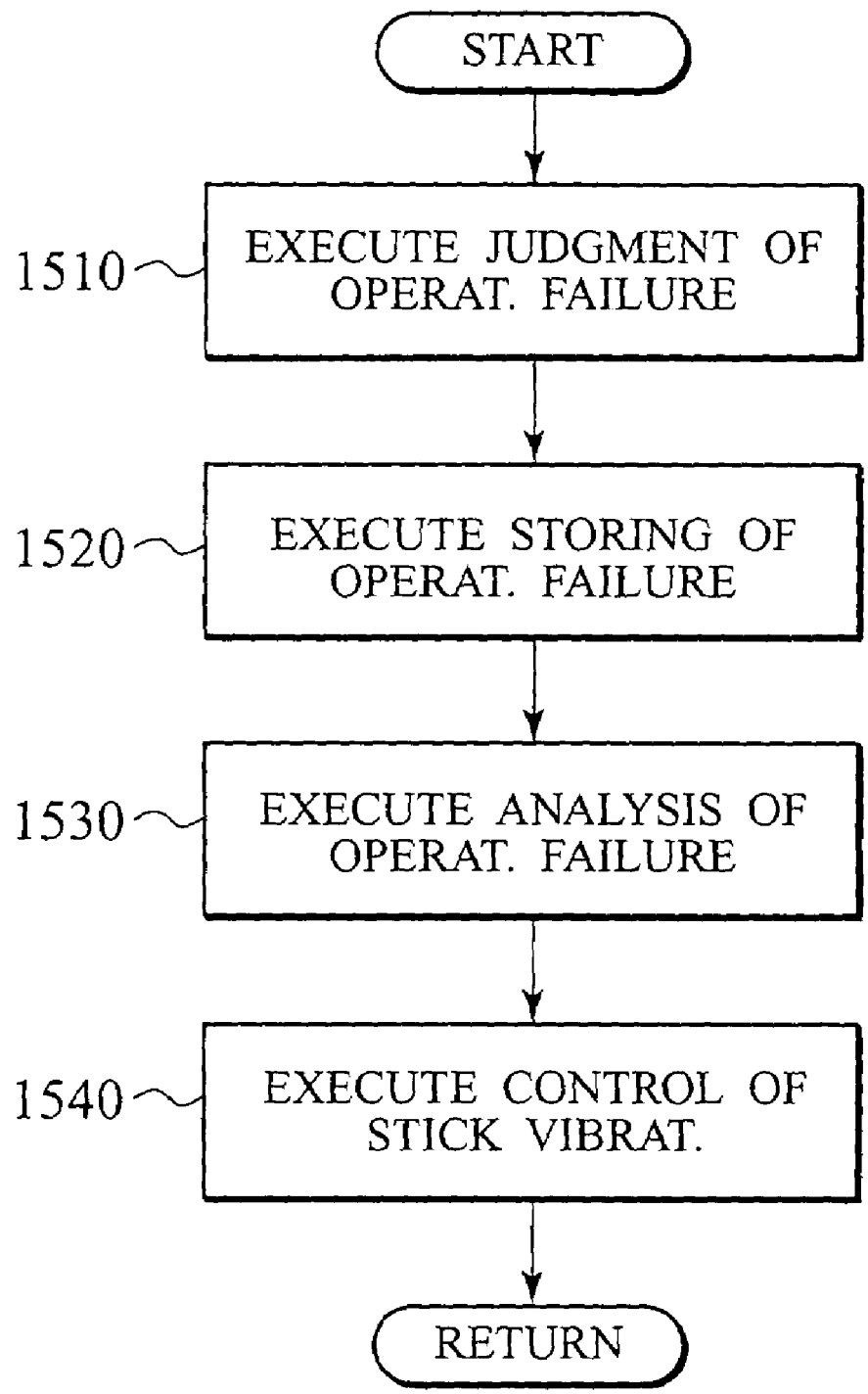
FIG. 32 is a flowchart illustrating entire flow of stick control.

A basic flowchart showing overall flow of stick control is shown in FIG. 32.

In step 1510, stick operation is monitored and operational failure judgment operation is executed. These operations are executed on the same flowchart as those of FIGS. 13, 14 related to the first and second embodiments.

In step 1520, the operational failure memory section 407c11 registers the operational frequency and the operational failure frequency in an "OPERATIONAL FREQUENCY" 3010 and an "OPERATIONAL FAILURE FREQUENCY" of an operation history table, respectively, for each operational direction during stick operation.

Though the operational history storing operation is executed in the same flow as that of the second embodiment, no recording is performed in the "RE-OPERATIONAL FREQUENCY" 3030 of the operation history table of each menu screen shown in FIG. 25.

In step S1530, although the operational failure analysis section 407d11 retrieves THE "OPERATIONAL FREQUENCY" 3010 and the "OPERATIONAL FAILURE FREQUENCY" 3020 stored in the operational failure memory section 407c11 and updates the operational failure analysis table as in the second embodiment, the presently filed embodiment is configured such that operation is executed to calculate only the "ERRONEOUS OPERATION RATE" 3120, of each operational direction, which in turn is registered.

In step 1540, the vibration control section 407h controls the vibrations to be exerted to the stick 21A1 during stick operation in dependence on the erroneous operation rate of each operational direction.

Figure 33:
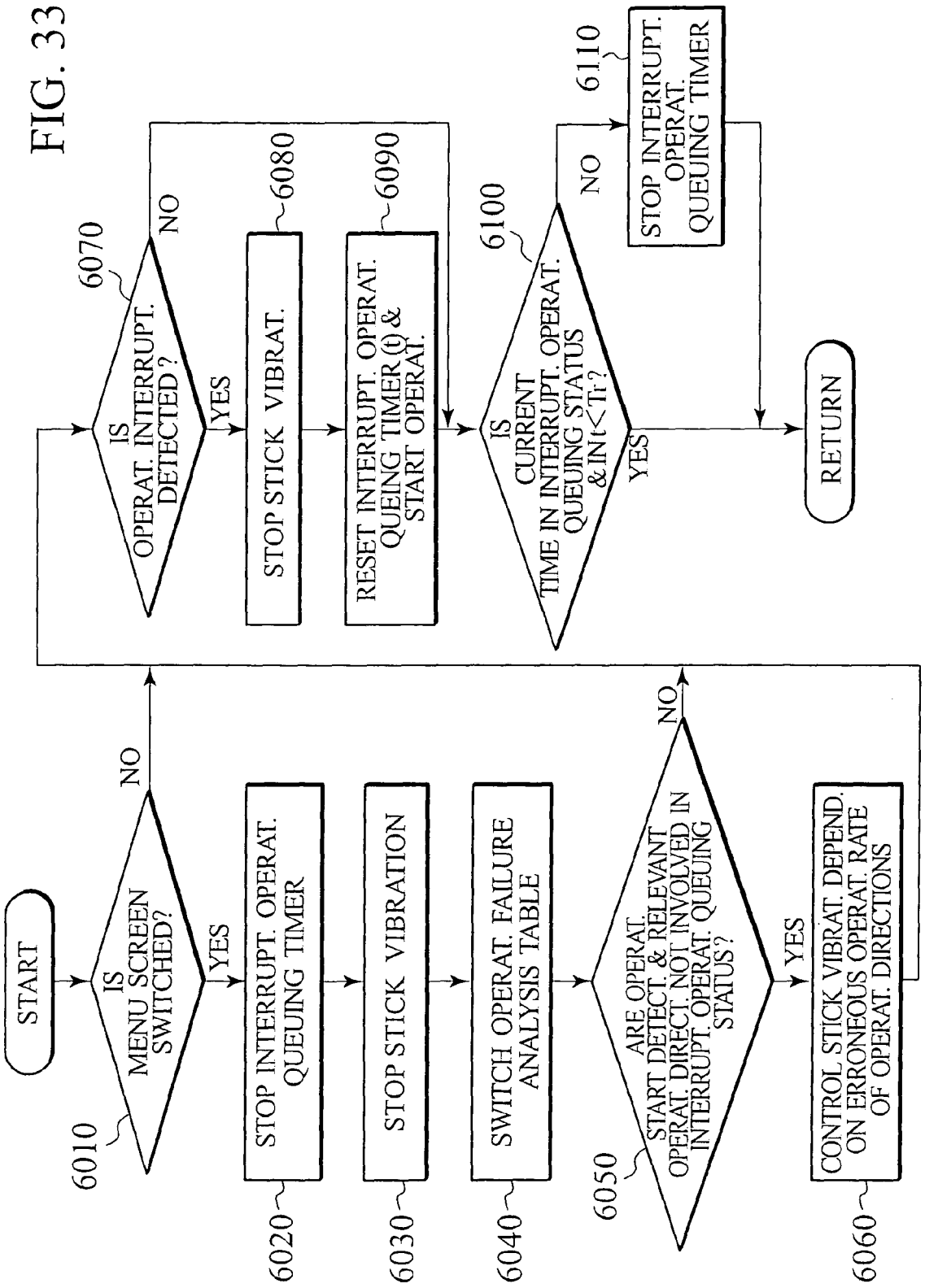
FIG. 33 is a flowchart illustrating flow of vibration control operation.

Now, a detail of stick vibration controlling operation of the above-described step 1540 is described with reference to FIG. 33.

In step 6010, the vibration control section 407h checks if there is a switch in the menu screen.

In the presence of the switch in the menu screen, flow proceeds to step 6020 and, if not, flow proceeds to step 6050.

In step 6020, if the interruptive operation queuing timer, which will be discussed later, counts time, the timer is stopped.

In step 6030, if the stick 21A1 is vibrated, the vibration thereof is stopped.

In step 6040, operation is implemented to switch the preceding table to the operational failure analysis table associated with the current menu screen.

In step 6050, operation is executed to check if the operation start of the stick 21A1 is detected and, if detection of the operation start is found, operation is executed to check if the relevant operational direction is involved in the interruptive operation queuing status, that is, if there is a discrepancy between the operational direction prior to the interruptive operation, and the current operational direction. In the presence of the discrepancy between the operational direction, prior to the interruptive operation, and the current operational direction, flow is routed to step 6060 and, if both operational directions are the same, flow is routed to step 6070.

In step 6060, operation is executed to retrieve the erroneous operation rate related to the operational direction from the operation history analysis table and to command the stick vibrating section 466 so as to allow the vibration to occur in the stick 21A1 depending on the erroneous operation rate.

In the operational failure analysis table, among the erroneous operation rates of the respective operational directions, if the erroneous operation rate is less than 0.25, then no vibration occurs while if the erroneous operation rate is less than 0.25 to 0.5, the stick 21A1 is vibrated at a frequency of 100 Hz and if the erroneous operation rate is greater than 0.5, the stick 21A1 is vibrated at a frequency of 200 Hz.

In step 6070, operation is implemented to check if the operation monitoring section 407g1 has delivered a command to interrupt selection of the operational direction. Upon detection of the command for interrupting selection of the operational direction, flow proceeds to step 6080 and, if not, flow proceeds to step 6100.

In step 6080, operation is executed to command to the stick vibrating section 4060 so as to prevent the stick 21A1 from being vibrated.

In step 6090, since vibration control subsequent to interrupted operation is limited in a given time interval (interruptive operation queuing time Tr), the interruptive operation queuing timer is reset once and, thereafter, count-up is started.

In step 6100, operation is executed to check if an elapsed time interval, subsequent to the interrupted operation during the interruptive operation queuing status, is less than the interruptive operation queuing time Tr. Upon occurrence of the elapsed time interval being less than the interruptive operation queuing time Tr, flow is routed back to step 6010 and, if not, flow is routed to step 6110.

In step 6110, the interruptive operation queuing timer is interrupted and flow proceeds to step 6010.

The interruptive operation queuing time Tr depends on operating circumstances and the operator and is normally appropriate to lie in a value ranging from 3 to 5 seconds.

In spite of what will be a preceding operation, or in spite of the time interval elapsed after the preceding operation, upon completion of the selective operation, the menu screen is subsequently switched. When this takes place, flow is routed to step 6010 and, subsequent to checking operation in step 6010, flow is routed to a series of paths from step 6020 to step 6040.

As a consequence, if the interruptive operation queuing timer is operative in step 6020, the timer is interrupted.

If, upon detection of the interrupted operation in step 6070, flow is routed back to step 6010 through steps 6080 to 6100, such flow corresponds to the operation reopening subsequent to the interrupted operation and, so, the same menu screen as that appearing during the interruptive operation state appears whereupon flow proceeds to step 6050.

In step 6050, flow is involved in the operation start subsequent to the interrupted operation and, if the operational direction is the same as that prior to the interrupted operation, flow proceeds to step 6070 wherein no vibration start for the stick 21A1 is commanded whereas, a differing operational direction is present, flow proceeds to step 6060 wherein the vibration start is commanded in dependence on the erroneous operation rate whereupon flow is routed to step 6070.

In step 6070, since no operation interruption is detected this time, flow proceeds to step 6100 and, depending on whether the elapsed time interval, subsequent to the interrupted operation, lies in a value less than Tr, flow is routed to step 6010 or routed through step 6110, where the interruptive operation queuing timer is stopped, back to step 6010.

In such a manner, with respect to a situation where the stick operation is performed within the given time interval Tr after the operation has been interrupted while the operational direction is the same as that prior to interrupting the operation, control is so executed as to preclude the stick vibration regardless of the operational direction with high erroneous operation rate.

In the presently filed embodiment, the stick 21A1 forms the operation terminal, and the lateral position detecting section 403X, the vertical position detecting section 403Y and the operation monitoring section form an operation monitoring means.

Further, among steps in the flowchart, step 1510 forms an operational failure judging means, step 1520 forms an operational failure storing means, step 1530 forms an operational failure analyzing means and step 1540 forms a vibration control means.

According to the presently filed embodiment, in each menu screen, when in operation to manipulate the stick in the operational direction where the selection failure is liable to occur from a past operation history, the stick 21A1 is vibrated to enable the operator to recognize a need to pay attention from the operation feeling caused during manipulation of the stick in such a direction, thereby urging the operator to reconsider whether to continue such operation in situ.

In the existence of an error in the operational direction, it becomes easy for the operator to find the error and, in case of the operation being correct, the operator is easy to recognize a new. Thus, even in the selection menu screen where the operational failures are liable to occur, the operator is enabled to naturally learn and memorize a correct operation, thereby promoting a mental model formation in the operator.

Furthermore, with respect to the selective operation in the same operational direction as that of the preceding operation that has been interrupted by the operator upon occurrence of the vibration of the stick 21A1, the vibration of the stick 21A1 is inhibited. As such, with respect to the operation that is confirmed or that is performed with certainty, it is possible to prevent the operator from suffering from cumbersome feelings due to alerting caused by the vibration of the stick 21A1.

Also, with respect to the operational direction in the menu screen where the mental model formation is promoted to allow the mental model formation to be partially finished, no vibration occurs in the stick 21A1, resulting in improvement over an efficiency of stick operation as a whole.

In such a way, the vibrating control section 407h serves as an adjusting section for adjusting a moveable mode of the stick 21A1 and controls the moveable mode in the form of the vibrating mode of the stick 21A1.

As set forth above, since such advantageous effects are realized by the feeling arising from the stick 21a1, these effects can be reliably obtained even under operational circumferences where no attention is paid to the menu screen, that is, the front seats of the automobile.

Additionally, since the third embodiment takes the form of a structure adapted to apply the vibration to the stick in place of applying the repulsion force to the stick as in the second embodiment, a lower production cost can be realized.

Next, a fourth embodiment of the present invention is described with reference to the drawings.

The fourth embodiment differs from the first embodiment in that a movable area control section 407i and an operational direction judgment section 407j are provided in the stick control computing device 407B in place of the operation history judgment section and the operational direction correcting section.

Figure 34:
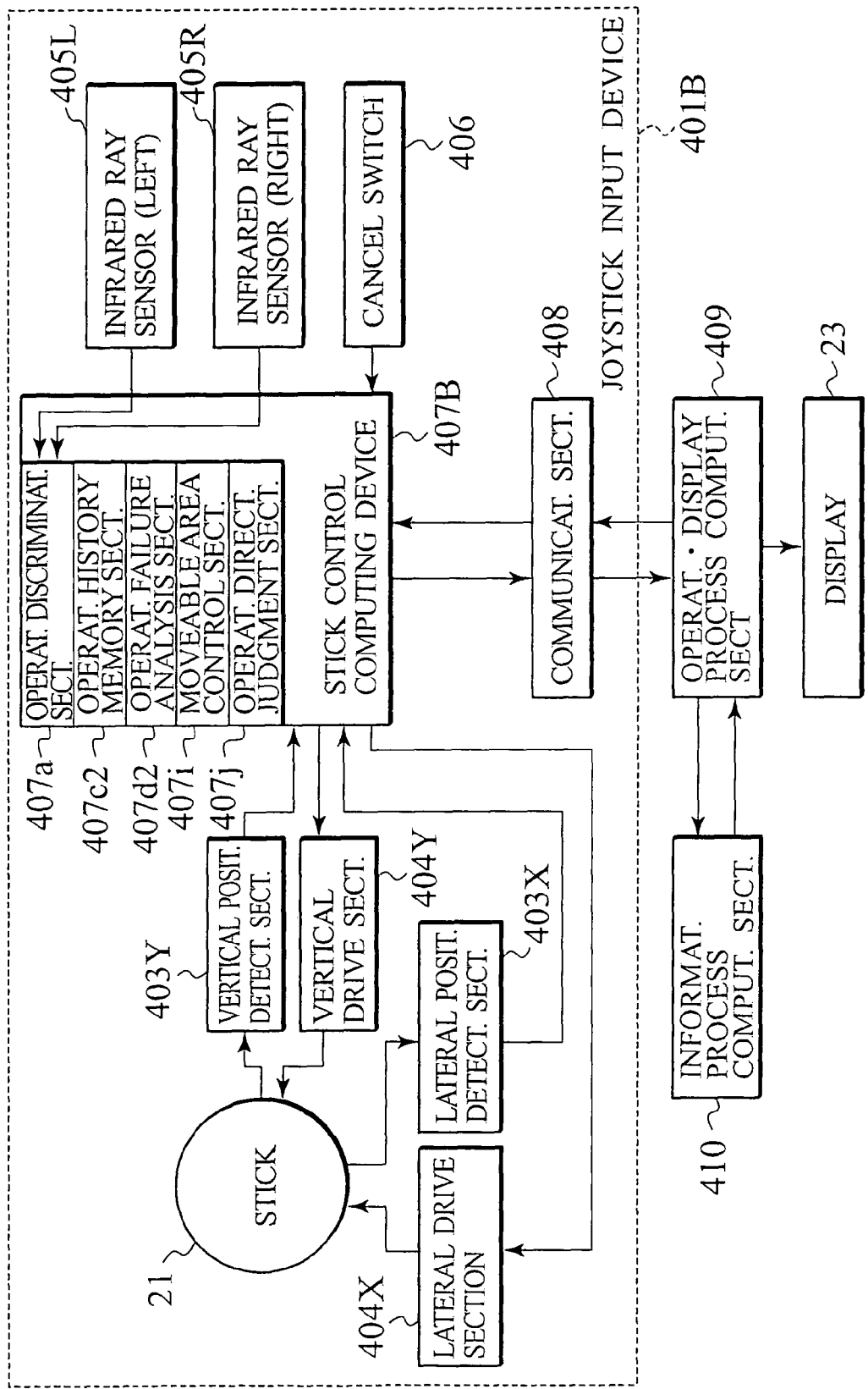
FIG. 34 is a control block diagram of a joystick input device of a fourth embodiment.
Figure 35:
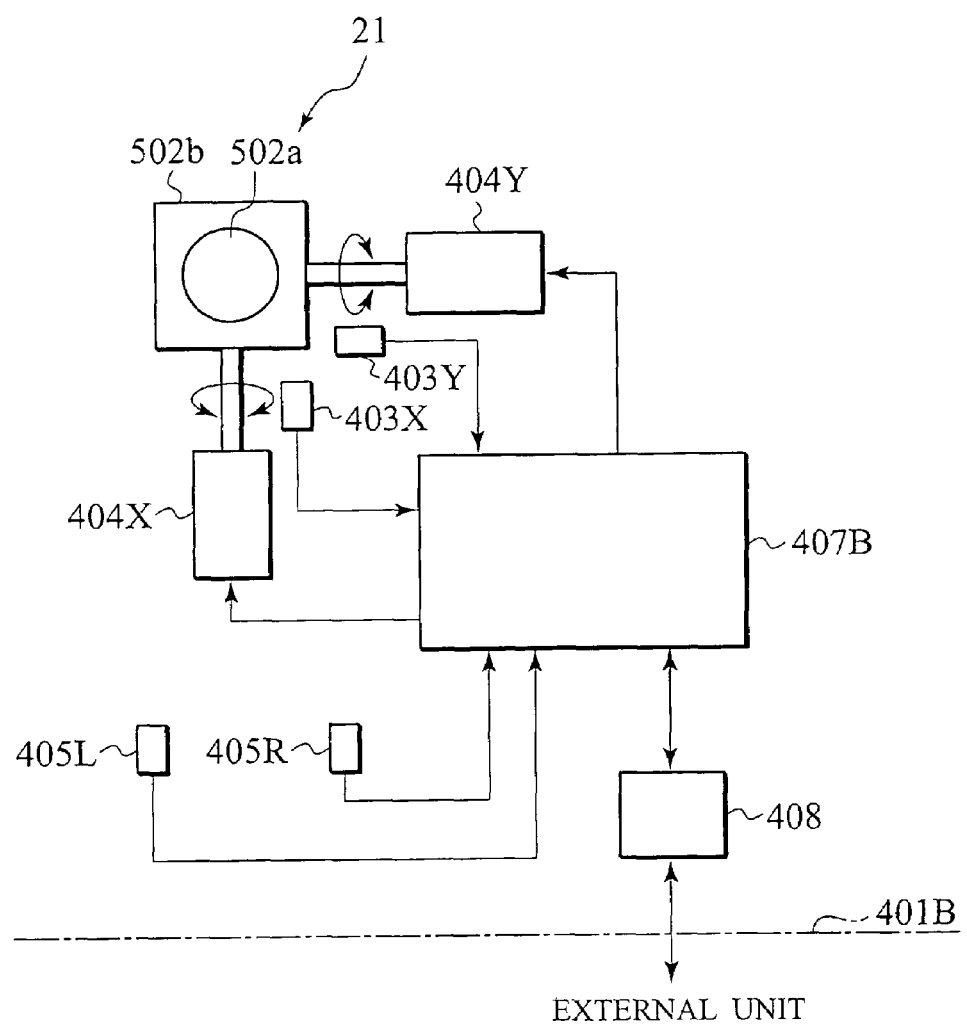
FIG. 35 is a view illustrating a hard structure of the joystick input device of the fourth embodiment.

In FIGS. 34 and 35, the same structural components as those of the first embodiment bear like reference numerals and only differing structural components are described below to avoid redundant description.

In the presently filed embodiment, the stick control computing device 407B incorporates therein an operator discriminating section 407a, an operation history memory section 407c2, an operation history analysis section 407d2, a movable area control section 407i and an operational direction judgment section 407j.

The operator discriminating section 407a discriminates the seated position of the current operator responsive to the detection signals delivered from the infrared ray sensors 405L, 405R. The way of discrimination is the same as that of the first embodiment.

The stick control computing device 407B is applied with the current GUI condition from the operation and display process computing section 409 via the communicating section 408.

The stick control computing section 407B determines the operational direction layout of the stick 21 on the basis of the current GUI condition (involving the operational type, the hierarchy position and the number of selection legs) and controls the movable area to allow the stick 21 to be moved in accordance with the operational direction layout.

Figure 39A:
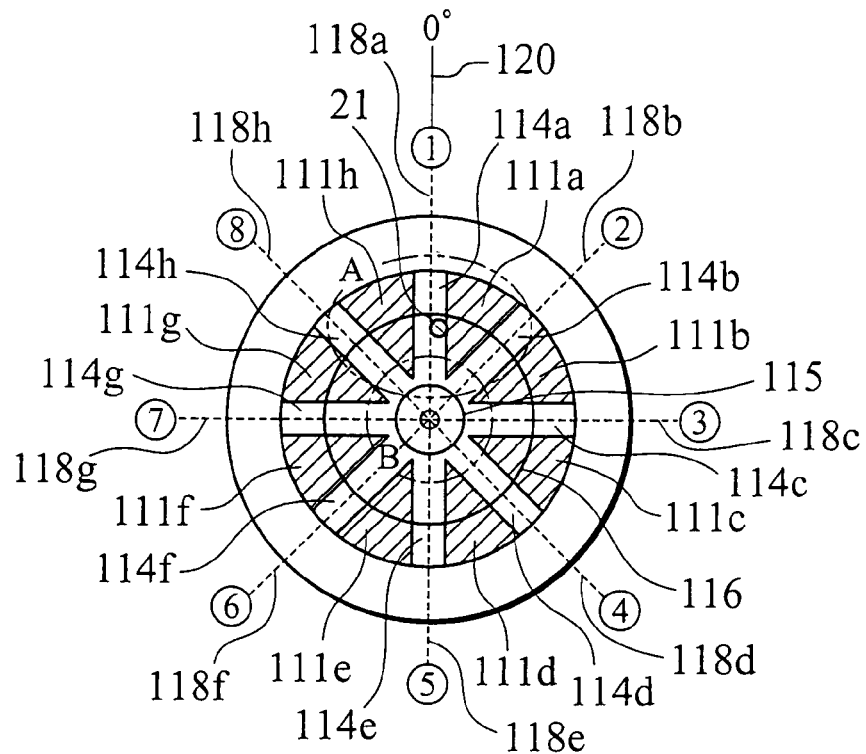
FIGS. 39A, 39B and 39C are views illustrating moveable areas.

FIG. 39A shows a detail of the movable area of the stick in association with the operational layout of the eight selection legs as shown in FIG. 9A. FIG. 39A is a pattern which describes a detail of the structure of FIG. 6 related to the first embodiment. To provide an ease of understanding, this structure is explained again.

Directions ① to ⑧ associated with moveable regions shown in FIG. 39A represent respective operational direction numbers of the operational direction layout, such as eight pieces or four pieces in the operational direction number determined by setting GUI and correspond to respective selection legs in the current GUI condition.

Figure 39B:
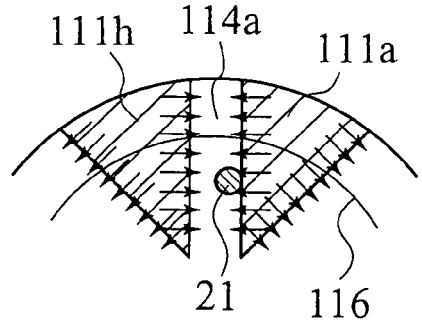

As shown in slanted areas in FIG. 39A, the operation guides 111 (111a to 111h) are formed in a peripheral direction along a circumferential periphery of the stick 21. The operation guides 111 includes regions into which the stick 21 is hard to enter and, if the stick 21 is tried to enter the region, a force to return the stick 21 from the operation guides 111, as shown in FIG. 39B with a portion A being enlarged in scale, is created by the lateral drive section 404X and the vertical drive section 404Y With such a configuration, blank portions between the adjacent operation guides 111 form the moveable regions 114 (114a to 114h) and, when tilting the stick 21 from the central play area 113 in the radial direction as shown in FIG. 39C which shows a portion B of FIG. 39A in an enlarged scale, if the operational direction angle is substantially held in alignment with either one of the respective moveable regions 114 represented by the operational direction numbers ① to ⑧, the stick 21 comes to be guided in a desired operational direction.

The operational guides 111 are formed by the stick control computing device 407 that controls the lateral drive section 404X and the vertical drive section 404Y depending on the stick position detected by the lateral position detecting section 403X and the vertical position detecting section 403Y during tilting movements of the stick 21.

The operational direction judgment section 407j judges an operational displacement value and an operational direction angle of the stick 21 responsive to detected values of the lateral position detecting section 403X and the vertical position detecting section 403Y and executes subsequent operation.

Figure 39C:
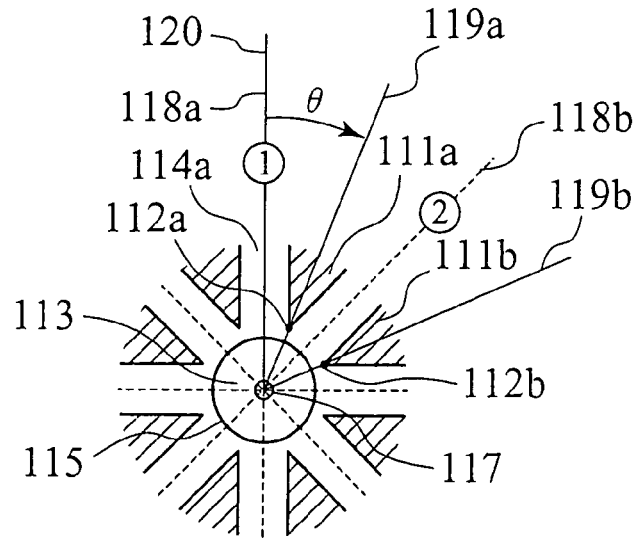

First, when the operational direction judgment section 407j detects a result in that a distance between a particular position, in which the stick 21 is operated by the operator and which is detected by the lateral position detecting section 403X and the vertical position detecting section 403Y, and the neutral position 117 is greater than a given value, that is, when an occurrence of the stick 21, traveling beyond an operational direction angle judgment circle 115 shown in FIG. 39C, is detected, the operational direction judgment section 407j outputs an operational direction angle judgment signal and an operational direction angle θ to the operational history memory section 407c2.

When the operational direction judgment section 407j detects the result in that the distance between the particular position, in which the stick 21 is operated by the operator and which is detected by the lateral position detecting section 403X and the vertical position detecting section 403Y, and the neutral position 117 is greater than the given value, that is, when the occurrence of the stick 21, traveling beyond an operation judgment circle 116, is detected, the operational direction judgment section 407j judges that there is operation. Additionally, the operational direction judgment section 407j judges to find if the stick 21 is located in either one of the moveable regions 114a to 114h and outputs an operation presence signal and an operational direction number i to the operation history memory section 407c2.

This means that selection from the selection legs in the current GUI condition is performed and the stick control computing device 407B outputs an associated selection leg signal to the external operation and display process computing section 409 via the communicating section 408.

Also, as shown in FIG. 39A, the operational guides 111 are located in an outside area of the operational direction angle judgment circle 115. The operation judgment circle 116 takes a larger radius of curvature than that of the operational direction angle judgment circle 115 and is set so as to intersect the operational guides 111.

The operation history memory section 407c2 monitors the current GUI condition and accumulatively stores operational direction angles θ as travel loci of the stick 21 for each combination between the operator's seated position and the operational direction layout and, additionally, for each operational direction in response to the operation presence signal delivered from the operational direction judgment section 407e.

Further, the operation history analysis section 407d2 analyzes a distribution pattern of the operational direction angles θ that are accumulatively stored and calculates a statistic of distribution of the operational direction angles θ.

In addition, the moveable area control section 407i alters the setting of the moveable area 114 in a direction to reduce an occurrence tendency of the operational failures based on the distribution pattern of the operational direction angles θ.

Now, control of the stick 21 in the stick control computing device 407B is described.

Figure 36:
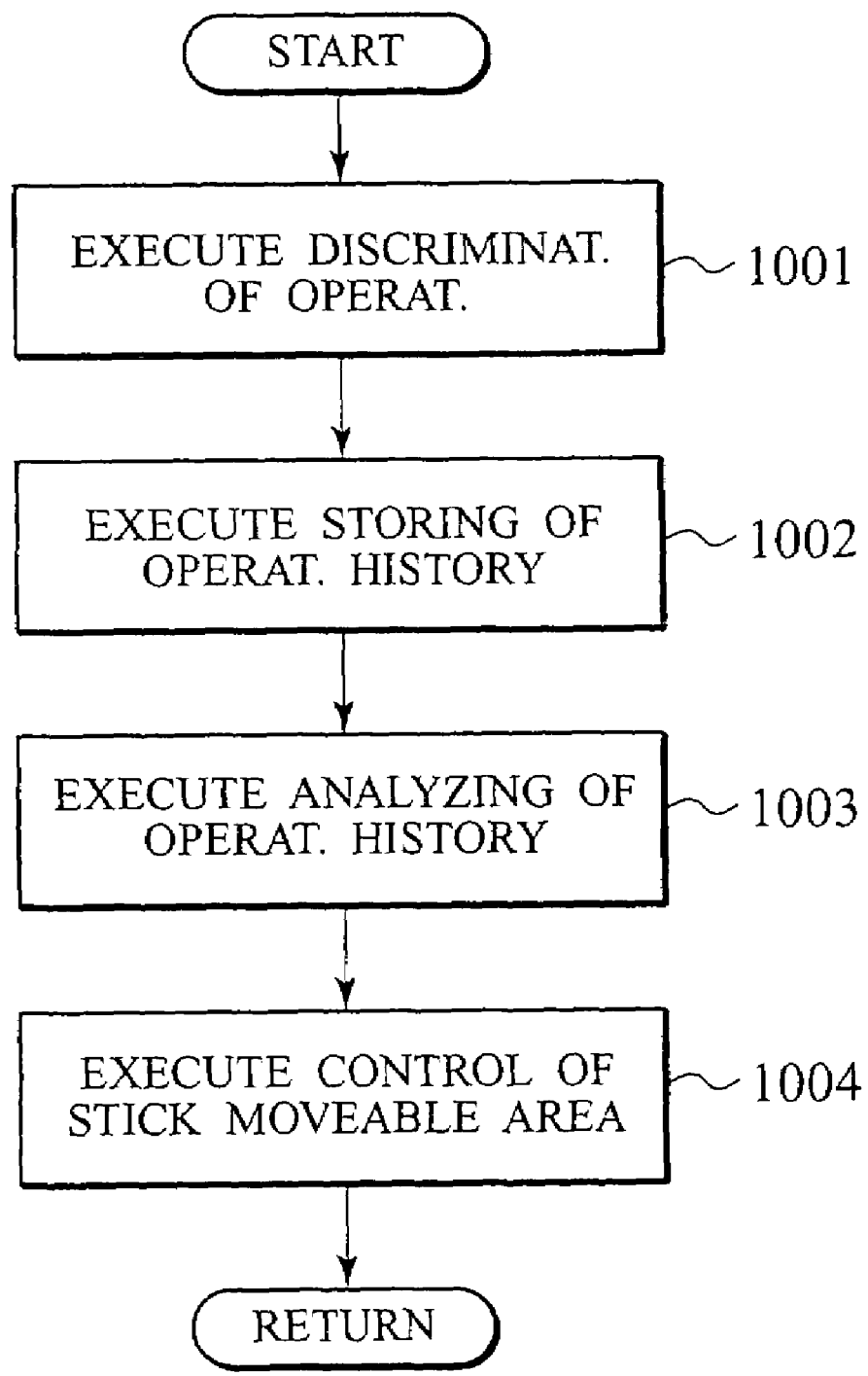
FIG. 36 is a flowchart illustrating entire flow of stick control.

FIG. 36 is a basic flowchart illustrating overall flow of stick control.

In step 1001, the operator discriminating section 407a judges to find whether the operator is a person who sits on the driver's seat or a person who sits on the assistant driver's seat in response to the detection signals from the infrared ray sensors 405L, 405R located on left and right sides of the stick 21.

In step 1002, the operation history memory section 407c2 accumulatively stores the operational direction angles θ as the travel loci of the stick 21 resulting from the operation of the stick 21 for each combination between the operator's seated position and the operational direction layout associated with each GUI and, additionally, for each operational direction.

In step 1003, the operation history analysis section 407d2 analyzes an operation history stored in the operation history memory section 407d2 through statistic operation and calculates an average value of the operational direction angles, a standard deviation, a discriminated value and an erroneous discrimination rate, which are described below, for each operational direction.

In step 1004, the moveable area control section 407i alters the setting of the moveable area 114, that if, the setting of the operational guides 111 depending on the seated position of the operator.

The setting of the operation guides 111 is used for controlling the lateral drive section 404X and the vertical drive section 404Y, and the stick 21 is moved in accordance with the set configuration of the operation guides 111 for each combination between the operator's seated position and the operational direction layout, permitting the whole of the operational directions to be controlled in dependence on the seated position.

Now, the above-described operator discriminating operation, operation history storing operation, operation history analyzing operation and stick moveable area controlling operation are described below in detail in sequence.

First, the operator discriminating operation in the operator discriminating section 407a is the same as that of the first embodiment (see FIG. 8) and its description is herein omitted.

Next, the operation history storing operation in the operation history memory section 407c2 is described.

Figure 37:
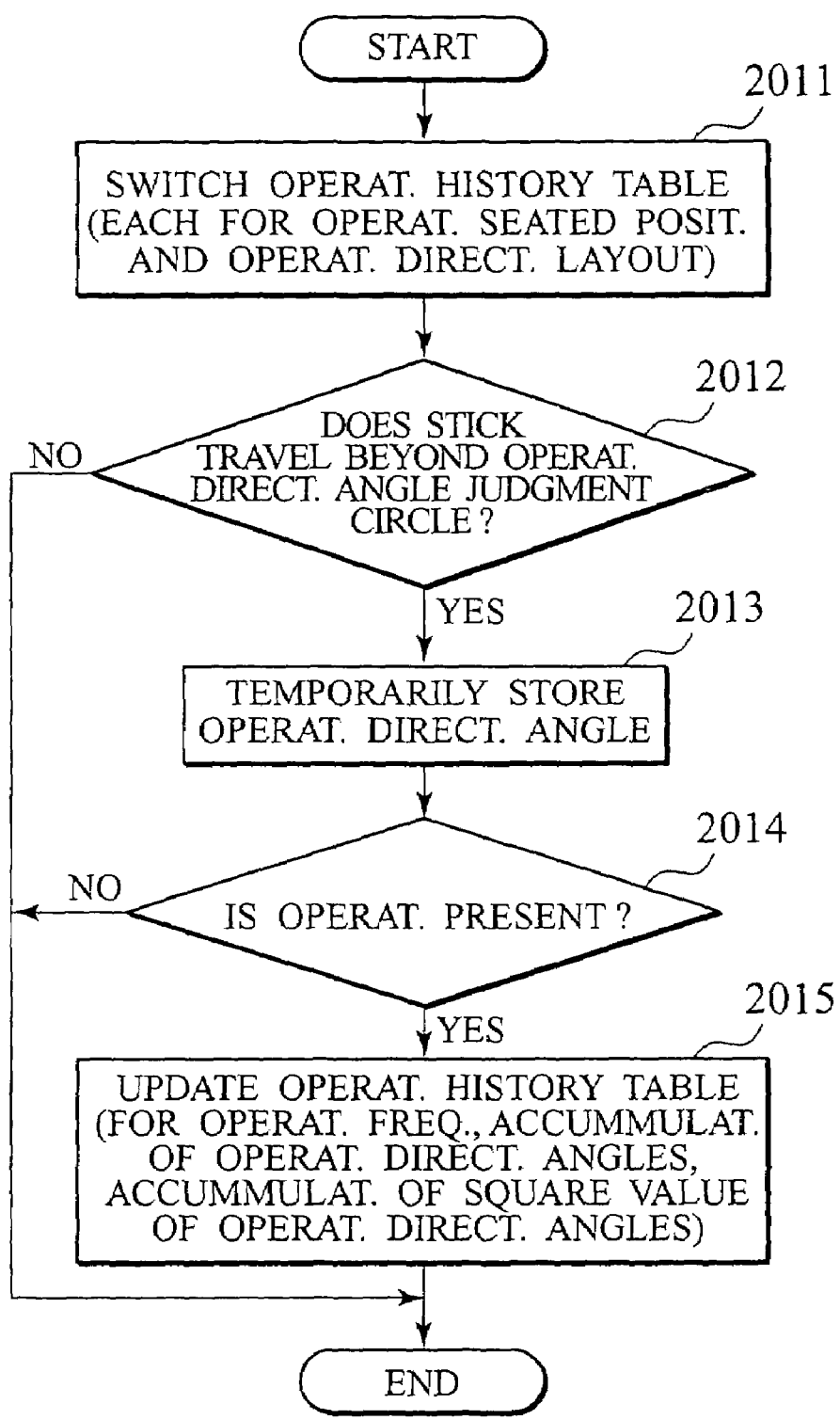
FIG. 37 is a flowchart illustrating flow of operation history storing operation.

FIG. 37 is a flowchart illustrating flow of the operation history storing operation.

Initially, in step 2011, an associated operation history table is switched responsive to the operational direction layout, associated with the GUI condition inputted from the operation and display process computing section 409 through the communicating section 408, and the operator's seated position judged in the above-described operator discriminating operation.

Figure 38:
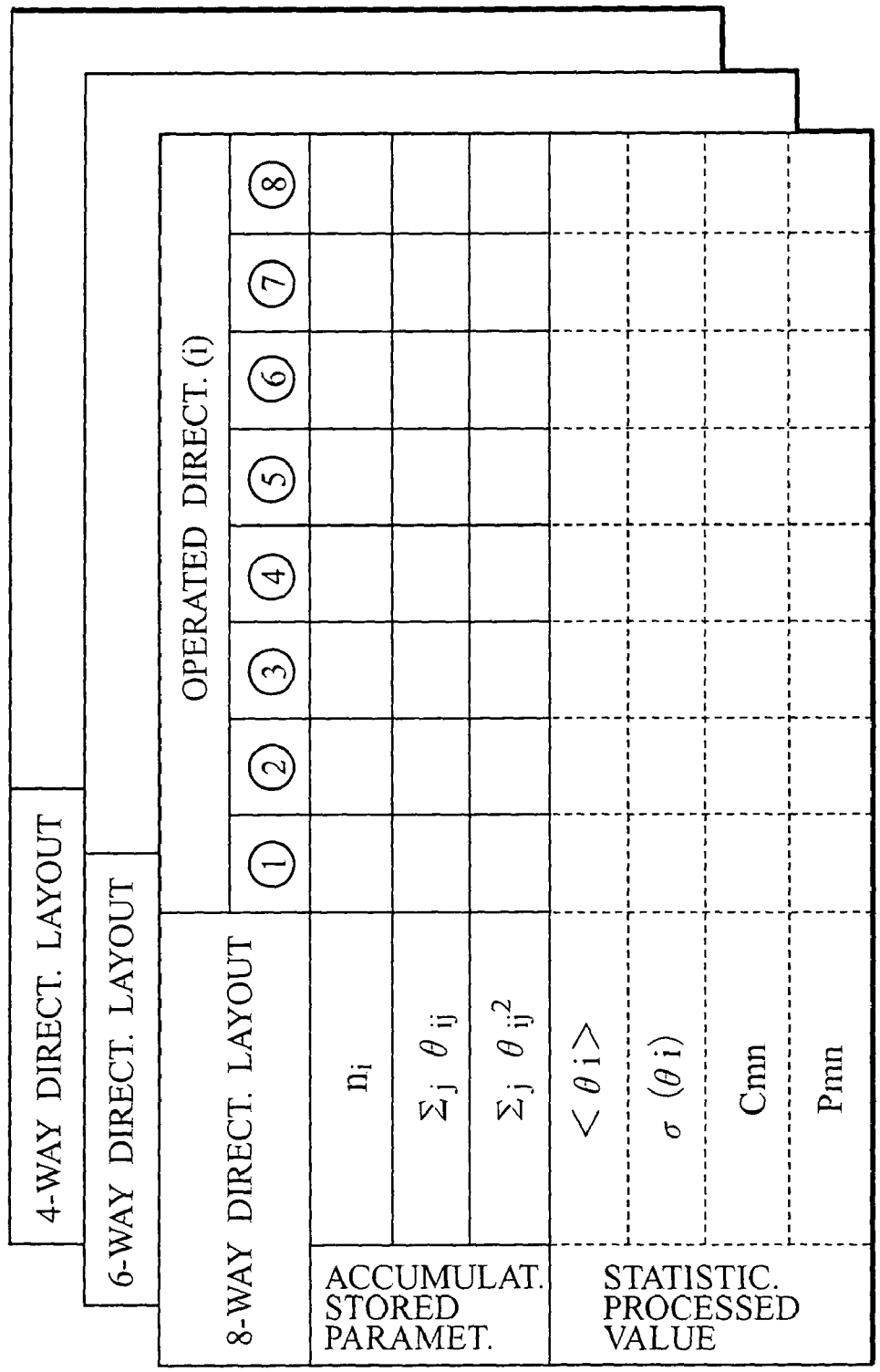
FIG. 38 is an illustrative view of an operation history table.

The operation history table is a two dimensional array table as shown in FIG. 38 and has discrete memory areas each for the operator's seated position (for left seat and for right seat) and for the combination of the operational direction layout.

In the presently filed embodiment, 4-way, 6-way and 8-way, that is, three types of layouts are included in the operational direction layout, and tables of respective three kinds are used for the left seat and for the right seat.

In step 2012, operation is executed to check if the stick 21 is operated to travel beyond the operational direction angle judgment circle 115.

Upon detection of the stick 21 operated to travel beyond the operational direction angle judgment circle 115, flow is routed to step 2013 and, if not, flow of the operation history storing operation is terminated.

In step 2013, the operational direction angles θ inputted from the operational direction judgment section 407*j* are tentatively stored in the buffer.

In step 2014, operation is executed to check if the stick 21 is operated.

Upon detection of the operation presence status of the stick 21, flow is routed to step 2015 and, if not, flow of the operation history storing operation is terminated.

In step 2015, the operation history table is updated.

The operation history memory section 407*c*2 retrieves the operational direction angles θ stored in the buffer responsive to the operation presence signal and the operational signal number i delivered from the operational direction judgment section 407*j* to add 1 to the operational frequency $n_i$ in the column associated with the operational direction number i in which the current operation history table is operated such that the operational direction angles θ are added to an accumulative sum $\Sigma_j \theta_{ij}$ of the operational direction angles $\theta_{ij}$ and the square of the operational direction angles θ is added to the square accumulative sum $\Sigma_j(\theta_{ij})^2$ of the operational direction angles.

Here, a suffix "j" represents individual operations of the stick 21, and a suffix "i" represents the operational direction number i.

Also, if the selective operation for the selection leg is cancelled by the cancel switch 406, the operational direction angles θ stored in the buffer are retrieved, with a cancelled component being subtracted from an accumulative sum calculation result of the operation history tables which have been set forth above.

Figure 40:
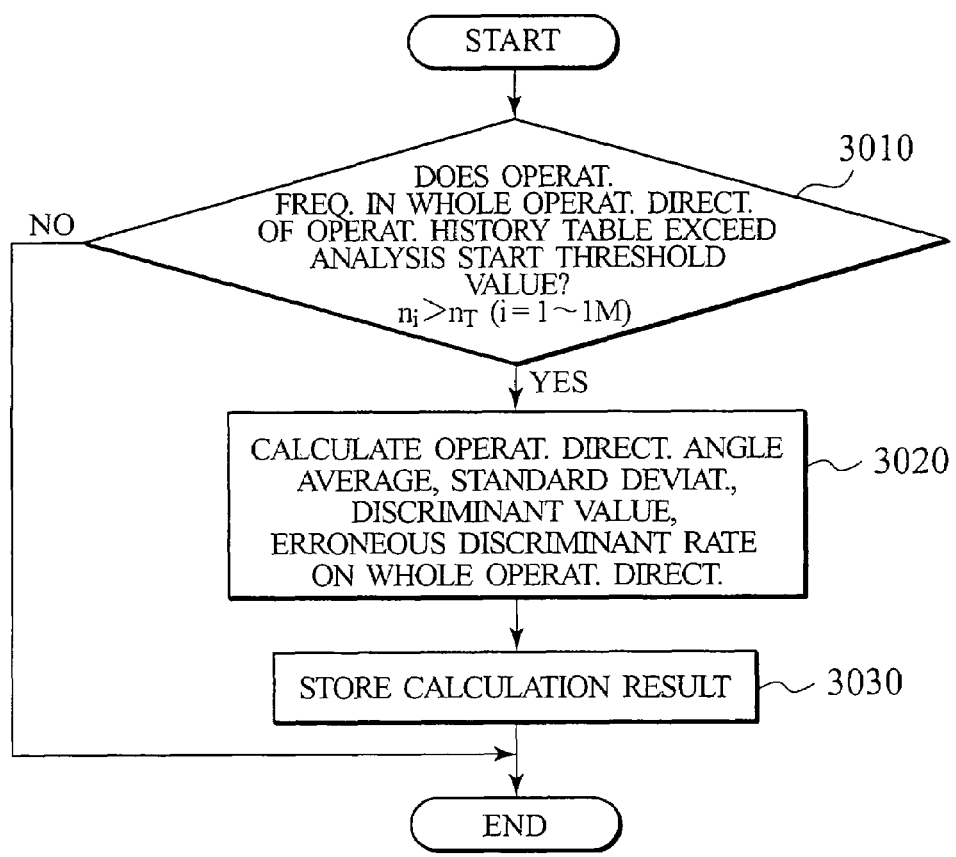
FIG. 40 is a flowchart illustrating flow of operation history analyzing operation.
Figure 41:
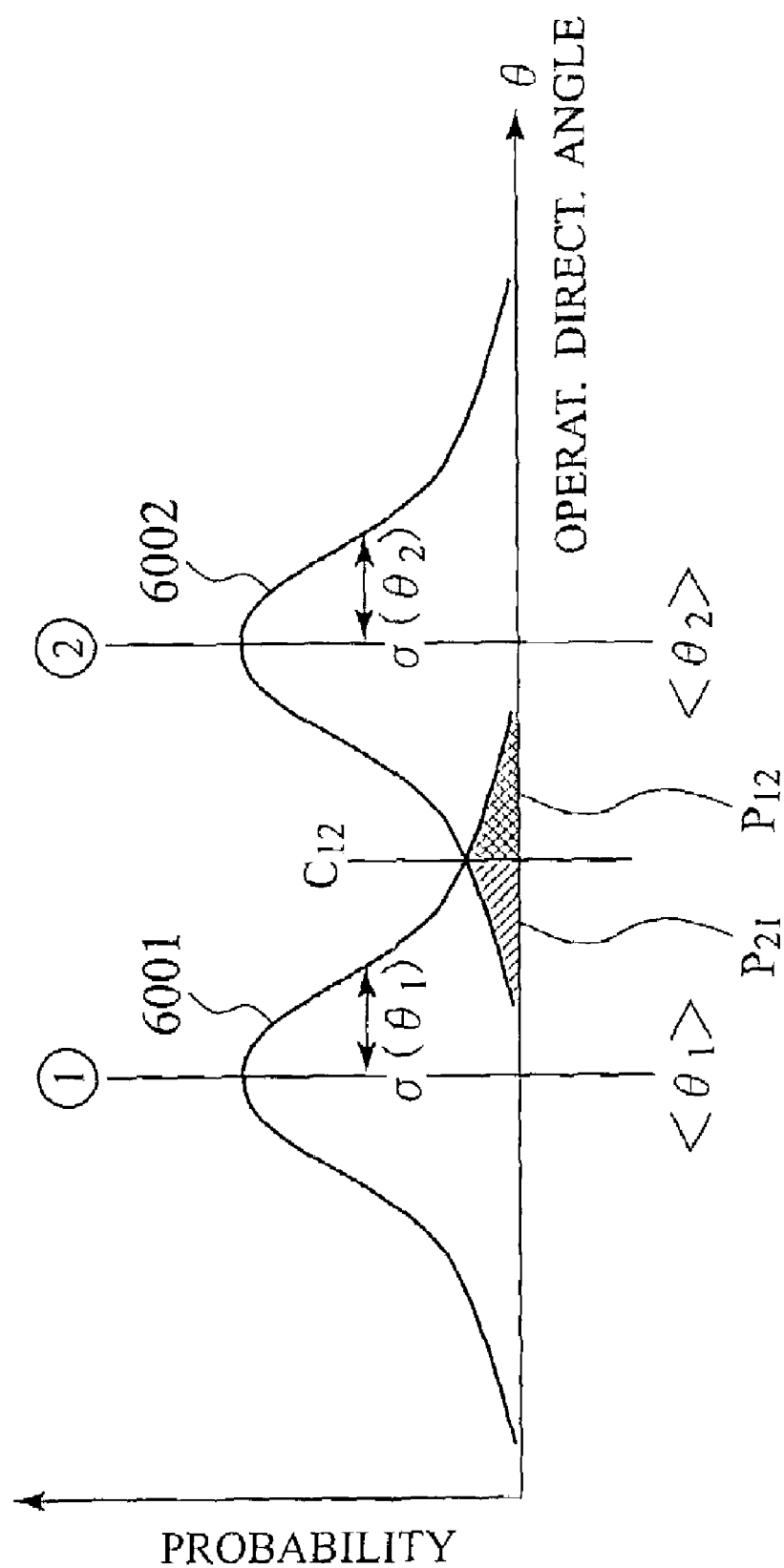
FIG. 41 is a view illustrating a result obtained by statistically processing an operation history.

Next, the operation history analyzing operation in the operation history analysis section 407*d*2 is described with reference to a flowchart of FIG. 40 and a distribution pattern of the operational direction angles shown in FIG. 41.

In step 3001, the operation history tables are monitored and, with respect to the operation history table for each combination between the operator's seated position and the operation layout, operation is executed to judge if the operational frequency $n_i$ of the whole operational directions (i=1 to operational direction number IM) exceeds an analysis start threshold value $n_T$.

This is because of the fact that in order to perform statistic operation to be described later, there is a need for preparing an adequately large number of samples. The analysis start threshold value differs depending on a demanded accuracy level in the distribution pattern and it is sufficient to take $n_T$=100 in a general practice.

In a case where the operational frequency of the whole operational directions in the relevant operation history table exceeds the analysis start threshold value $n_T$, flow proceeds to step 3002 wherein operation is executed to calculate the average of the operational direction angles, the standard deviation, the discriminated value and the erroneous discrimination rate for statistic operation of the distribution pattern of the operational direction angles covering the whole operational directions. If not, this operation is terminated.

Here, a formula of operational direction angle average <$\theta_i$> is expressed as $$<\theta_i> = \frac{1}{n_i}\sum_j \theta_{ij} \quad (1)$$

The standard deviation σ ($\theta_i$) of the operational direction angles is defined as $$\sigma(\theta_i)^2 = \frac{n_i}{n_i-1}*\left(\frac{1}{n_i}\sum_j \theta_{ij}^2 - <\theta i>^2\right) \quad (2)$$

From these values, the discriminated value $C_{mn}$ between the adjacent operational directions m, n in the following formula is calculated in a formula expressed as $$C_{mn} = \frac{<\theta_m>*\sigma(\theta_n)+<\theta_n>*\sigma(\theta_m)}{<\theta_m>+<\theta_n>} \quad (3)$$

Also, the discriminated value $C_{mn}$ is derived in the following formula. From a condition in that Maharanobis General Distances are equal, a formula (4) is guided and is deployed in a formula (5) which is expressed as $$\frac{(C_{mn}-<\theta_m>)^2}{\sigma(\theta_m)^2} = \frac{(<\theta_n>-C_{mn})^2}{\sigma(\theta_n)^2} \quad (4)$$

$$\frac{C_{mn}-<\theta_m>}{\sigma(\theta_m)} = \frac{<\theta_n>-C_{mn}}{\sigma(\theta_n)} \quad (5)$$

This formula (5) is arranged, thereby obtaining the formula (3).

Here, it is supposed that a probability distribution of the operational direction angles θ is a normal distribution curve which is standardized in a surface area of 1.0 in terms of a variable x resulted by dividing a difference, resulting from the operational direction angle (θ) average on the abscissa <$\theta_i$>, by the standard deviation σ ($\theta_i$). Suppose that a product obtained by integrating this normal distribution curve using a range of x>$x_0$ or x<-$x_0$ in terms of $x_0$ is assigned as functions of $P_r\{x;x>x_0\}$ or $P_r\{x;x<-x_0\}$, the erroneous discrimination rate $P_{mn}$ is expressed as $$P_{mn}=P_r\{x;x>(C_{mn}-<\theta_m>)/\sigma(\theta_m)\} \quad (6)$$

The meanings of the discriminated value $C_{mn}$ and the erroneous discrimination rate $P_{mn}$ are described with reference to FIG. 41. The abscissa represents the operational direction angle θ, and the coordinates represent the probability.

The operational direction angle average <$\theta_1$>, <$\theta_2$> and the standard deviations σ ($\theta_1$), σ ($\theta_2$) are calculated from the distribution of the operational direction angles related to the operational directions ① and ②. Further, the discriminated $C_{12}$ and the erroneous discrimination rate $P_{12}$, $P_{21}$ related to operational directions ① and ② are calculated.

From the operational direction angle average and the standard deviation, the normal distribution curves 6001, 6002 are determined, respectively.

The meaning of the discriminated value $C_{mn}$ (here, $C_{12}$) is the operational direction angle in that, when in comparison between the probability of the normal distribution curve 6001, in which a final operational direction prevailing between the adjacent operational directions ① and ② to exceed the operation judgment circle 116 lies on the direction ① and the stick exceeds the operational direction judgment circle 115 at the operational direction angle closer to the operational direction ②, and the probability of the normal distribution curve 6002, in which the final operational direction permitting the stick to exceed the operation judgment circle 116 lies on the direction ② and the stick exceeds the operational direction judgment circle 115 at the operational direction angle closer to the operational direction ①, as the value of θ increases on the border of this value $C_{12}$, the probability of the latter increases.

The meaning of the erroneous discrimination rate $P_{mn}$ (here, $P_{12}$) is the probability that, when predicting the final operational direction from the operational direction angle in which the adjacent operational directions ① and ② are delimited at an angle of the discriminated value $C_{12}$ and the stick travel exceeds the operational direction judgment circle 115, is erroneously predicted. Stated another way, when preparing a physical boundary, for discriminating the operational directions ① and ②, at a position on a directional traverse 119*a* laying on the operational direction judgment circle 115 as viewed in FIG. 39C, is apt to be discriminated as the adjacent operational direction ② in contrast to the operational direction ① to which the operation is intended.

Also, the erroneous discrimination rate $P_{mn}$ is expressed as in a formula (7) and, due to a symmetry between the formula (5) and the normal distribution, the solution is $P_{nm}=P_{nm}$.

$$P_{nm}=P_r\{x;x<-(<\theta_n>-C_{mn})/\sigma(\theta_n)\} \quad (7)$$

In step 3003, operation is executed to store the operational direction angle averages, the standard deviations, the discriminated values and the erroneous discrimination rates in terms of the whole operational directions in compliance with the relevant operation history table.

The memory area is provided in the operation history memory section 407*c*2 as shown in the column described in the dotted line at a lower half of the operation history table of FIG. 38 in the presently filed embodiment.

Figure 42:
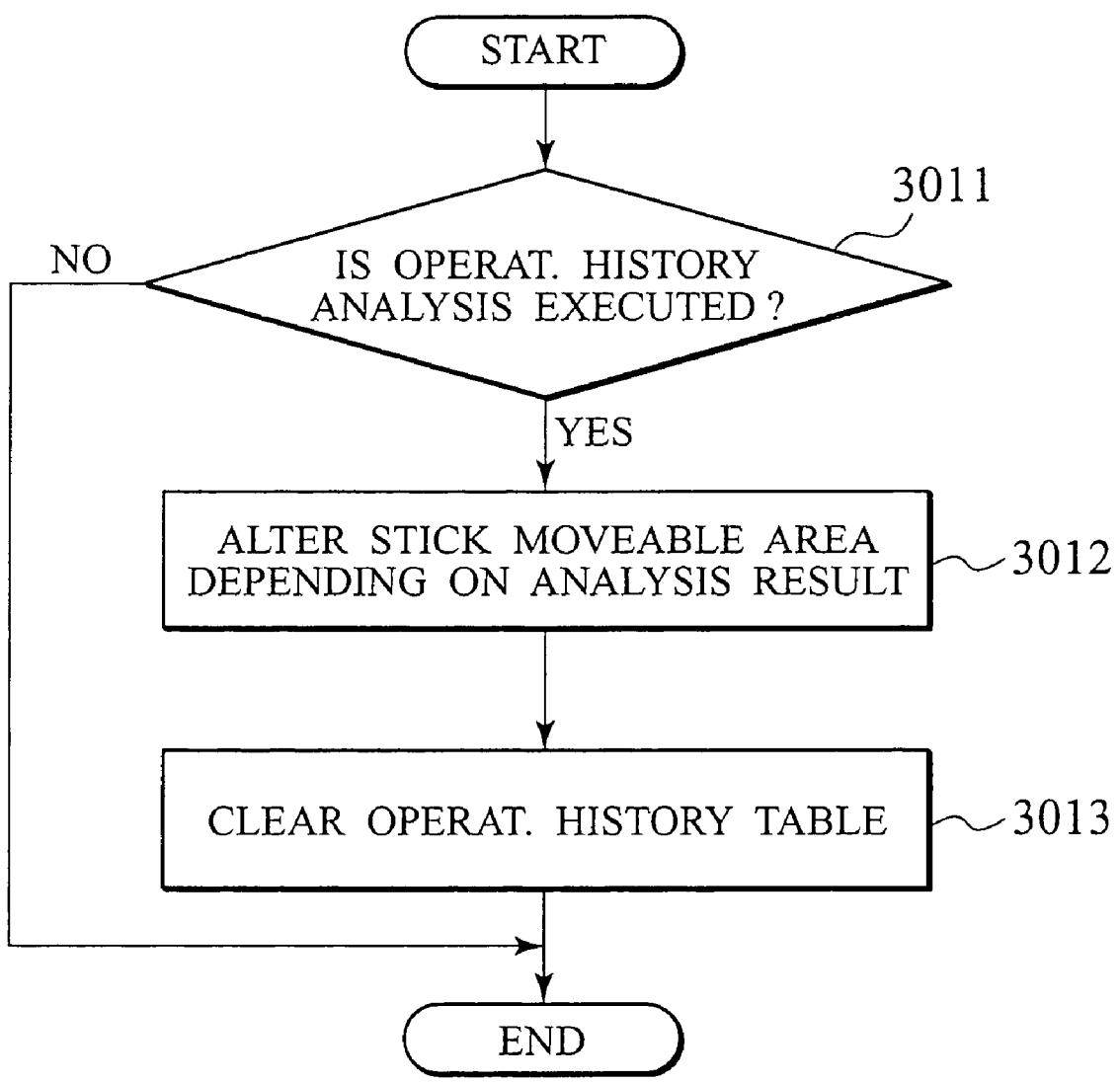
FIG. 42 is a flowchart illustrating flow of moveable area control operation.

Next, flow of control of the moveable area of the stick 21 in the moveable area control section 407*j* is described with reference to FIG. 42.

In step 3011, the moveable area control section 407*i* monitors the operation history analysis section 407*d*2 and operation is executed to check if the operation history analysis section 407*d*2 has implemented operation history analysis operation with respect to the operation history table. If no operation history analysis operation is executed, operation is terminated and if the operation history analysis operation has been executed, flow is routed to step 3012.

In step 3012, operation is implemented to retrieve the operation history table, subjected to the operation history analysis operation, from the operation history memory section 407*c*2 and to retrieve the statistical value, such as the operational direction average, the standard deviation and the discriminated, of each operational direction i that is stored whereupon the operation guides 111, for determining the moveable area of the stick 21, are altered to be set in compliance with the operational angle distribution of the stick 21.

Figure 43A:
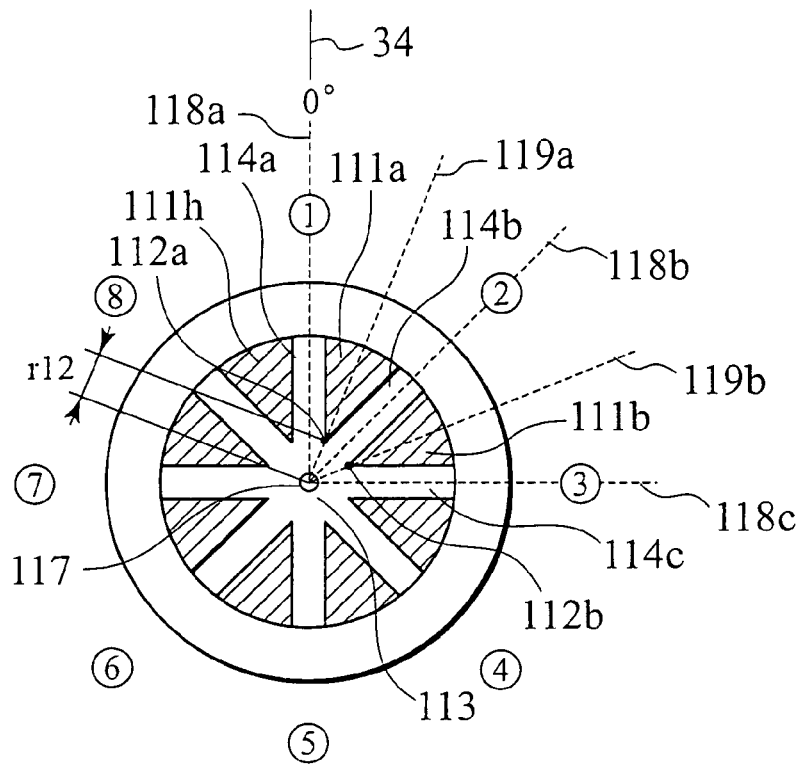
FIGS. 43A and 43B are illustrative views of the moveable areas that are set and altered.

The operation guides 111 are configured in equilateral shapes associated with the number of the operational directions even with respect to the combination between any operational direction layout and the operator's seated position. An example of 8-way type is shown in FIG. 43A, wherein the moveable regions 114 (representatively displayed as at 114*a* to 114*c* in the figure) are determined at 45 degree interval on a base point of the center line 120 with respect to the operational directions ① to ⑧.

Central directions of the respective moveable regions 114 are indicated by regional center directional lines 118 (representatively indicated as at 118*a* to 118*c* in the figure).

Figure 43B:
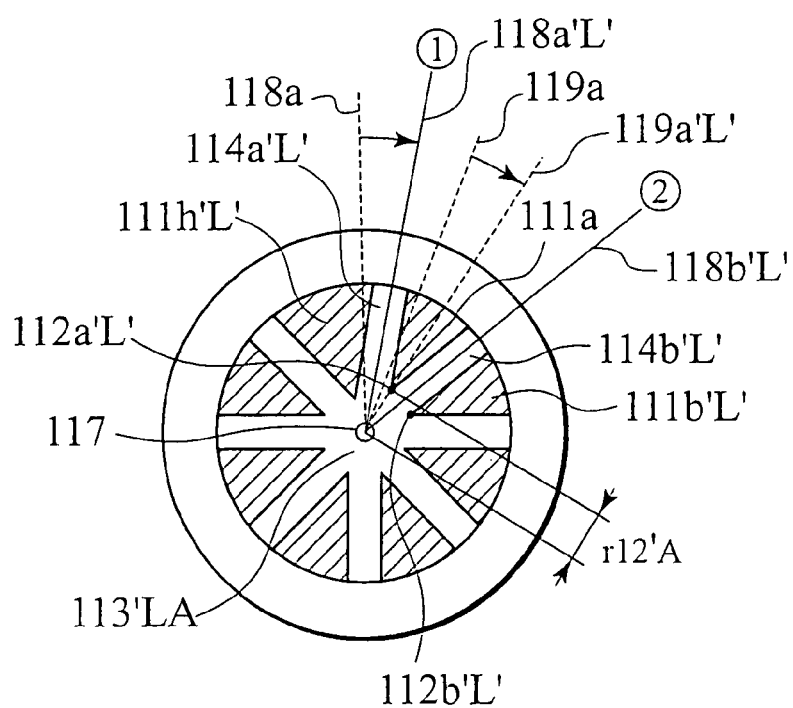

FIG. 43B shows a case in which, with respect to a certain operation history table, the moveable area is set to be altered upon reflection of the operation history analysis operation result obtained as set forth above, and in which, in order for the center directions of the moveable regions 114 to be aligned with the operational direction angle average <θ$_i$>with respect to the respective operational directions i (i=1 to IM), especially in case of the operational directions ① and ②, the respective directional lines are displaced toward the regional center directional lines 118*a*1, 118*b*1, respectively. Also, in case of the adjacent operational directions ① and ②, the respective directional lines are displaced clockwise to allow the discrimination boundary direction, forming an apex of each operation guide, to be brought into alignment with the discriminated value $C_{12}$, and the apex 112*a*1 of the operation guide 111*a*1 is set on the discrimination boundary directional line 119*a*1.

In addition, a distance $r_{mn}'$, ($r_{12}'$) between the neutral point 117 of the stick 21 and the apex 112A (112*a*1) of the above-described operation guide is set to be brought into alignment with a value in which a value, obtained by multiplying a difference R between the radius of the operation judgment circle 116 and the radius of the operational direction angle judgment circle 115 by the erroneous discrimination rate $P_{mn}$ (($P_{12}$) in this example), is added to the operational direction angle judgment circle 115.

While the structure shown in FIG. 43B has been shown in connection with an example with only operation guides 111*a*1, 111*b*1 being modified in shape, it is an actual practice for the operation guides in whole operational directions to be altered in shape to satisfy the need in order to reflect the statistic process result of the operation history.

In such a way, a moveable region 114*a*1 is defined between adjacent operation guides 111*a*1 and 111*h*1 such that, when tilting the stick 21 in the radial direction from the central play area 113A, if the moveable region 114A1 and the substantial operational direction angle is in alignment, the stick 21 is caused to be guided in the desired operational direction ①.

The settings of the shapes of the operation guide 111 or 111A are stored in the moveable area control section 407*i* each for a combination between the relevant operator's seated position and the correlated operational direction layout and maintained until the operation history analysis operation is subsequently executed and its result is reflected in the moveable area control section 407*i*.

In step 3013, operation is implemented to clear data of respective columns of the accumulative memory parameter and the statistically processed value of the operation history table, in which the moveable regions have been set and altered, to zero.

Thus, in subsequent operation, the operation history memory section 407*c*2 begins to accumulate data, related to new operational direction angles, in the relevant operation history table each for operation of the stick 21.

The stick 21 of the presently filed embodiment forms a terminal end. Also, step 1001 forms an operator discriminating means, step 1002 forms an operation history storing means, step 1003 forms an operation history analyzing means and step 1004 forms a moveable area control means. Also, the moveable area control means serves as an adjusting means for adjusting a moveable mode of the stick 21 by deforming the profile of the operation guide 111.

As previously noted above, with the presently filed embodiment, the joystick input device adapted to be installed on the center cluster 20 of the vehicle is configured to allow the operation guides 111A to be set such that the seated position of the operator is discriminated and the operational direction angles of the stick 21 are accumulatively stored for each combination between the seated position of the operator and the operational direction layout whereupon, in response to the statistically processed result of the operational direction angle distribution with respect to the operational direction i, the central direction of the moveable area is defined by the operational direction angle average <$\theta_i$>, at which operation frequency of the stick 21 is high, and the stick operation is guided to allow the discriminated value $C_{mn}$ to define the discrimination boundary direction between the adjacent operational directions.

Further, the play area of the stick is so arranged as to increase due to an ability in that the larger the probability in which the stick is erroneously operated with respect to the adjacent operational directions, the greater will be the distance $r_{nm}{'}$ between the apex 112A of the operation guide 111A and the neutral point 117.

As a result, it is possible to automatically set the operation guides, upon reflection of the operation history, which serve as the guides with the moveable area adapted for a difference in operability of the stick 21 depending on the seated position and the right hand or the left hand of the operator, a peculiarity of the individual operator, a property caused by a difference in body, circumferences with occurrence of deviation or swing, caused by a layout position of the stick, and the operation layout, resulting in a capability of achieving reduction in operational failures.

In addition, the use of the operational direction angle as the operational loci of the stick makes it possible to achieve an analysis of the operational locus distribution of the stick in a minimum volume of data and calculation volume, enabling control of the moveable area with a relatively small scale and low cost structure.

Next, a fifth embodiment is described with reference to the drawings.

Figure 44:
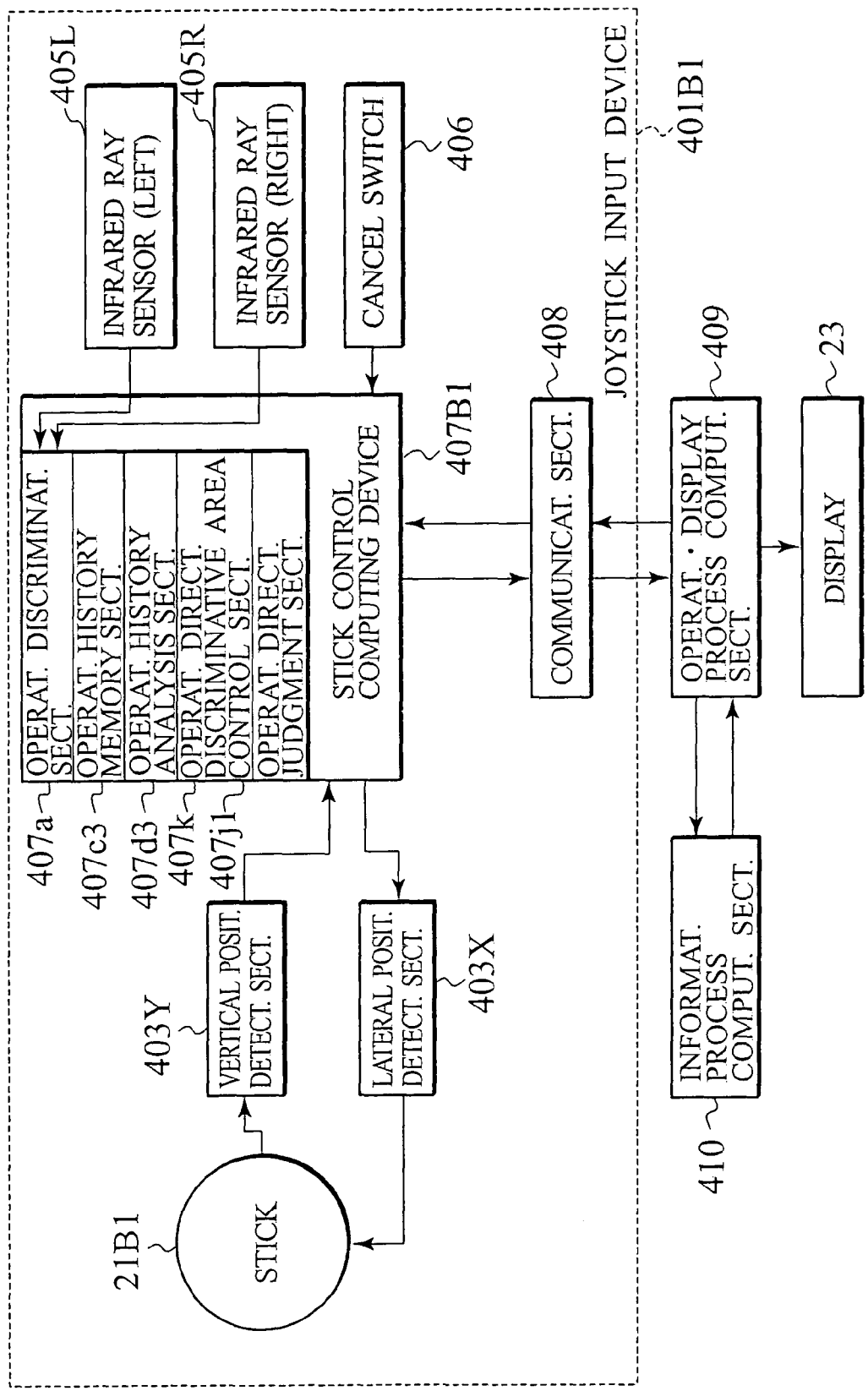
FIG. 44 is a control block diagram of a joystick input device of a fifth embodiment.
Figure 45:
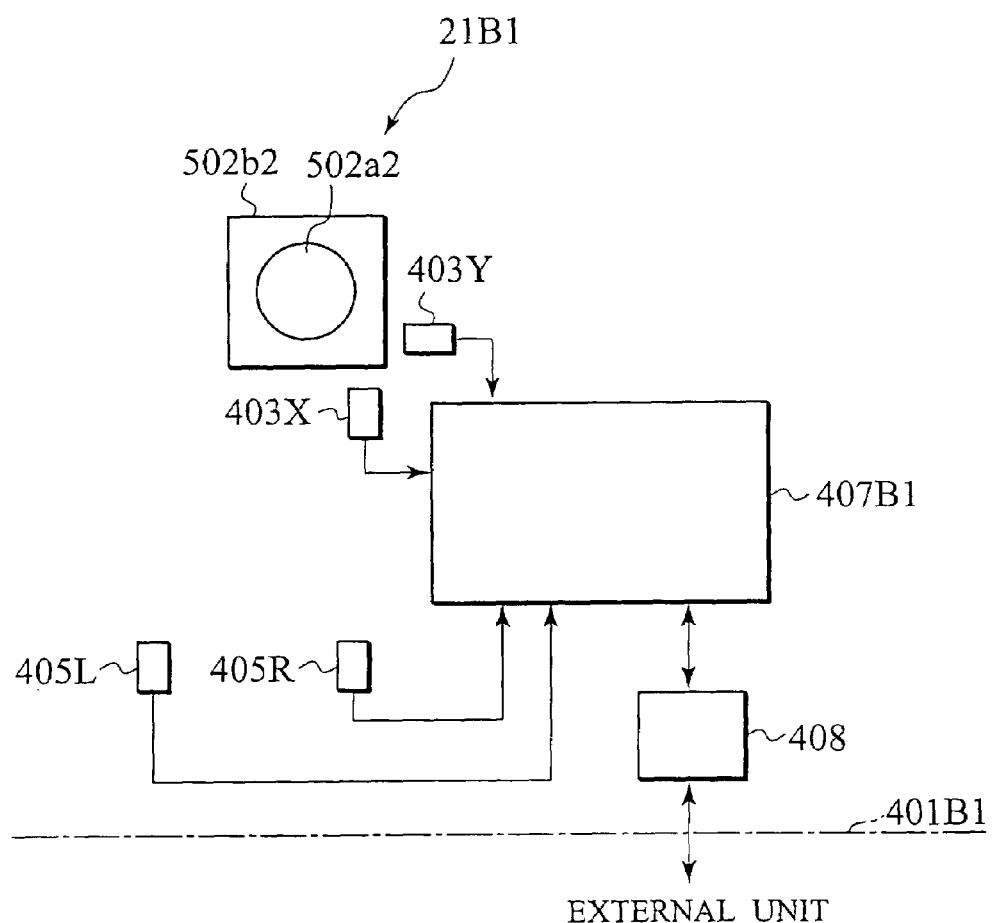
FIG. 45 is a view illustrating a hard structure of the joystick input device of the fifth embodiment.

FIG. 44 is a control block diagram illustrating a structure of a joystick input device of the presently filed embodiment, and FIG. 45 is a view illustrating a hard structure of the joystick input device.

The fifth embodiment differs from the fourth embodiment in that the lateral drive section and the vertical drive section are dispensed with in the joystick input device 401B1. In addition, a stick control computing device 407B1 includes an operational direction discriminative area control section 407k in place of the moveable area control section 407d. Also, the fifth embodiment partially differs from the fourth embodiment in respect of operation history storing process in the operation history memory section 407c3, operation history analyzing process in the operation history analysis section 407d3 and operational direction judging process in the operational direction judgment section 407j1.

In FIGS. 44 and 45, the same component parts as those of the first embodiment bear the same reference numerals and, in order to avoid redundant description, only differing structures are described.

In the presently filed embodiment, a stick control computing device 407B1 incorporates therein the operator discriminating section 407a, the operation history memory section 407c3, the operation history analysis section 407d3, an operational direction discriminative area control section 407k and an operational direction judgment section 407j.

The joystick of the presently filed embodiment has the same outer appearance as that of the fourth embodiment.

The stick control computing device 407B1 determines an operational direction layout of the stick 21B1 on the basis of the current GUI condition (such as an operation type, a hierarchy position, and a selective leg number) inputted from the operation and display process computing section 409 via the communicating section 408. Additionally, the stick control computing device 407B1 judges that the stick 21B1 is tilted and reaches an operational direction judgment area, which will be described later, with resulting regional number and an operational direction vector, described below, being utilized for judging the operational direction. Also, the setting of the operational direction judgment area is controllably altered based on the operational direction angle distribution resulting from the stick entering the operational direction judgment area.

Figure 48A:
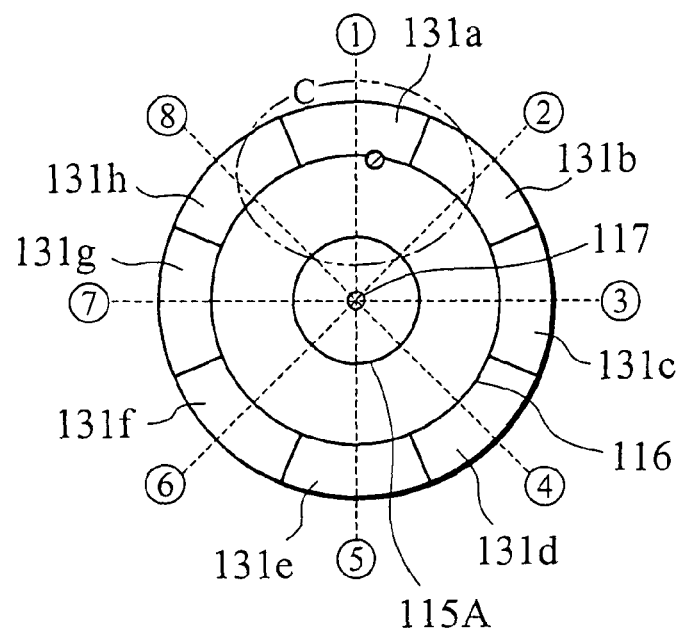
FIGS. 48A and 48B are views illustrating an operational direction discriminative area, operational direction angle detection and an operational direction vector.
Figure 48B:
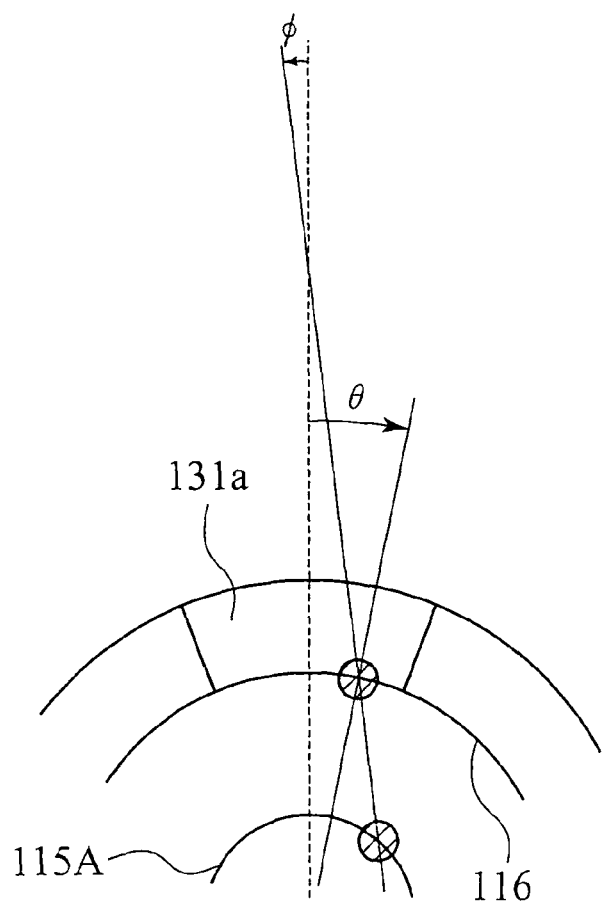

FIG. 48A shows the operational direction judgment area of the stick associated with the operational direction layout of the 8-selection legs as in FIG. 9A.

That is, set around a circumferential periphery of the stick 21B1 is an operation judgment circle 116, on which an operational direction judgment area 131 (regions 131a to 131h) is set as shown in FIG. 48A.

Like in the first embodiment, an operational direction layout includes operational direction numbers ① to ⑧ which are associated with respective selection legs of the current GUI condition.

The stick control computing device 407B1 allows the operational direction judgment section 407j1, which is incorporated therein, to respond to detected values of the lateral position detecting position 403X and the vertical position detecting section 403Y to judge an operational position in terms of the X-axis direction (see FIG. 1) and the Y-axis direction (see FIG. 1) of the stick 21B1, thereby executing a subsequent operation.

First, upon judgment that the operational position of the stick 21B1 is distanced from the neutral point 117 by a value greater than a given value, that is, when the operational position travels beyond an operational direction vector origin circle 115', an operational direction vector origin signal is outputted to the operation history memory section 407c3.

Upon occurrence of the position of the stick 21B1 exceeding the operation judgment circle 116, operation is made to judge an operation presence and, at this time, judgment is made to find whether the stick 21B1 is located in either one of the operational direction judgment regions 131a to 131h. Also, operation is executed to calculate an operational direction angle θ based on the operational position of the stick 21B1.

The operation presence signal, the operational direction judgment regional number i and the operational direction angle θ are outputted to the operation history memory section 407c3.

However, the operational direction judgment regional number i allows temporary operational direction judgment for operation history memory operation, and a final operational direction judgment is achieved in the operational direction judging operation which will be described later.

Also, the operational direction vector origin circle 115A is set to be smaller in diameter than the operational judgment circle 116 as shown in FIG. 48A.

Figure 46:
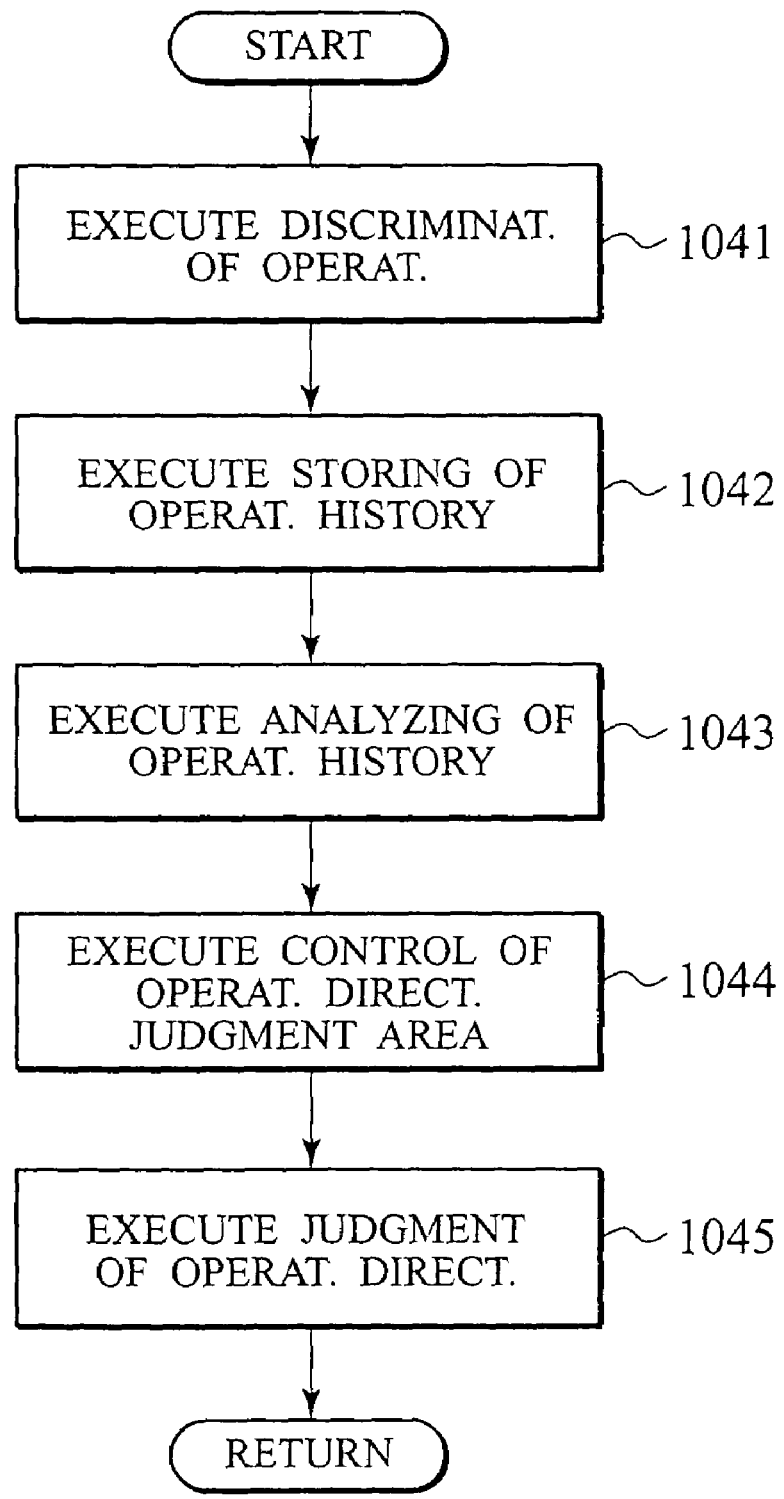
FIG. 46 is a flowchart illustrating entire flow of stick control.

A basic flowchart indicative of overall flow of stick control is shown in FIG. 46.

In step 1041, the operator discriminating section 407a performs operation for discriminating the operator. A detailed flow chart of this operation is the same as that of FIG. 8 related to the first embodiment.

In step 1042, the operation history memory section 407c3 accumulatively stores an operational loci of the stick 21B1 during operation thereof. Though flow of operation history storing operation is the same as that of the fourth embodiment, the operational locus has increased parameters greater than that of the fourth embodiment and the operational direction angle θ and, additionally, an angle φ of the operational direction vector are accumulatively stored in the operation history table.

In step 1043, the operation history analysis section 407d3 executes statistical operation of the operation history stored in the operation history memory section 407c3 to calculate coefficients of setting data of the operational direction judgment area and the operational direction judgment formula for storage in the operation history table.

In step 1044, the operational direction discriminative area control section 407k controls the operational direction judgment area for each combination between the operator's seated position and the operational direction layout determined in compliance with the current GUI condition on the basis of setting data of the operational direction judgment area calculated in step 1043.

In step 1045, the operational direction judgment section 407j1 judges the final operational direction based on the coefficients of the operational direction judgment area, in which the stick 21B1 is operated and into which the stick enters, and the operational direction judgment formula calculated in step 1043.

Next, respective operations of the above-described basic flowchart are described in detail mainly in connection with points different from the fourth embodiment.

The operation history storing operation of the presently filed embodiment is carried out in the same flow as that of the fourth embodiment shown in FIG. 37. Step 2012 is newly modified to read "DOES STICK TRAVEL BEYOND OPERAT. DIRECT. VECTOR ORIGIN CIRCLE?" in place of "DOES STICK TRAVEL BEYOND OPERAT. DIRECT. ANGLE JUDGMENT CIRCLE?". Also, step 2013 is modified to read "TENTATIVELY STORE ORIGIN OF OPERAT. DIRECT. VECTOR" IN PLACE OF "TENTATIVELY STORE OPERAT. DIRECT. ANGLE".

The operation history table for use in the presently filed embodiment is shown in FIG. 47. The operation history table takes the form of a two dimensional array table that includes individual memory areas each for a combination between the seated positions (for the left seat and the right seat) of the operator and the operational direction layout.

In the presently filed embodiment, the operational directions are comprised of 4-way, 6-way and 8-way layouts of three types, with tables of three kinds being used for the left seat and the right seat, respectively.

In step 2012, the operation history memory section 407c3 checks if the stick 21B1 is operated to travel beyond the operational direction vector origin circle 115A.

Upon detection of occurrence of the stick 21B1 being operated to travel beyond the operational direction vector origin circle 115A, flow is routed to step 2013 and, if not, flow of the operation history storing operation is terminated.

In step 2013, the operation history memory section 407c3 tentatively stores a lateral component and a vertical component, of the position detected by the lateral position detecting section 403X and the vertical position detecting section 403Y, in the buffers as the respective operational direction vector origins in response to the operational direction vector origin signal.

In step 2014, operation is executed to check if the stick 21B1 is operated.

If the operation presence of the stick 21B1 is confirmed, flow is routed to step 2015 and, if not, the operation history storing operation is terminated.

In step 2015, the operation history table is updated.

Initially, the lateral component and the vertical component of the position detected by the lateral position detecting section 403X and the vertical position detecting position 403Y occurring when the stick 21B1 travels beyond the operation judgment circle 116 are treated as ends points of the operational direction vector whereupon an angle φ forming the operational direction vector angled with respect to the center line 120 is calculated from a difference between the end points and the origin of the operational direction vector tentatively stored as described above is calculated and stored in the buffer.

Subsequently, based on the operational direction angle θ and the operational direction judgment area number i inputted from the operational direction judgment section 407j1, the stick control computing device 407B1 executes operation by adding 1 to the operational frequency $n_1$ of the column associated with the operational direction area number i in which the operation of the current operation history table shown in FIG. 47, adding the operational direction angle θ to the accumulative sum $\Sigma_j \theta_{ij}$ of the operational direction angle $\theta_{ij}$ and adding the square of the operational direction angle θ to the square accumulative sum $\sigma_j(\theta_{ij})^2$ of the operational direction angle.

Further, operation is executed to add the angle φ to $\Sigma_j \theta_{ij}$ of the angle φ of the operational direction vector, add the square of the angle φ to the square accumulative sum $\Sigma_j(\phi_{ij})^2$ of the angle φ and add θ·φ to the accumulative sum $\Sigma_j(\theta_{ij} \cdot \phi_{ij})$.

Here, a suffix "j" represents individual operations of the stick 21B1, and a suffix "i" represents the operational direction.

Also, if the selective operation of the selection leg is cancelled by the cancel switch 406, operation is executed to retrieve the operational direction angle θ and the angle φ, forming the operational direction vector, stored in the buffer and to subtract a cancelled component from the accumulative sum calculation result of the above-described operation history table.

Next, the operation history analysis operation to be executed in the operation history analysis section 407d3 is described.

The operation history analysis section 407d3 monitors the operation history table and, with respect to the operation history table for each combination between the seated position of the operator and the operation layout, judges if the operational frequency $n_i$ of the whole operational directions (i=1 to the number IM of the operational directions) exceeds an analysis start threshold value $n_T$.

If the history accumulative number of the operation history table becomes greater than $n_T$ in respective operational directions, the statistical operation is carried out in the same way as that of the first embodiment. Resulting data is additionally stored in the column, shown in a dotted line in FIG. 47, of the operation history table.

When this takes place, operation is implemented to calculate the average <$\theta_i$>of the operational direction angles θ, the standard deviation σ ($\theta_i$) and the discriminated value $C_{mn}$ and further to calculate the average $<\theta_i>$ of the operational direction angles $\theta$, the standard deviation $\sigma(\theta_i)$ and a coefficient $R_i$ of correlation.

Also, the average $<\phi_i>$ of the operational direction vector angles $\phi$ and the standard deviation $\sigma(\phi_i)$ form the same definition formulae as those of formulae (1) and (2), with rewriting of $\phi$ being made in place of $\theta$.

The coefficient $R_i$ of correlation is defined as $$R_i = \frac{n_i}{n_i - 1} * \left\{ \sum_j \frac{\theta_{ij}\phi_{ij}}{n_i} - <\theta_i> * <\phi_i> \right\} / \qquad (8)$$

$$(\sigma(\theta_i) * \sigma(\phi_i))$$

Figure 49:
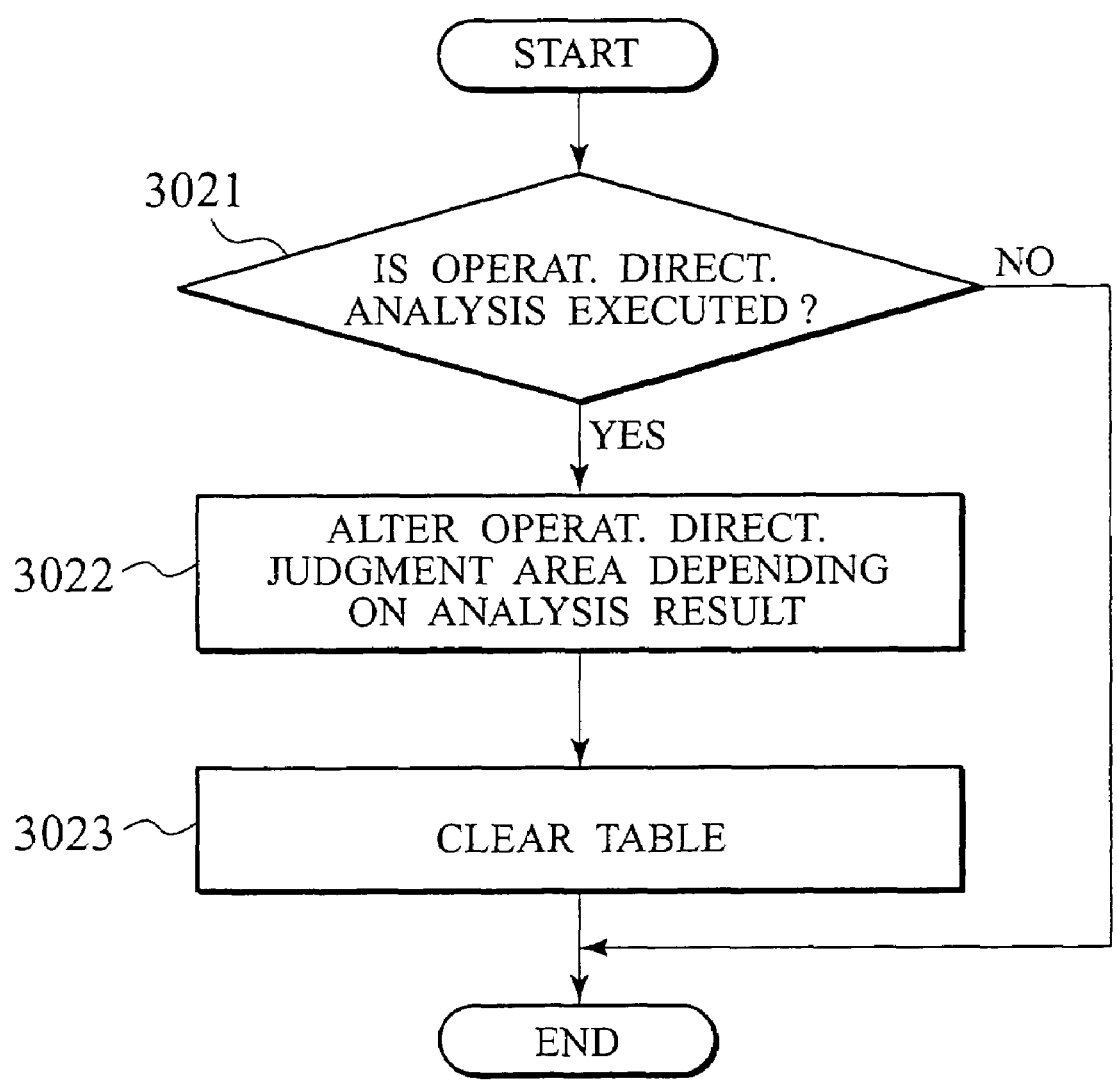
FIG. 49 is a flowchart illustrating flow of operational direction discriminative area control operation.

Next, the operational direction discriminative area control operation to be executed by the operational direction discriminative area control section 407k through the flowchart shown in FIG. 49 is described below in detail.

In step 3021, operation is implemented to check if the operation history analysis section 407d3 has executed the operation history analysis operation with respect to the operation history table. If the operation history analysis operation is not executed, flow is terminated and, if the operation history analysis operation is executed, flow is routed to step 3022.

In step 3022, operation is implemented to retrieve the operation history table, which is subjected to the operation history analysis operation, from the operation history analysis section 407d3, and to read out the statistical values of the average $<\theta_i>$ of the operational direction angles $\theta$, the standard deviation $\sigma(\theta_i)$ and the discriminated value $C_{mn}$, thereby setting and altering the operational direction judgment area in compliance with the operational direction angle distribution of the stick 21'.

Figure 50A:
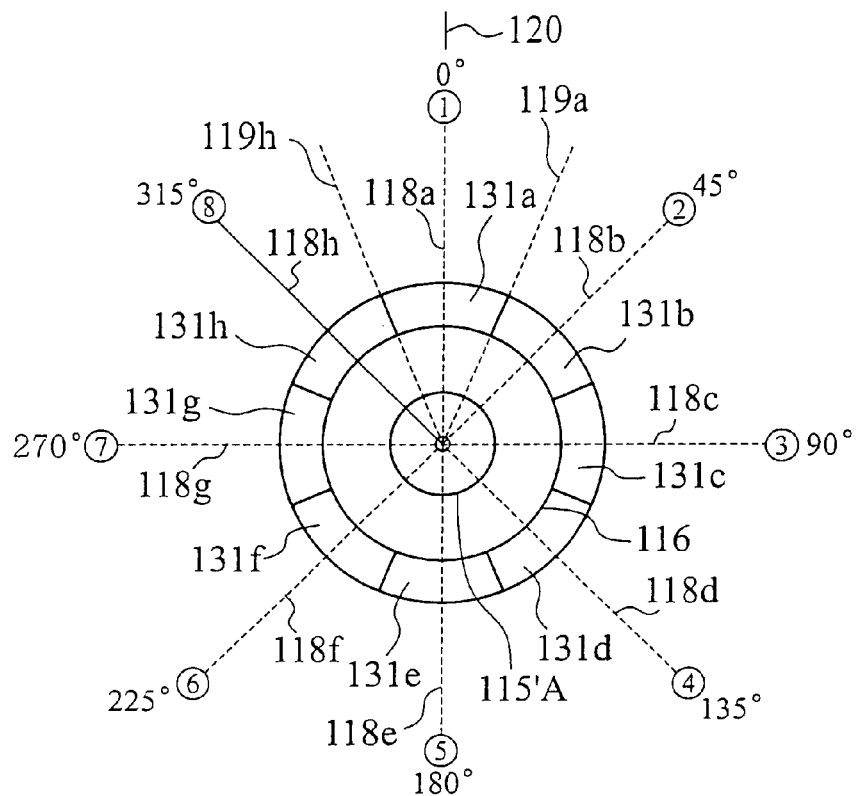
FIGS. 50A and 50B are illustrative views of the operational direction discriminative areas of the stick with conditions in controllably altered states.
Figure 50B:
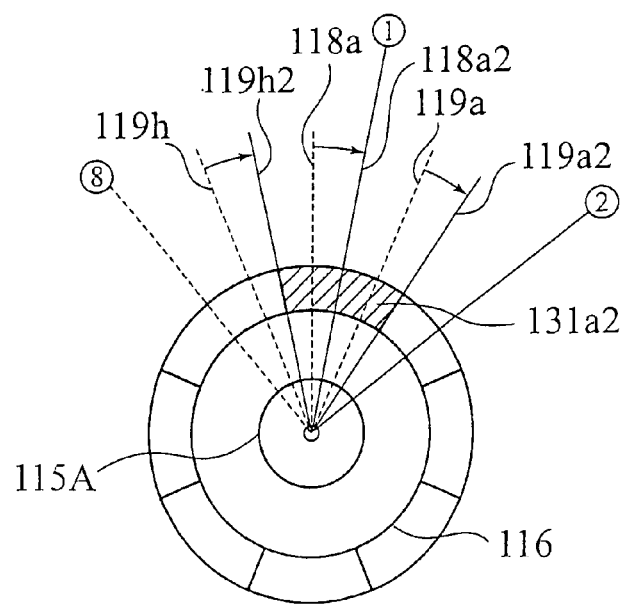

If the operational direction layout takes the form of an example of the 8-way type as shown in FIGS. 50A and 50B, the operational direction judgment area 131 (131a to 131h) has isotropic shapes associated with the operational direction number with respect to the combination between the seated position of any operator and the operational direction layout as shown in FIG. 50A, with boundaries being set in a circumferential periphery of the operational direction judgment area 131 at intervals of 22.5, 67.5 . . . and 45 with respect to a cardinal point of the center line 120 in terms of all operational directions ① to ⑧.

If the operation history analysis operation is executed in manner as set forth above with respect to a certain operation history table, operation is implemented to alter the boundary of the operational direction judgment area 131 to be brought into alignment with the discriminated value $C_{mn}$ in respect of each operational direction i (i=1 to 1M). In case of the boundary between the operational directions ① and ②, the boundary is displaced from the judgment boundary directional line 119a to the judgment boundary directional line 119a'.

Although the structure of FIG. 50B has been shown in connection with an example wherein the boundary between the operational directions ① and ② and wherein the boundary between the operational directions ① and ⑧ are altered, it is an actual practice for the boundaries of the respective operational direction judgment regions to be altered in desired in dependence on the result of the operation history analysis operation.

In step 3023, the operational direction discriminative area control section 407k clears data of the columns (the columns of accumulative memory parameters), indicated in a solid line shown in FIG. 47 of the operation history table with the operational direction judgment area being set and altered, to zero.

Upon such operation, and later, the operation history memory section 407c3 begins to accumulate new operational direction angles and data of the operational direction vector angles again in the operation history table for each operation of the stick 21B1.

Next, the operational direction judgment operation to be performed by the operational direction judgment section 407j1 is described below in detail. In actual practice, this operation is executed in parallel with the operation history storing operation.

In an event that the operator manipulates the stick 21B1 to cause the resulting operated position to exceed the operation judgment circle 116, a final operational direction is judged in a procedure as will be described below. As set forth above, also, when in occurrence of the stick exceeding the operation judgment circle 116, the operational direction judgment section 407j1 judges the operational direction judgment area number m and calculates the operational direction angle $\theta$.

If the stick 21b1 is tilted far beyond the operation judgment circle 116, the associated operation history table is retrieved from the operation history memory section 407c3 on the basis of the current GUI condition and the operator's seated position judgment result of the operator discriminating section 407a.

In an initial stage (at the beginning stage of use), if the operation history analysis result is not recorded in the operation history table, operation is executed to judge the operational direction judgment area number m, in which the stick exceeds the operation judgment circle 116, to be the operational direction.

With the operation history analysis result being recorded on the operation history table, a final operational direction judgment is executed in the following manner using the operational direction judgment regions m, n, the operational direction angle $\theta$ and the angle $\phi$ of the operational direction vector.

Upon comparison between the average $<\theta_m>$, of the operational direction angles $\theta$ in the column relevant to the operational direction judgment area number m and $\theta$, operation is implemented to select an adjacent operational direction judgment area number n closer to the current operational direction angle.

Further, from the average $<\theta_m>$ and $<\phi_m>$ between the angles $\theta$ and $\phi$ stored in the above-described operation history table, the standard deviations $\sigma(\theta_m)$ and $(\phi_m)$ and the coefficient $R_m$ of correlation, Maharanobis Distance $D_m^2$ defined in the following formula is calculated.

$$D_m^2 = \frac{1}{1 - R_m^2} \left\{ \left( \frac{\theta - <\theta_m>}{\sigma(\theta_m)} \right)^2 + \left( \frac{\phi - <\phi_m>}{\sigma(\phi_m)} \right)^2 - \qquad (9) \right.$$

$$\left. 2R_m * \left( \frac{\theta - <\theta_m>}{\sigma(\theta_m)} \right) * \left( \frac{\phi - <\phi_m>}{\sigma(\phi_m)} \right) \right\}$$

Similarly, from the average $<\theta_n>$ and $<\phi_n>$ between the angles $\theta$ and $\phi$ in the columns relevant to the operational direction judgment area number n, the standard deviations $\sigma(\theta_n)$ and $\sigma(\phi_n)$ and the coefficient $R_n$ of correlation, the Maharanobis Distance $D_n^2$ defined in the following formula is calculated.

Based on the results of the Maharanobis Distance $D_m^2$, $D_n^2$, if $D_m^2 \leq D_n^2$, the operation is judged to be involved in the operational direction m and if $D_m^2 > D_n^2$, the operation is judged to be involved in the operational direction n.

The stick 21B1 of the presently filed embodiment forms a terminal end, and the lateral position detecting section 403X, the vertical position detecting section 403Y and the operational direction judgment section 407j1 form an operational direction judging means.

Also, among steps in the flowchart, step 1041 forms an operator discriminating means, step 1042 forms an operation history storing means, step 1043 forms an operation history analyzing means and step 1044 forms a moveable area control means.

With the presently filed embodiment, the joystick input device is configured so as to execute operations to judge the seated position of the operator and store the history of the operational direction angles of the stick 21B1 for each combination between the operator's seated position and the operational direction layout in terms of each operational direction judgment area number whereupon the average of the distribution of the operational direction angles, the standard deviation and the discriminated in respect of each operational direction judgment area are calculated through statistical operation while arranging a direction of the average $<\theta_i>$ of the operational direction angles with a high probability in operation of the stick 21B1 to be in alignment with the center direction of the operational direction judgment area and setting and altering the operational direction judgment area with the discriminated value $C_{mn}$ being aligned with the boundary direction with respect to the adjacent operational direction judgment area As a result, it is possible to set the operational direction judgment area adapted for a difference in operability of the stick 21 depending on the seated position and the right hand or the left hand of the operator, a peculiarity of the individual operator, a property caused by a difference in body, circumferences with occurrence of deviation or swing, caused by a layout position of the stick, and the operation layout, resulting in a capability of achieving reduction in operational failures.

In addition, since judgment is made based on the Maharanobis Distance using not only the operational direction judgment area m, in which the stick 21B1 is located a distance exceeding the operation judgment circle but also the statistical operation result the operational direction angle θ and the operational direction vector angle φ, stored as the operation history with a probability in which the operational direction judgment area n adjacent to the operational direction judgment area m is selected, to execute judgment of the final operational direction, it becomes possible to judge a correct operational direction, especially even caused by the operator with the peculiarity in operation of the stick 21B1 traveling in a curved locus, resulting in a capability of achieving reduction in the operational failures.

While the fourth and fifth embodiments have been described in connection with examples wherein the operation history memory sections 407c2, 407c3 and the operation history analysis sections 407d2, 407d3 are internally processed in the stick control computing devices 407B or 407B1, it may be arranged to compel these operations to be executed in the operation and display process computing section 409 provided in the outside of the system to allow resulting information to be outputted to the stick control computing device 407 or 407B1 through the communicating section 408.

Further, while the fourth and fifth embodiments have been described in connection with an example wherein the infrared ray sensor, that is sensible in a non-contact capability, is used as the operator discriminating section to provide the operator discrimination signal, the operator discriminating section may not necessarily be of the type which uses an infrared light but may be substituted with a light sensor of other waveband unless it is adapted for circumferences of use.

Additionally, in place of the infrared ray sensor, use may be made for an electrostatic sensor, that is a premise to allow the operator to contact the sensor, or a pressure sensitive sensor using a resistance film or a pressure sensitive element. In case of using the sensors other than the light sensors, the sensors may be located in the same positions as those shown in FIG. 1.

That is, with such a layout in which the joystick 21, 21B1 is located in the center cluster 20 as viewed in FIG. 2, the palm bottom portion in the vicinity of the root of the thumb is brought into contact with the surface of the instrument panel as the support during the operation, the provision of the electrostatic sensors or the pressure sensitive sensors located on the same positions as those of the infrared sensors enables the operator's seated position to be similarly discriminated.

Further, while the fourth and fifth embodiments have been described in connection with the joystick input device adapted to execute inputting by tilting the stick as the operation terminal, even if the input device is comprised of the multiple-way input device using the mouse as the operation terminal to perform inputting by sliding the mouse in the radial direction with respect to the center position, the sensors for discriminating the operator's seated position may be similarly disposed.

However, in a case where an incremental sliding amount (stroke) lies in a large value, since the position of the hand during operation travels, the sensor positions may be determined to provide left and right distinctive separation in consideration of a covering area of the hand.

Moreover, in case of using the contact type sensors such as the electrostatic sensors or the sensitive sensors, sensing areas may be determined so as to cover entire contact surfaces in consideration of the hand travel.

In addition, while the fourth and fifth embodiments have been described in connection with an example wherein the normal distribution is treated as a premise in the statistical operation of the distribution of the operational direction angle θ for the operation history or the distribution of the angle φ of the operational direction vector, the statistical operation may be treated using other distributions.

Further, while in the fifth embodiment, the angle φ of the operational direction vector has been described as the angle forming the operational direction vector with respect to the center line 120 of the stick 21B1, the angle φ may be an angle that forms the operational direction vector with respect to the regional center directional line 118 (118a to 118h), or 118A (118a1 to 118h1), of the operational direction angle θ or the relevant operational direction judgment area.

As set forth above, according to the present invention, since the moveable range of the operation terminal is made variable whereby, during occurrence of the operational failures, the moveable range of the operation terminal is enabled to be corrected depending on a tendency of the operational failures, the presence of the operation terminal, whose moveable range is altered in compliance with the tendency of the operational failures resulting under circumstances where deterioration in operation accuracy occurs due to various factors related to the input device side, the operator side and the operating circumstances, enables the operation guides to be naturally structured to be adapted for the various factors causing the operational failures, resulting in reduction in the operational failures in an effective fashion.

Further, according to the present invention, the operational failure judging means is operative to judge if the respective selective operations are involved in the operational failures, the operation history storing means is operative to accumulatively store the operational frequency and the operational failure occurrence frequency as the operation history for each operational direction, and the operation history analyzing means is operative to calculate the erroneous operation rate for each operational direction from the operation history, whereupon the operational load control means determines the repulsion characteristic, that is caused to occur in the operation terminal depending on the operational incremental position in the radial direction, to be formed of the repulsion characteristic such that the larger the erroneous operation rate of the operational direction, the steeper will be the grade of the repulsion characteristic with respect to a standard set value or determines a position of the operational incremental amount (stroke), at which the selective operation is completed, to be located at a stroke position greater than that of the standard setting. Thus, during occurrence of tilting movement of the operation terminal in the selected leg of the menu screen with a high liability in the operational failures, the repulsion force to be exerted to the operator becomes larger than that of normal operation, the operator is able to recognize that attention is needed when in selective operation in such a direction.

As a result, the operator has a chance to confirm the menu screen or reconsider prior to completing the selective operation in such a direction and, if the resulting operational direction is found to be erroneous, it becomes easy for the operator to find the error. Also, even with the resulting operational direction being correct, the operator is able to easily recognize a new that the resulting operational direction is correct.

In such a way, in the use of the operation menu with the high liability of the operational failures, the operator is able to understand correspondence between the operation menu and an associated operational function, that is, formation of mental model can be formed in the operator in an early stage, resulting in reduction in operational failures.

Also, due to an ability of the operation terminal adapted to provide a feeling to the operator in the form of an increased repulsion force indicative of the operative condition with a high liability in the operational failures, the operator can be reliably informed with the operative condition, with the high liability in the operational failures, even under the operating circumstances where situations are supposed wherein sufficient attention is hard to be paid in the operation menu on the screen because of other preferential operations such as operations in a compartment of the automobile.

Further, according to the present invention, since the moveable area in which the operational direction of the operation terminal is restricted is made variable and the locus of the operation terminal resulting from the operations of the operation terminal is accumulatively stored whereupon the statistical operation is executed for the distribution of the locus of the operation terminal that is stored and the moveable area is altered and controlled depending on the statistic of the distribution of the calculated operational loci, the moveable area can be set in a direction, in which the operation terminal is operated with a statistically high frequency, so as to comply with respective commands. That is, an ability is provided to set the moveable area adapted for the operating circumstances with deteriorated operation accuracy due to disturbances applied to the operator or the operation terminal, an operational peculiarity of the operator or the positional relationship between the operator and the operation terminal, resulting in a capability of achieving reduction in the operational failures.

The entire contents of Japanese Application No. P2002-225311 with a filing date of Aug. 1, 2002, No. P2003-65558 with a filing date of Mar. 11, 2003, and No. P2003-58893 with a filing date of Mar. 5, 2003 are herein incorporated by reference.

Although the present invention has been described above by reference to certain embodiments of the invention, the invention is not limited to the embodiments described above and modification will occur to those skilled in the art, in light of the teachings. The cope of the invention is defined with reference to the following claims.

What is claimed is:

1. A multi-way input device adapted to perform input operation through tilting or sliding movements of an operation terminal in a given direction to allow a command correlated with the direction to be selected, the multi-way input device comprising:
    an operational failure judgment section judging if selective operation of an operator is involved in an operational failure;
    an operational failure memory section storing information, related to operational failures judged by the operational failure judgment section, as an operation history;
    an operational failure analysis section analyzing the operation history stored in the operational failure memory section for thereby judging a tendency of the operational failures; and
    an adjusting section adjusting a moveable range of the operation terminal to avoid the operational failures in response to a resulting analysis made by the operational failure analysis section.

2. The multi-way input device according to claim 1, wherein:
    the operational failure judgment section judges that, if a subsequent selective operation is executed within a given time interval subsequent to a preceding selective operation and a resulting command is different from a selected command, the preceding selective operation is involved in an operational failure and the subsequent selective operation is involved in a correct operation;
    the operational failure memory section stores a frequency of correct selective operations, a frequency of the operational failures and directions, in which the operational failures occur, in a correlated relationship for each operational direction in which the operation terminal is operated;
    the operational failure analysis section judges an occurrence tendency of the operational failures based on the frequency of the correct selective operations, the frequency of the operational failures and the respective directions, in which the operational failures occur, for each operational direction; and
    the adjusting section corrects a moveable range of the operation terminal in a way to be expanded toward an operational direction with a tendency of occurrence in the operational failures.

3. The multi-way input device according to claim 1, wherein:

the operational failure analysis section computes an occurrence frequency, in which the operational failures occur in respective operational directions, in a combination between one operational direction and an adjacent operational direction; and the adjusting section expands a moveable range of the operation terminal toward a direction with a high occurrence frequency of the operational failures.

4. The multi-way input device according to claim 3, wherein:

under a situation where, during operations of the operation terminal in the one and adjacent operational directions, the operational failures occur in the mutually adjacent operational directions at the same occurrence frequency, the adjusting section expands the moveable range of the operation terminal toward the respective operational directions.

5. The multi-way input device according to claim 1, further comprising:

an operator discriminating section discriminating operators; wherein the operational failure memory section stores an operational failure history for each operator.

6. The multi-way input device according to claim 5, wherein:

the operator discriminating section is mounted on a vehicle to enable the operation terminal to be operated from a driver's seat and an assistant driver's seat and detects if a seated position of the operator belongs to the driver's seat or the assistant driver's seat for thereby discriminating the operator based on the seated position.

7. The multi-way input device according to claim 5, wherein:

the operator discriminating section detects the operator in dependence on detected conditions resulting from detection sensors installed in the vicinities of right and left sides of the operation terminal, respectively.

8. The multi-way input device according to claim 5, wherein:

the adjusting section corrects the moveable range of the operation terminal in a whole operational direction depending on the seated position of the operator.

9. The multi-way input device according to claim 1, further comprising:

an operation monitoring section monitoring completed selective operations and operational directions of the operation terminal; and wherein the operational failure memory section accumulatively stores an operational frequency, for each operational direction associated with the command, and a frequency of the operational failures, for the each operational direction, judged by the operational failure judgment section, as an operation history for the selective operation;

the operational failure analysis section calculates an erroneous operation rate, for the each operational direction, based on the operation history stored in the operational failure memory section;

the adjusting section setting and altering a repulsion characteristic, to be imparted to the operator through the operation terminal, depending on an operational displacement value caused by tilting movement of the operation terminal initiated by the operator in a radial direction, and responsive to the erroneous operation rate to allow a repulsion characteristic, that increases depending on an operational displacement value as the erroneous operation rate related to the operational direction increases, to be set in a steeper gradient than that of a standardized repulsion or to allow an operational displacement position, at which the selective operation is completed, to be set to a position remoter than a standardized displacement position.

10. A method of avoiding an operational failure in a multi-way input device adapted to perform input operation through tilting or sliding movements of an operation terminal in a given operational direction to allow a command, correlated with the operational direction, to be selected, the method comprising:

judging if selective operation of an operator is involved in an operational failure;

storing information, related to the operational direction in which the operational failure occurs, as an operation history in the presence of the operational failure;

judging a tendency of operational failures by analyzing the operation history; and correcting a moveable range of the operation terminal so as to avoid the operational failure.

11. The multi-way input device according to claim 10, wherein:

the operational failure memory section accumulatively stores an operation history in compliance with each selection menu screen; and the operational failure analysis section analyzes an operational failure history for each selection menu screen and stores resulting information.

12. A multi-way input device adapted to perform input operation through tilting or sliding movements of an operation terminal in a given direction to allow a command correlated with the direction to be selected, the multi-way input device comprising:

operational failure judging means for judging if selective operation of an operator is involved in an operational failure;

operational failure storing means for storing information, related to operational failures judged by the operational failure judging means, as an operation history;

operational failure analyzing means for analyzing the operation history stored in the operational failure storing means for thereby judging a tendency of the operational failures; and adjusting means for adjusting a moveable range of the operation terminal to avoid the operational failures in response to a resulting analysis made by the operational failure analyzing means.

* * * * *

UNITED STATES PATENT AND TRADEMARK OFFICE
CERTIFICATE OF CORRECTION

| | | |
|---|---|---|
| PATENT NO. | : 7,315,299 B2 | Page 1 of 1 |
| APPLICATION NO. | : 10/621613 | |
| DATED | : January 1, 2008 | |
| INVENTOR(S) | : Takashi Sunda et al. | |

It is certified that error appears in the above-identified patent and that said Letters Patent is hereby corrected as shown below:

Page 1 of the Title Page, item "(30) Foreign Application Priority Data", change "August 1, 2002   (JP)   ......P 2003-225311" to --August 1, 2002   (JP)   .....P 2002-225311--;

In item "(56) References Cited", under "U.S. PATENT DOCUMENTS", change "6,373,272 B1*   4/2002   Welsch et al. .....345/173" to --6,373,472 B1   Palalau et al. ....345/173--.

Signed and Sealed this

Nineteenth Day of August, 2008

JON W. DUDAS
*Director of the United States Patent and Trademark Office*